US012701216B2

(12) United States Patent
Lim et al.

(10) Patent No.: US 12,701,216 B2
(45) Date of Patent: Aug. 4, 2026

(54) METHOD AND DEVICE FOR IMAGE ENCODING/DECODING, AND RECORDING MEDIUM

(71) Applicants: ELECTRONICS AND TELECOMMUNICATIONS RESEARCH INSTITUTE, Daejeon (KR); HANBAT NATIONAL UNIVERSITY INDUSTRY-ACADEMIC COOPERATION FOUNDATION, Daejeon (KR)

(72) Inventors: Woong Lim, Daejeon (KR); Hyoung-Jin Kwon, Daejeon (KR); Dong-Hyun Kim, Daejeon (KR); Youn-Hee Kim, Daejeon (KR); Jong-Ho Kim, Daejeon (KR); Ji-Hoon Do, Daejeon (KR); Joo-Young Lee, Daejeon (KR); Se-Yoon Jeong, Daejeon (KR); Jin-Soo Choi, Daejeon (KR); Tae-Jin Lee, Daejeon (KR); Hae-Chul Choi, Daejeon (KR); Dae-Hyeok Gwon, Daejeon (KR); Hee-Ji Han, Daejeon (KR)

(73) Assignees: ELECTRONICS AND TELECOMMUNICATIONS RESEARCH INSTITUTE, Daejeon (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 23 days.

(21) Appl. No.: 18/292,869

(22) PCT Filed: Jul. 26, 2022

(86) PCT No.: PCT/KR2022/010992
§ 371 (c)(1),
(2) Date: Jan. 26, 2024

(87) PCT Pub. No.: WO2023/008888
PCT Pub. Date: Feb. 2, 2023

(65) Prior Publication Data
US 2024/0372982 A1 Nov. 7, 2024

(30) Foreign Application Priority Data
Jul. 26, 2021 (KR) ......................... 10-2021-0098124
Jul. 26, 2022 (KR) ......................... 10-2022-0092726

(51) Int. Cl.
*H04N 19/105* (2014.01)
*H04N 19/176* (2014.01)
*H04N 19/88* (2014.01)

(52) U.S. Cl.
CPC ......... *H04N 19/105* (2014.11); *H04N 19/176* (2014.11); *H04N 19/88* (2014.11)

(58) Field of Classification Search
CPC ........................... H04N 19/105; H04N 19/176
See application file for complete search history.

(56) References Cited

U.S. PATENT DOCUMENTS 10,735,758 B2 * 8/2020 Xu ....................... H04N 19/119
10,743,027 B2 8/2020 Zheng et al.
(Continued)

FOREIGN PATENT DOCUMENTS

KR 10-2018-0005121 A 1/2018
KR 10-1839629 B1 3/2018
(Continued)

OTHER PUBLICATIONS

International Search Report & Written Opinion for PCT/KR2022/010992 by Korean Intellectual Property Office dated Nov. 10, 2022.

*Primary Examiner* — Irfan Habib
(74) *Attorney, Agent, or Firm* — BROADVIEW IP LAW, PC

(57) ABSTRACT

Disclosed therein are a method, an apparatus, and a storage medium for image encoding/decoding. Templating matching
(Continued)

is used for prediction for a target block. Prediction information to be applied to encoding of the target block is determined, and prediction for the target block that uses the determined prediction information is performed. The prediction information includes a list and multiple candidates in the list. When the multiple candidates in the list are configured, template matching between blocks may be used. A candidate selected from among multiple candidates configured using template matching is used for prediction for the target block.

7 Claims, 32 Drawing Sheets

(56) References Cited

U.S. PATENT DOCUMENTS

| | | | |
|---|---|---|---|
| 10,757,442 B2 | 8/2020 | Li et al. | |
| 10,999,597 B2 * | 5/2021 | Shiodera | H04N 19/105 |
| 11,233,996 B2 * | 1/2022 | Nam | H04N 19/91 |
| 11,876,999 B2 | 1/2024 | Lee | |
| 2011/0170602 A1 * | 7/2011 | Lee | H04N 19/176 |
| | | | 375/E7.123 |
| 2012/0075436 A1 * | 3/2012 | Chen | H04N 13/161 |
| | | | 348/51 |
| 2013/0028328 A1 * | 1/2013 | Shiodera | H04N 19/105 |
| | | | 375/E7.123 |
| 2013/0259122 A1 * | 10/2013 | Sugio | H04N 19/58 |
| | | | 375/240.25 |
| 2014/0269922 A1 * | 9/2014 | Nagaoka | H04N 19/52 |
| | | | 375/240.16 |
| 2016/0255329 A1 * | 9/2016 | Lee | H04N 13/207 |
| | | | 382/154 |
| 2017/0238006 A1 * | 8/2017 | Nakamura | H04N 19/52 |
| | | | 375/240.16 |
| 2018/0035124 A1 * | 2/2018 | Sugio | H04N 19/527 |
| 2019/0014342 A1 * | 1/2019 | Li | H04N 19/55 |
| 2019/0082192 A1 | 3/2019 | Chuang et al. | |
| 2019/0246143 A1 | 8/2019 | Zhang et al. | |
| 2020/0059660 A1 | 2/2020 | Kim et al. | |
| 2020/0137398 A1 * | 4/2020 | Zhao | H04N 19/137 |
| 2020/0280735 A1 * | 9/2020 | Lim | H04N 19/137 |
| 2020/0366900 A1 | 11/2020 | Jun et al. | |
| 2020/0413040 A1 * | 12/2020 | Lim | H04N 19/137 |
| 2021/0014522 A1 * | 1/2021 | Jung | H04N 19/593 |
| 2021/0105481 A1 * | 4/2021 | Kim | H04N 19/119 |
| 2021/0120242 A1 * | 4/2021 | Nam | H04N 19/122 |
| 2022/0070442 A1 * | 3/2022 | Jang | H04N 19/105 |
| 2022/0217361 A1 | 7/2022 | Zhao et al. | |
| 2023/0421804 A1 | 12/2023 | Lee et al. | |

FOREIGN PATENT DOCUMENTS

| | | |
|---|---|---|
| KR | 10-2019-0040476 A | 4/2019 |
| KR | 10-2020-0023315 A | 3/2020 |
| WO | 2020/060376 A1 | 3/2020 |

* cited by examiner

510

DIAGONAL SCANNING

HORIZONTAL SCANNING

VERTICAL SCANNING

| MERGE INDEX | L0 | L1 |
|---|---|---|
| 0 | A0 | A1 |
| 1 | B0 | B1 |
| ... | ... | ... |
| 5 | ... | ... |

| PAIRWISE | L0 | L1 |
|---|---|---|
| MV | (A0+B0)/2 | (A1+B1)/2 |
| REFIDX | REFIDX OF A0 | REFIDX OF A1 |

METHOD AND DEVICE FOR IMAGE ENCODING/DECODING, AND RECORDING MEDIUM

This application is a National Phase Entry Application of PCT Application No. PCT/KR2022/010992, filed on Jul. 26, 2022, which claims the benefit of Korean Patent Application Nos. 10-2021-0098124, filed Jul. 26, 2021 and 10-2022-0092726, filed Jul. 26, 2022, which are hereby incorporated by reference in their entireties into this application.

TECHNICAL FIELD

The present disclosure relates generally to a method, an apparatus, and a storage medium for image encoding/decoding. More particularly, the present disclosure relates to an image encoding/decoding method, apparatus and storage medium using prediction based on template matching.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or video.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is currently required.

As image compression technology, there are various technologies, such as inter-prediction technology, intra-prediction technology, transform, quantization technology and entropy coding technology.

Inter-prediction technology is technology for predicting the value of a pixel included in a current picture using a picture previous to and/or a picture subsequent to the current picture. Intra-prediction technology is technology for predicting the value of a pixel included in a current picture using information about pixels in the current picture. Transform and quantization technology may be technology for compressing the energy of a residual signal. The entropy coding technology is technology for assigning a short codeword to a frequently occurring value and assigning a long codeword to a less frequently occurring value.

By utilizing this image compression technology, data about images may be effectively compressed, transmitted, and stored.

DISCLOSURE

Technical Problem

An embodiment is intended to provide an apparatus, a method, and a storage medium that improve the accuracy of referenced motion information and the performance of motion prediction upon constructing a merge list for a target block.

An embodiment is intended to provide an apparatus, a method, and a storage medium that improve the accuracy of a motion vector using template matching, and construct a merge list in an order similar to that of the motion vector of a target block.

An embodiment is intended to provide a method, an apparatus, and a storage medium for storing a bitstream, which can derive motion vectors, the accuracy of which is improved, using template matching and can perform efficient inter-prediction on an encoded/decoded target block by efficiently reordering the derived motion vectors.

Technical Solution

In accordance with an aspect, there is provided an image decoding method, including determining prediction information of a target block based on information related to a prediction method; and performing prediction for the target block that uses the prediction information.

Advantageous Effects

There are provided an apparatus, a method, and a storage medium that improve the accuracy of referenced motion information and the performance of motion prediction upon constructing a merge list for a target block.

There are provided an apparatus, a method, and a storage medium that improve the accuracy of a motion vector using template matching, and construct a merge list in an order similar to that of the motion vector of a target block.

There are provided a method, an apparatus, and a storage medium for storing a bitstream, which can derive motion vectors, the accuracy of which is improved, using template matching and can perform efficient inter-prediction on an encoded/decoded target block by efficiently reordering the derived motion vectors.

DESCRIPTION OF DRAWINGS

FIG. 23 illustrates the addition of pairwise candidates according to an example;

MODE FOR INVENTION

Figure 1:
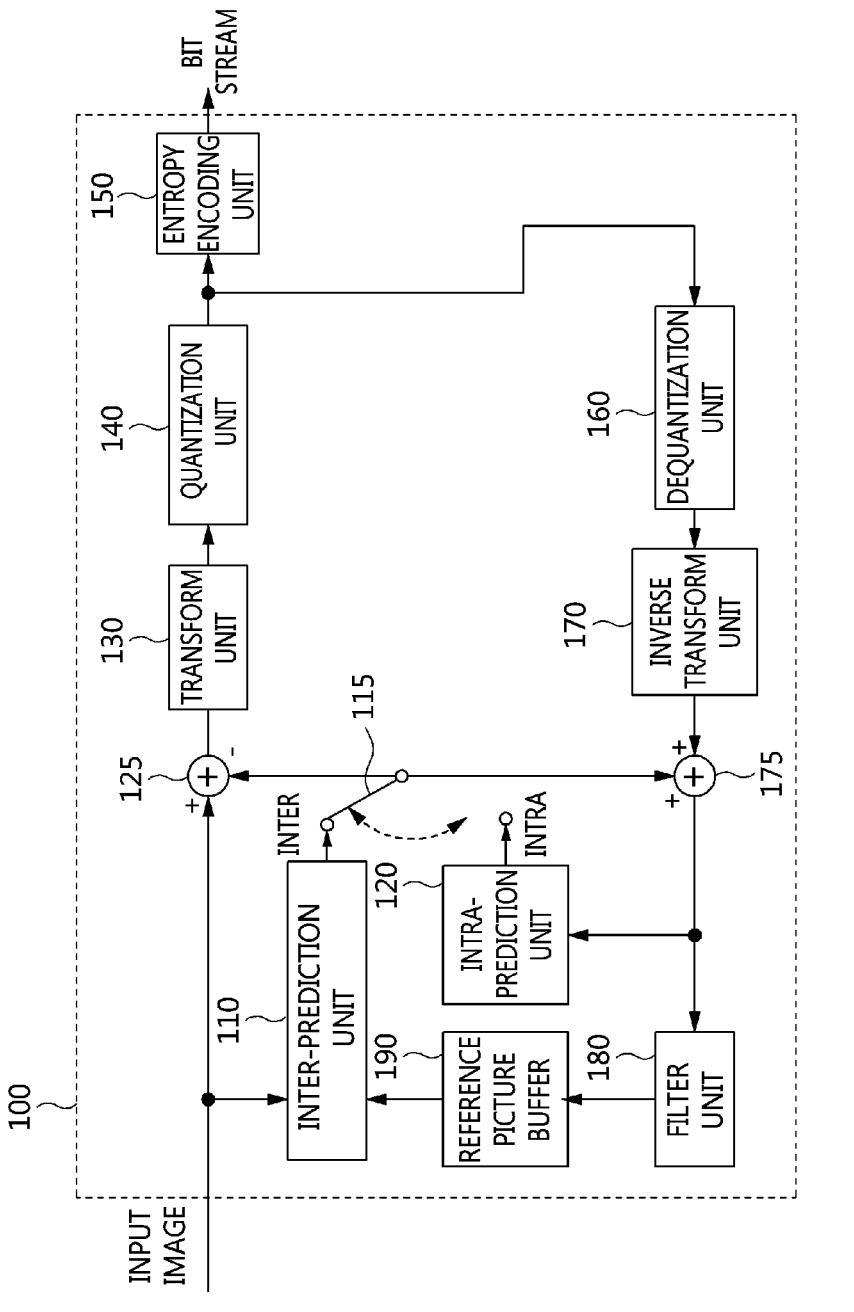
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. On the other hand, it will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

The terms used in the embodiment are merely used to describe specific embodiments and are not intended to limit the present invention. A singular expression includes a plural expression unless a description to the contrary is specifically pointed out in context. In the embodiments, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, in the embodiments, an expression describing that a component "comprises" a specific component means that additional components may be included within the scope of the practice of the present invention or the technical spirit of the present invention, but does not preclude the presence of components other than the specific component.

In the embodiments, a term "at least one" may mean one of one or more numbers, such as 1, 2, 3, and 4. In the embodiments, a term "a plurality of" may mean one of two or more numbers, such as 2, 3 and 4.

Some components of the embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus. And, a target image may be a current image, that is, the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other. A current block may denote an encoding target block, which is the target of encoding, during encoding and/or a decoding target block, which is the target of decoding, during decoding. Also, the current block may be at least one of a Coding Tree Block (CTB), a coding block, a prediction block, a residual block, a transform block, and a block with a specific size.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

In the following embodiments, specific information, data, a flag, an index, an element, and an attribute may have their respective values. A value of "0" corresponding to each of the information, data, flag, index, element, and attribute may indicate a false, a logical false or a first predefined value. In other words, the value of "0", a false, logical false, and a first predefined value may be used interchangeably with each other. A value of "1" corresponding to each of the information, data, flag, index, element, and attribute may indicate a true, a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

In embodiments, the term "one or more" or the term "at least one" may mean the term "plural". The term "one or more" or the term "at least one" may be used interchangeably with "plural".

Below, the terms to be used in embodiments will be described.

Encoder: An encoder denotes a device for performing encoding. That is, an encoder may mean an encoding apparatus.

Decoder: A decoder denotes a device for performing decoding. That is, a decoder may mean a decoding apparatus.

Unit: A unit may denote the unit of image encoding and decoding. The terms "unit" and "block" may be used to have the same meaning, and may be used interchangeably with each other.

A unit may be an M×N array of samples. Each of M and N may be a positive integer. A unit may typically mean an array of samples in the form of two-dimensions.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc. For example, a target unit, which is the target of encoding and/or decoding, may be at least one of a CU, a PU, a residual unit, and a TU.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may mean an extent to which the unit is partitioned. Further, the depth of the unit may indicate the level at which the corresponding unit is present when unit(s) are represented by a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest. The root node may be the highest (top) node. The leaf node may be a lowest node.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. A quad tree may mean a quarternary tree. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

A neighbor block may mean a reconstructed neighbor block.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction mode: The prediction mode may be information indicating the mode used for intra prediction, or the mode used for inter prediction.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighbor unit: A reconstructed neighbor unit may be a unit which has already been decoded and reconstructed neighboring a target unit.

A reconstructed neighbor unit may be a unit that is spatially adjacent to the target unit or that is temporally adjacent to the target unit.

A reconstructed spatial neighbor unit may be a unit which is included in a target picture and which has already been reconstructed through encoding and/or decoding. A reconstructed temporal neighbor unit may be a unit which is included in a reference image and which has already been reconstructed through encoding and/or decoding. The location of the reconstructed temporal neighbor unit in the reference image may be identical to that of the target unit in the target picture, or may correspond to the location of the target unit in the target picture. Also, a reconstructed temporal neighbor unit may be a block neighboring the corresponding block in a reference image. Here, the location of the corresponding block in the reference image may correspond to the location of the target block in the target image. Here, the fact that the locations of blocks correspond to each other may mean that the locations of the blocks are identical to each other, may mean that one block is included in another block, or may mean that one block occupies a specific location in another block.

Sub-picture: A picture may be divided into one or more sub-pictures. A sub-picture may be composed of one or more tile rows and one or more tile columns.

A sub-picture may be a region having a square shape or a rectangular (i.e., a non-square rectangular) shape in a picture. Further, a sub-picture may include one or more CTUs.

A sub-picture may be a rectangular region of one or more slices in a picture.

One sub-picture may include one or more tiles, one or more bricks, and/or one or more slices.

Tile: A tile may be a region having a square shape or rectangular (i.e., a non-square rectangular) shape in a picture.

A tile may include one or more CTUs.

A tile may be partitioned into one or more bricks.

Brick: A brick may denote one or more CTU rows in a tile.

A tile may be partitioned into one or more bricks. Each brick may include one or more CTU rows.

A tile that is not partitioned into two parts may also denote a brick.

Slice: A slice may include one or more tiles in a picture. Alternatively, a slice may include one or more bricks in a tile.

A sub-picture may contain one or more slices that collectively cover a rectangular region of a picture. Consequently, each sub-picture boundary is also always a slice boundary, and each vertical sub-picture boundary is always also a vertical tile boundary.

Parameter set: A parameter set may correspond to header information in the internal structure of a bitstream.

A parameter set may include at least one of a video parameter set (VPS), a sequence parameter set (SPS), a picture parameter set (PPS), an adaptation parameter set (APS), a decoding parameter set (DPS), etc.

Information signaled through each parameter set may be applied to pictures which refer to the corresponding parameter set. For example, information in a VPS may be applied to pictures which refer to the VPS. Information in an SPS may be applied to pictures which refer to the SPS. Information in a PPS may be applied to pictures which refer to the PPS.

Each parameter set may refer to a higher parameter set. For example, a PPS may refer to an SPS. An SPS may refer to a VPS.

Further, a parameter set may include a tile group, slice header information, and tile header information. The tile group may be a group including multiple tiles. Also, the meaning of "tile group" may be identical to that of "slice".

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the equation "D+$\lambda$*R". Generally, a combination enabling the rate-distortion cost to be minimized may be selected as the optimal combination in the rate-distortion optimization scheme.

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference pictures used to generate a prediction unit of a target unit. Alternatively, the inter-prediction indicator may denote the number of prediction blocks used for inter prediction or motion compensation of a target unit.

Prediction list utilization flag: A prediction list utilization flag may indicate whether a prediction unit is generated using at least one reference picture in a specific reference picture list.

An inter-prediction indicator may be derived using the prediction list utilization flag. In contrast, the prediction list utilization flag may be derived using the inter-prediction indicator. For example, the case where the prediction list utilization flag indicates "0", which is a first value, may indicate that, for a target unit, a prediction block is not generated using a reference picture in a reference picture list. The case where the prediction list utilization flag indicates "1", which is a second value, may indicate that, for a target unit, a prediction unit is generated using the reference picture list.

Reference picture index: A reference picture index may be an index indicating a specific reference picture in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as (mvx, mvy). mvx may indicate a horizontal component, and mvy may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using one or more merge candidates.

Merge candidate: A merge candidate may be a spatial merge candidate, a temporal merge candidate, a combined merge candidate, a combined bi-prediction merge candidate, a history based merge candidate, an average merge candidate based on an average of two merge candidates, a zero-merge candidate, etc. A merge candidate may include an inter-prediction indicator, and may include motion information such as prediction type information, a reference picture index for each list, a motion vector, a prediction list utilization flag, and an inter-prediction indicator.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple sub-transform units having a smaller size. Here, a transform may include one or more of a primary transform and a secondary transform, and an inverse transform may include one or more of a primary inverse transform and a secondary inverse transform.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter may mean a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may mean a quantization matrix to be signaled from the encoding apparatus to the decoding apparatus by a user.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM use indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium by an encoding apparatus. Information signaled by an encoding apparatus may be used by a decoding apparatus.

Signaling of information may be performed at a specific level. For example, the information may be signaled at levels corresponding to one or more of a pixel level, a slice level, a tile level, and a block level. When the information is signaled at the level of a specific target, the information may be applied to the specific target.

Signaling of information may be performed through a specific parameter set. For example, the specific parameter set may indicate one or more of VPS, SPS, PPS, APS, and DPS. When the specific parameter set includes information, the information may be applied to a target to which the specific parameter set is applied.

The encoding apparatus may generate encoded information by performing encoding on information to be signaled. The encoded information may be transmitted from the encoding apparatus to the decoding apparatus. The decoding apparatus may obtain information by decoding the transmitted encoded information. Here, the encoding may be entropy encoding, and the decoding may be entropy decoding.

Selective Signaling: Information may be signaled selectively. A selective signaling FOR information may mean that an encoding apparatus selectively includes information (according to a specific condition) in a bitstream or a recording medium. Selective signaling for information may mean that a decoding apparatus selectively extracts information from a bitstream (according to a specific condition).

Omission of signaling: Signaling for information may be omitted. Omission of signaling for information on information may mean that an encoding apparatus does not include information (according to a specific condition) in a bitstream or a recording medium. Omission of signaling for information may mean that a decoding apparatus does not extract information from a bitstream (according to a specific condition).

Statistic value: A variable, a coding parameter, a constant, etc. may have values that can be calculated. The statistic value may be a value generated by performing calculations (operations) on the values of specified targets. For example, the statistic value may indicate one or more of the average, weighted average, weighted sum, minimum value, maximum value, mode, median value, and interpolated value of the values of a specific variable, a specific coding parameter, a specific constant, or the like.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode. In other words, a prediction mode for a target block may be one of an intra mode and an inter mode.

Hereinafter, the terms "intra mode", "intra-prediction mode", "intra-picture mode" and "intra-picture prediction mode" may be used to have the same meaning, and may be used interchangeably with each other.

Hereinafter, the terms "inter mode", "inter-prediction mode", "inter-picture mode" and "inter-picture prediction mode" may be used to have the same meaning, and may be used interchangeably with each other.

Hereinafter, the term "image" may indicate only part of an image, or may indicate a block. Also, the processing of an "image" may indicate sequential processing of multiple blocks.

Further, the encoding apparatus 100 may generate a bitstream, including encoded information, via encoding on the target image, and may output and store the generated bitstream. The generated bitstream may be stored in a computer-readable storage medium and may be streamed through a wired and/or wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual block for the target block using a residual between the target block and the prediction block.

When the prediction mode is the intra mode, the intra-prediction unit 120 may use pixels of previously encoded/decoded neighbor blocks adjacent to the target block as reference samples. The intra-prediction unit 120 may perform spatial prediction on the target block using the reference samples, and may generate prediction samples for the target block via spatial prediction, the prediction samples may mean samples in the prediction block.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area. Here, the motion-prediction unit may use a search range as a target area for searching.

The reference image may be stored in the reference picture buffer 190. More specifically, an encoded and/or decoded reference image may be stored in the reference picture buffer 190 when the encoding and/or decoding of the reference image have been processed.

Since a decoded picture is stored, the reference picture buffer 190 may be a Decoded Picture Buffer (DPB).

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighbor block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of a size of a unit/block, a shape/form of a unit/block, a depth of a unit/block, partition information of a unit/block, a partition structure of a unit/block, information indicating whether a unit/block is partitioned in a quad-tree structure, information indicating whether a unit/block is partitioned in a binary tree structure, a partitioning direction of a binary tree structure (horizontal direction or vertical direction), a partitioning form of a binary tree structure (symmetrical partitioning or asymmetrical partitioning), information indicating whether a unit/block is partitioned in a ternary tree structure, a partitioning direction of a ternary tree structure (horizontal direction or vertical direction), a partitioning form of a ternary tree structure (symmetrical partitioning or asymmetrical partitioning, etc.), information indicating whether a unit/block is partitioned in a multi-type tree structure, a combination and a direction (horizontal direction or vertical direction, etc.) of a partitioning of the multi-type tree structure, a partitioning form of a multi-type tree structure (symmetrical partitioning or asymmetrical partitioning, etc.), a partitioning tree (a binary tree or a ternary tree) of the multi-type tree form, a type of a prediction (intra prediction or inter prediction), an intra-prediction mode/direction, an intra luma prediction mode/ direction, an intra chroma prediction mode/direction, an intra partitioning information, an inter partitioning information, a coding block partitioning flag, a prediction block partitioning flag, a transform block partitioning flag, a reference sample filtering method, a reference sample filter tap, a reference sample filter coefficient, a prediction block filtering method, a prediction block filter tap, a prediction block filter coefficient, a prediction block boundary filtering method, a prediction block boundary filter tap, a prediction block boundary filter coefficient, an inter-prediction mode, motion information, a motion vector, a motion vector difference, a reference picture index, an inter-prediction direction, an inter-prediction indicator, a prediction list utilization flag, a reference picture list, a reference image, a POC, a motion vector predictor, a motion vector prediction index, a motion vector prediction candidate, a motion vector candidate list, information indicating whether a merge mode is used, a merge index, a merge candidate, a merge candidate list, information indicating whether a skip mode is used, a type of an interpolation filter, a tap of an interpolation filter, a filter coefficient of an interpolation filter, a magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating a presence or absence of a residual signal, a coded block pattern, a coded block flag, a quantization parameter, a residual quantization parameter, a quantization matrix, information about an intra-loop filter, information indicating whether an intra-loop filter is applied, a coefficient of an intra-loop filter, a tap of an intra-loop filter, a shape/form of an intra-loop filter, information indicating whether a deblocking filter is applied, a coefficient of a deblocking filter, a tap of a deblocking filter, deblocking filter strength, a shape/form of a deblocking filter, information indicating whether an adaptive sample offset is applied, a value of an adaptive sample offset, a category of an adaptive sample offset, a type of an adaptive sample offset, information indicating whether an adaptive in-loop filter is applied, a coefficient of an adaptive in-loop filter, a tap of an adaptive in-loop filter, a shape/form of an adaptive in-loop filter, a binarization/inverse binarization method, a context model, a context model decision method, a context model update method, information indicating whether a regular mode is performed, information whether a bypass mode is performed, a significant coefficient flag, a last significant coefficient flag, a coding flag for a coefficient group, a position of a last significant coefficient, information indicating whether a value of a coefficient is greater than 1, information indicating whether a value of a coefficient is greater than 2, information indicating whether a value of a coefficient is greater than 3, a remaining coefficient value information, a sign information, a reconstructed luma sample, a reconstructed chroma sample, a context bin, a bypass bin, a residual luma sample, a residual chroma sample, a transform coefficient, a luma transform coefficient, a chroma transform coefficient, a quantized level, a luma quantized level, a chroma quantized level, a transform coefficient level, a transform coefficient level scanning method, a size of a motion vector search region on a side of a decoding apparatus, a shape/form of a motion vector search region on a side of a decoding apparatus, the number of a motion vector search on a side of a decoding apparatus, a size of a CTU, a minimum block size, a maximum block size, a maximum block depth, a minimum block depth, an image display/output order, slice identification information, a slice type, slice partition information, tile group identification information, a tile group type, a tile group partitioning information, tile identification information, a tile type, tile partitioning information, a picture type, bit depth, input sample bit depth, reconstructed sample bit depth, residual sample bit depth, transform coefficient bit depth, quantized level bit depth, information about a luma signal, information about a chroma signal, a color space of a target block and a color space of a residual block. Further, the above-described coding parameter-related information may also be included in the coding parameter. Information used to calculate and/or derive the above-described coding parameter may also be included in the coding parameter. Information calculated or derived using the above-described coding parameter may also be included in the coding parameter.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling information may mean that the encoding apparatus 100 includes an entropy-encoded information, generated by performing entropy encoding a flag or an index, in a bitstream, and that the decoding apparatus 200 acquires information by performing entropy decoding on the entropy-encoded information, extracted from the bitstream. Here, the information may comprise a flag, an index, etc.

A signal may mean information to be signaled. Hereinafter, information for an image and a block may be referred to as a signal. Further, hereinafter, the terms "information" and "signal" may be used to have the same meaning and may be used interchangeably with each other. For example, a specific signal may be a signal representing a specific block. An original signal may be a signal representing a target block. A prediction signal may be a signal representing a prediction block. A residual signal may be a signal representing a residual block.

A bitstream may include information based on a specific syntax. The encoding apparatus 100 may generate a bitstream including information depending on a specific syntax. The decoding apparatus 200 may acquire information from the bitstream depending on a specific syntax.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate an inversely quantized and inversely transformed coefficient by performing inverse transform for the inversely quantized coefficient.

The inversely quantized and inversely transformed coefficient may be added to the prediction block by the adder 175. The inversely quantized and inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block. Here, the reconstructed block may mean a recovered block or a decoded block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to a reconstructed sample, the reconstructed block or a reconstructed picture. The filter unit 180 may also be referred to as an "in-loop filter".

The deblocking filter may eliminate block distortion occurring at the boundaries between blocks in a reconstructed picture. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, one or more filters of a long-tap filter, a strong filter, a weak filter and Gaussian filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. information related to whether to apply an adaptive loop filter may be signaled for each CU. Such information may be signaled for a luma signal. The shapes and filter coefficients of ALFs applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190 as a reference picture. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction or a motion compensation.

Figure 2:
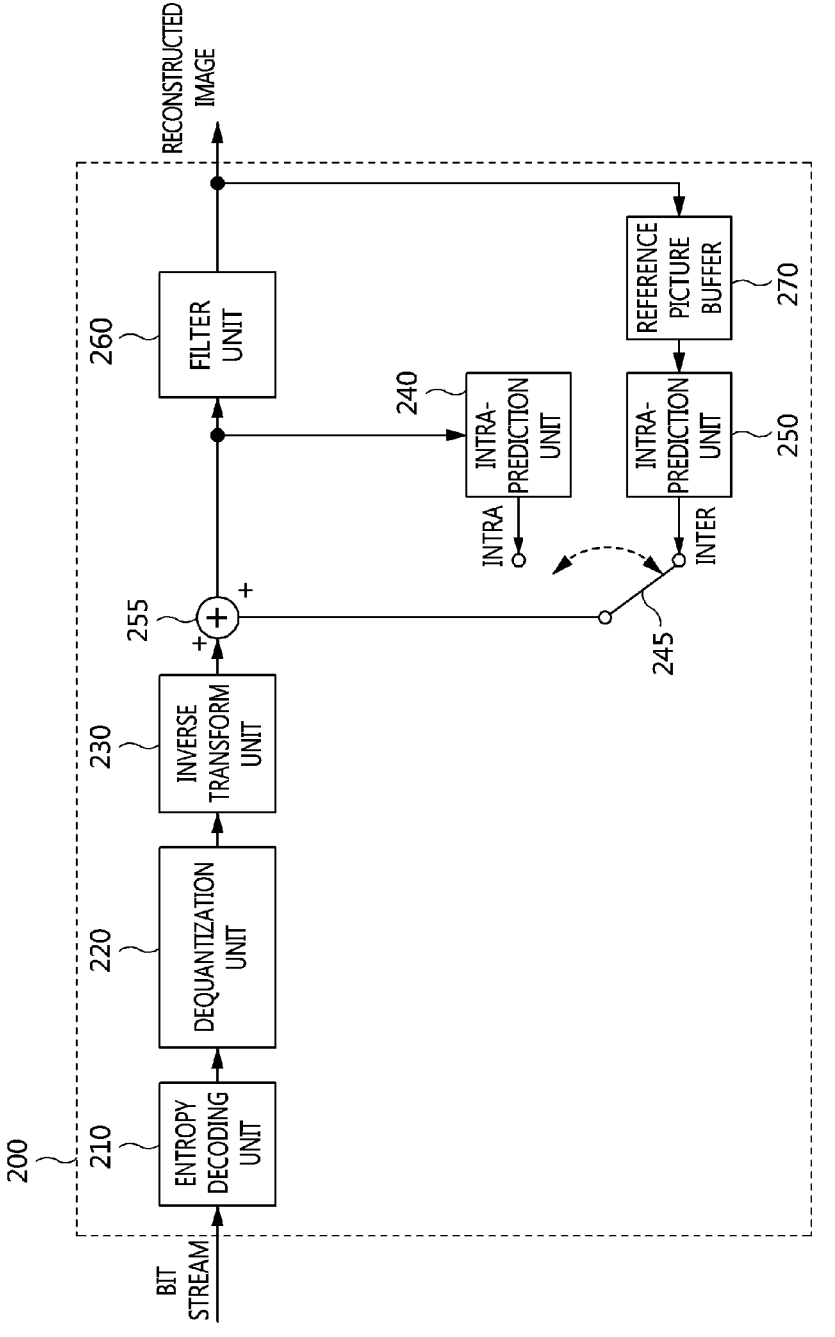
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block and the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighbor blocks adjacent to a target block for the target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270 for the target block.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The filter unit may output the reconstructed image.

The reconstructed image and/or the reconstructed block subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction or a motion compensation.

Figure 3:
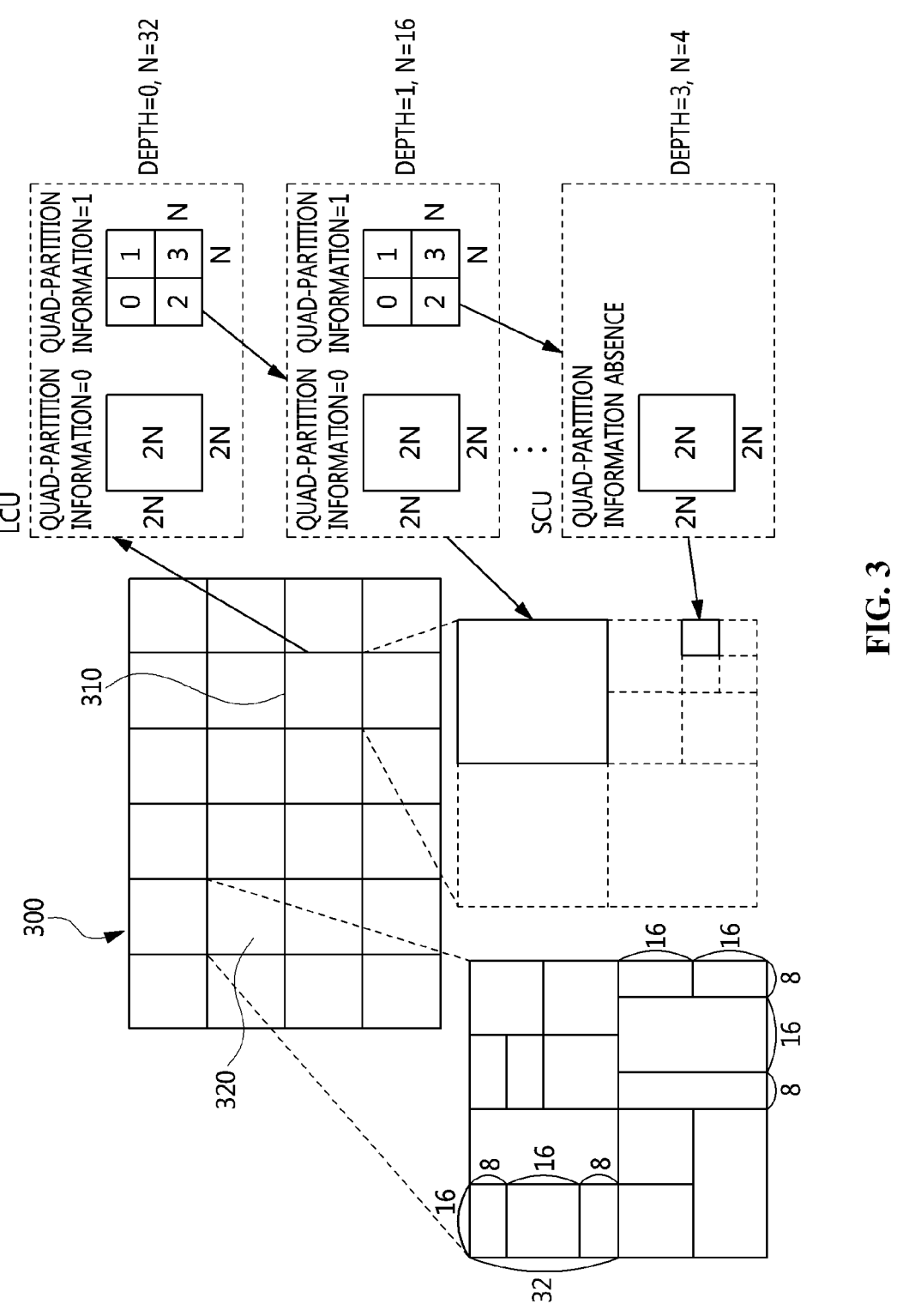
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into a plurality of sub-units while having depth information based on a tree structure.

Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc.

The horizontal size and the vertical size of each of CUs generated by the partitioning may be less than the horizontal size and the vertical size of a CU before being partitioned, depending on the number of CUs generated by partitioning. For example, the horizontal size and the vertical size of each of CUs generated by the partitioning may be half of the horizontal size and the vertical size of a CU before being partitioned.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size.

For example, the depth of a CU may have a value ranging from 0 to 3. The size of the CU may range from a size of 64×64 to a size of 8×8 depending on the depth of the CU.

For example, the depth of an LCU 310 may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be a first value. The value of the partition information of a CU that is partitioned may be a second value. When the partition information indicates whether a CU is partitioned or not, the first value may be "0" and the second value may be "1".

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure. In other words, it may be considered that a quad-tree partition has been applied to a CU.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure. In other words, it may be considered that a binary-tree partition has been applied to a CU.

For example, when a single CU is partitioned (or split) into three CUs, the original CU before being partitioned is partitioned so that the horizontal size or vertical size thereof is divided at a ratio of 1:2:1, thus enabling three sub-CUs to be generated. For example, when a CU having a 16×32 size is horizontally partitioned into three sub-CUs, the three sub-CUs resulting from the partitioning may have sizes of 16×8, 16×16, and 16×8, respectively, in a direction from the top to the bottom. For example, when a CU having a 32×32 size is vertically partitioned into three sub-CUs, the three sub-CUs resulting from the partitioning may have sizes of 8×32, 16×32, and 8×32, respectively, in a direction from the left to the right. When a single CU is partitioned into three CUs, it may be considered that the CU is partitioned in a ternary-tree form. In other words, it may be considered that a ternary-tree partition has been applied to the CU.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

The Coding Tree Unit (CTU) 320 in FIG. 3 is an example of a CTU to which all of a quad-tree partition, a binary-tree partition, and a ternary-tree partition are applied.

As described above, in order to partition a CTU, at least one of a quad-tree partition, a binary-tree partition, and a ternary-tree partition may be applied to the CTU. Partitions may be applied based on specific priority.

For example, a quad-tree partition may be preferentially applied to the CTU. A CU that cannot be partitioned in a quad-tree form any further may correspond to a leaf node of a quad-tree. A CU corresponding to the leaf node of the quad-tree may be a root node of a binary tree and/or a ternary tree. That is, the CU corresponding to the leaf node of the quad-tree may be partitioned in a binary-tree form or a ternary-tree form, or may not be partitioned any further. In this case, each CU, which is generated by applying a binary-tree partition or a ternary-tree partition to the CU corresponding to the leaf node of a quad-tree, is prevented from being subjected again to quad-tree partitioning, thus effectively performing partitioning of a block and/or signaling of block partition information.

The partition of a CU corresponding to each node of a quad-tree may be signaled using quad-partition information. Quad-partition information having a first value (e.g., "1") may indicate that the corresponding CU is partitioned in a quad-tree form. Quad-partition information having a second value (e.g., "0") may indicate that the corresponding CU is not partitioned in a quad-tree form. The quad-partition information may be a flag having a specific length (e.g., 1 bit).

Priority may not exist between a binary-tree partition and a ternary-tree partition. That is, a CU corresponding to the leaf node of a quad-tree may be partitioned in a binary-tree form or a ternary-tree form. Also, the CU generated through a binary-tree partition or a ternary-tree partition may be further partitioned in a binary-tree form or a ternary-tree form, or may not be partitioned any further.

Partitioning performed when priority does not exist between a binary-tree partition and a ternary-tree partition may be referred to as a "multi-type tree partition". That is, a CU corresponding to the leaf node of a quad-tree may be the root node of a multi-type tree. Partitioning of a CU corresponding to each node of the multi-type tree may be signaled using at least one of information indicating whether the CU is partitioned in a multi-type tree, partition direction information, and partition tree information. For partitioning of a CU corresponding to each node of a multi-type tree, information indicating whether partitioning in the multi-type tree is performed, partition direction information, and partition tree information may be sequentially signaled.

For example, information indicating whether a CU is partitioned in a multi-type tree and having a first value (e.g., "1") may indicate that the corresponding CU is partitioned in a multi-type tree form. Information indicating whether a CU is partitioned in a multi-type tree and having a second value (e.g., "0") may indicate that the corresponding CU is not partitioned in a multi-type tree form.

When a CU corresponding to each node of a multi-type tree is partitioned in a multi-type tree form, the corresponding CU may further include partition direction information.

The partition direction information may indicate the partition direction of the multi-type tree partition. Partition direction information having a first value (e.g., "1") may indicate that the corresponding CU is partitioned in a vertical direction. Partition direction information having a second value (e.g., "0") may indicate that the corresponding CU is partitioned in a horizontal direction.

When a CU corresponding to each node of a multi-type tree is partitioned in a multi-type tree form, the corresponding CU may further include partition-tree information. The partition-tree information may indicate the tree that is used for a multi-type tree partition.

For example, partition-tree information having a first value (e.g., "1") may indicate that the corresponding CU is partitioned in a binary-tree form. Partition-tree information having a second value (e.g., "0") may indicate that the corresponding CU is partitioned in a ternary-tree form.

Here, each of the above-described information indicating whether partitioning in the multi-type tree is performed, partition-tree information, and partition direction information may be a flag having a specific length (e.g., 1 bit).

At least one of the above-described quad-partition information, information indicating whether partitioning in the multi-type tree is performed, partition direction information, and partition-tree information may be entropy-encoded and/or entropy-decoded. In order to perform entropy encoding/decoding of such information, information of a neighbor CU adjacent to a target CU may be used.

For example, it may be considered that there is a high probability that the partition form of a left CU and/or an above CU (i.e., partitioning/non-partitioning, a partition tree and/or a partition direction) and the partition form of a target CU will be similar to each other. Therefore, based on the information of a neighbor CU, context information for entropy encoding and/or entropy decoding of the information of the target CU may be derived. Here, the information of the neighbor CU may include at least one of 1) quad-partition information of the neighbor CU, 2) information indicating whether the neighbor CU is partitioned in a multi-type tree, 3) partition direction information of the neighbor CU, and 4) partition-tree information of the neighbor CU.

In another embodiment, of a binary-tree partition and a ternary-tree partition, the binary-tree partition may be preferentially performed. That is, the binary-tree partition may be first applied, and then a CU corresponding to the leaf node of a binary tree may be set to the root node of a ternary tree. In this case, a quad-tree partition or a binary-tree partition may not be performed on the CU corresponding to the node of the ternary tree.

A CU, which is not partitioned any further through a quad-tree partition, a binary-tree partition, and/or a ternary-tree partition, may be the unit of encoding, prediction and/or transform. That is, the CU may not be partitioned any further for prediction and/or transform. Therefore, a partition structure for partitioning the CU into Prediction Units (PUs) and/or Transform Units (TUs), partition information thereof, etc. may not be present in a bitstream.

However, when the size of a CU, which is the unit of partitioning, is greater than the size of a maximum transform block, the CU may be recursively partitioned until the size of the CU becomes less than or equal to the size of the maximum transform block. For example, when the size of a CU is 64×64 and the size of the maximum transform block is 32×32, the CU may be partitioned into four 32×32 blocks so as to perform a transform. For example, when the size of a CU is 32×64 and the size of the maximum transform block is 32×32, the CU may be partitioned into two 32×32 blocks.

In this case, information indicating whether a CU is partitioned for a transform may not be separately signaled. Without signaling, whether a CU is partitioned may be determined via a comparison between the horizontal size (and/or vertical size) of the CU and the horizontal size (and/or vertical size) of the maximum transform block. For example, when the horizontal size of the CU is greater than the horizontal size of the maximum transform block, the CU may be vertically bisected. Further, when the vertical size of the CU is greater than the vertical size of the maximum transform block, the CU may be horizontally bisected.

Information about the maximum size and/or minimum size of a CU and information about the maximum size and/or minimum size of a transform block may be signaled or determined at a level higher than that of the CU. For example, the higher level may be a sequence level, a picture level, a tile level, a tile group level or a slice level. For example, the minimum size of the CU may be set to 4×4. For example, the maximum size of the transform block may be set to 64×64. For example, the maximum size of the transform block may be set to 4×4.

Information about the minimum size of a CU corresponding to the leaf node of a quad-tree (i.e., the minimum size of the quad-tree) and/or information about the maximum depth of a path from the root node to the leaf node of a multi-type tree (i.e., the maximum depth of a multi-type tree) may be signaled or determined at a level higher than that of the CU. For example, the higher level may be a sequence level, a picture level, a slice level, a tile group level or a tile level. Information about the minimum size of a quad-tree and/or information about the maximum depth of a multi-type tree may be separately signaled or determined at each of an intra-slice level and an inter-slice level.

Information about the difference between the size of a CTU and the maximum size of a transform block may be signaled or determined at a level higher than that of a CU. For example, the higher level may be a sequence level, a picture level, a slice level, a tile group level or a tile level. Information about the maximum size of a CU corresponding to each node of a binary tree (i.e., the maximum size of the binary tree) may be determined based on the size and the difference information of a CTU. The maximum size of a CU corresponding to each node of a ternary tree (i.e., the maximum size of the ternary tree) may have different values depending on the type of slice. For example, the maximum size of the ternary tree at an intra-slice level may be 32×32. For example, the maximum size of the ternary tree at an inter-slice level may be 128×128. For example, the minimum size of a CU corresponding to each node of a binary tree (i.e., the minimum size of the binary tree) and/or the minimum size of a CU corresponding to each node of a ternary tree (i.e., the minimum size of the ternary tree) may be set to the minimum size of a CU.

In a further example, the maximum size of a binary tree and/or the maximum size of a ternary tree may be signaled or determined at a slice level. Also, the minimum size of a binary tree and/or the minimum size of a ternary tree may be signaled or determined at a slice level.

Based on the above-described various block sizes and depths, quad-partition information, information indicating whether partitioning in a multi-type tree is performed, partition tree information and/or partition direction information may or may not be present in a bitstream.

For example, when the size of a CU is not greater than the minimum size of a quad-tree, the CU may not include quad-partition information, and quad-partition information of the CU may be inferred as a second value.

For example, when the size of a CU corresponding to each node of a multi-type tree (horizontal size and vertical size) is greater than the maximum size of a binary tree (horizontal size and vertical size) and/or the maximum size of a ternary tree (horizontal size and vertical size), the CU may not be partitioned in a binary-tree form and/or a ternary-tree form. By means of this determination manner, information indicating whether partitioning in a multi-type tree is performed may not be signaled, but may be inferred as a second value.

Alternatively, when the size of a CU corresponding to each node of a multi-type tree (horizontal size and vertical size) is equal to the minimum size of a binary tree (horizontal size and vertical size), or when the size of a CU (horizontal size and vertical size) is equal to twice the minimum size of a ternary tree (horizontal size and vertical size), the CU may not be partitioned in a binary tree form and/or a ternary tree form. By means of this determination manner, information indicating whether partitioning in a multi-type tree is performed may not be signaled, but may be inferred as a second value. The reason for this is that, when a CU is partitioned in a binary tree form and/or a ternary tree form, a CU smaller than the minimum size of the binary tree and/or the minimum size of the ternary tree is generated.

Alternatively, a binary-tree partition or a ternary-tree partition may be limited based on the size of a virtual pipeline data unit (i.e., the size of a pipeline buffer). For example, when a CU is partitioned into sub-CUs unsuitable for the size of a pipeline buffer through a binary-tree partition or a ternary-tree partition, a binary-tree partition or a ternary-tree partition may be limited. The size of the pipeline buffer may be equal to the maximum size of a transform block (e.g., 64×64).

For example, when the size of the pipeline buffer is 64×64, the following partitions may be limited.

Ternary-tree partition for N×M CU (where N and/or M are 128)

Horizontal binary-tree partition for 128×N CU (where N<=64)

Vertical binary-tree partition for N×128 CU (where N<=64)

Alternatively, when the depth of a CU corresponding to each node of a multi-type tree is equal to the maximum depth of the multi-type tree, the CU may not be partitioned in a binary-tree form and/or a ternary-tree form. By means of this determination manner, information indicating whether partitioning in a multi-type tree is performed may not be signaled, but may be inferred as a second value.

Alternatively, information indicating whether partitioning in a multi-type tree is performed may be signaled only when at least one of a vertical binary-tree partition, a horizontal binary-tree partition, a vertical ternary-tree partition, and a horizontal ternary-tree partition is possible for a CU corresponding to each node of a multi-type tree. Otherwise, the CU may not be partitioned in a binary-tree form and/or a ternary-tree form. By means of this determination manner, information indicating whether partitioning in a multi-type tree is performed may not be signaled, but may be inferred as a second value.

Alternatively, partition direction information may be signaled only when both a vertical binary-tree partition and a horizontal binary-tree partition are possible or only when both a vertical ternary-tree partition and a horizontal ternary-tree partition are possible, for a CU corresponding to each node of a multi-type tree. Otherwise, the partition direction information may not be signaled, but may be inferred as a value indicating the direction in which the CU can be partitioned.

Alternatively, partition tree information may be signaled only when both a vertical binary-tree partition and a vertical ternary-tree partition are possible or only when both a horizontal binary-tree partition and a horizontal ternary-tree partition are possible, for a CU corresponding to each node of a multi-type tree. Otherwise, the partition tree information may not be signaled, but may be inferred as a value indicating a tree that can be applied to the partition of the CU.

Figure 4:
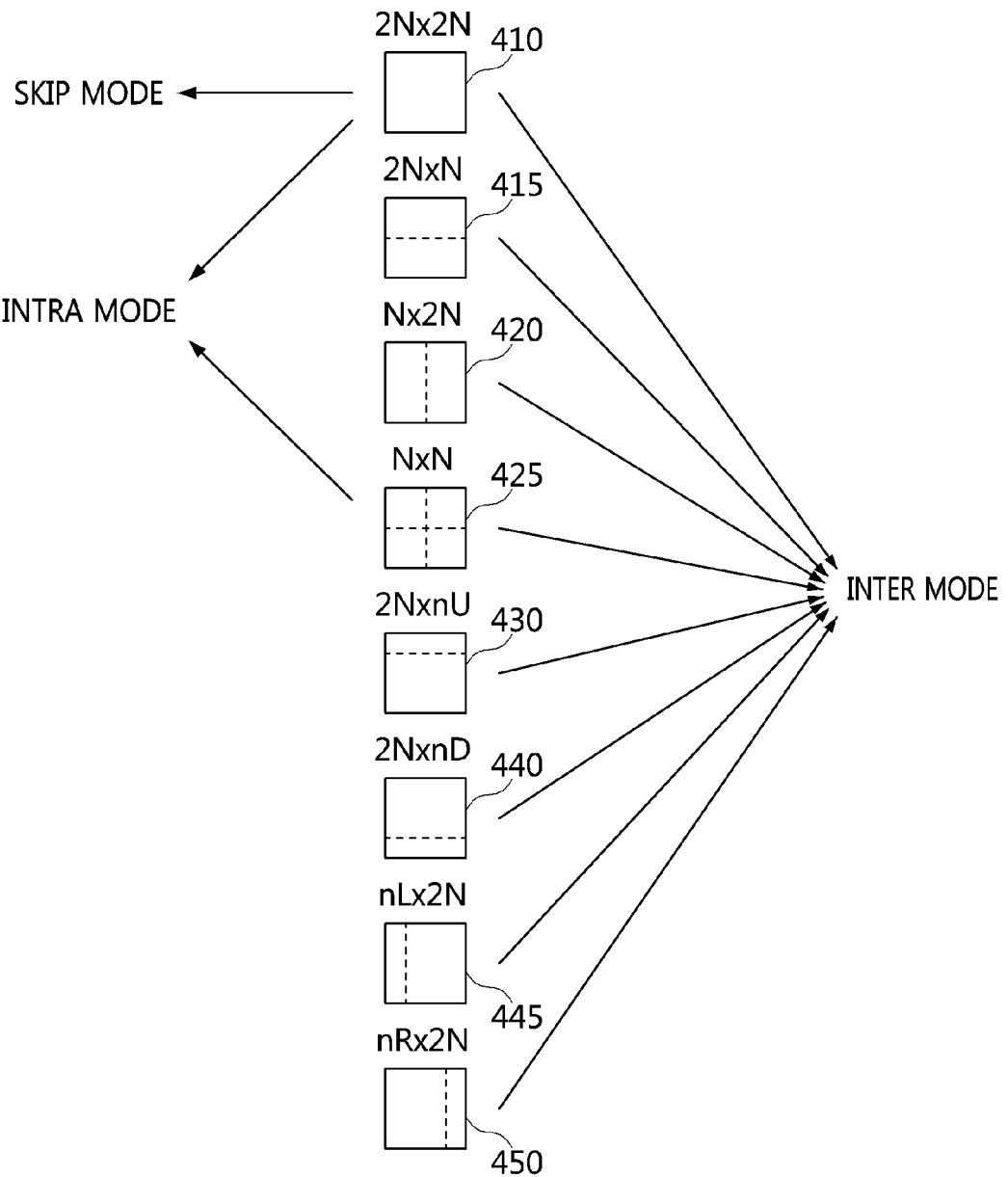
FIG. 4 is a diagram illustrating the form of a Prediction Unit (PU) that a Coding Unit (CU) can include.

FIG. 4 is a diagram illustrating the form of a Prediction Unit that a Coding Unit can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
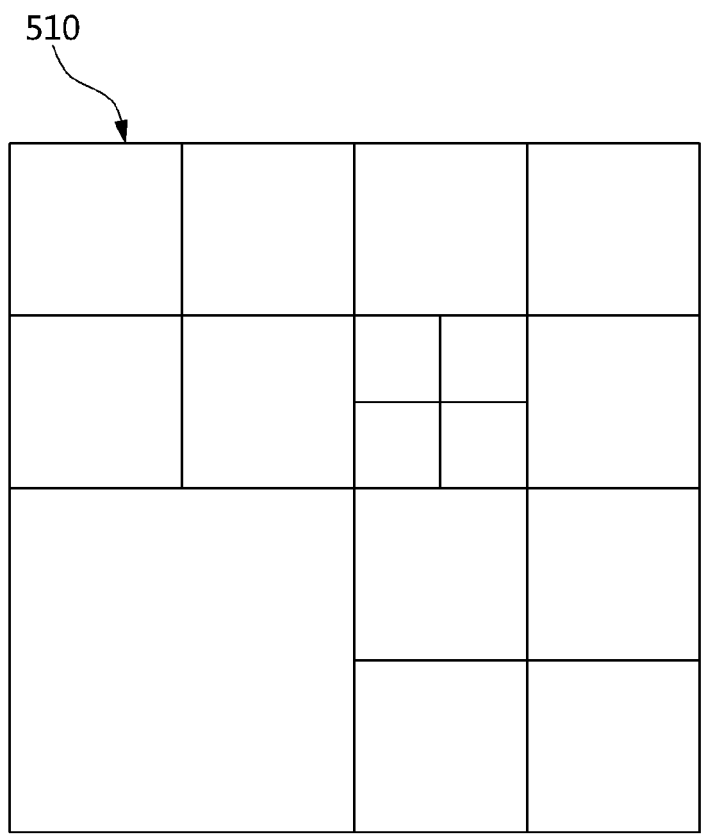
FIG. 5 is a diagram illustrating the form of a Transform Unit (TU) that can be included in a CU.

FIG. 5 is a diagram illustrating the form of a Transform Unit that can be included in a Coding Unit.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUS.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
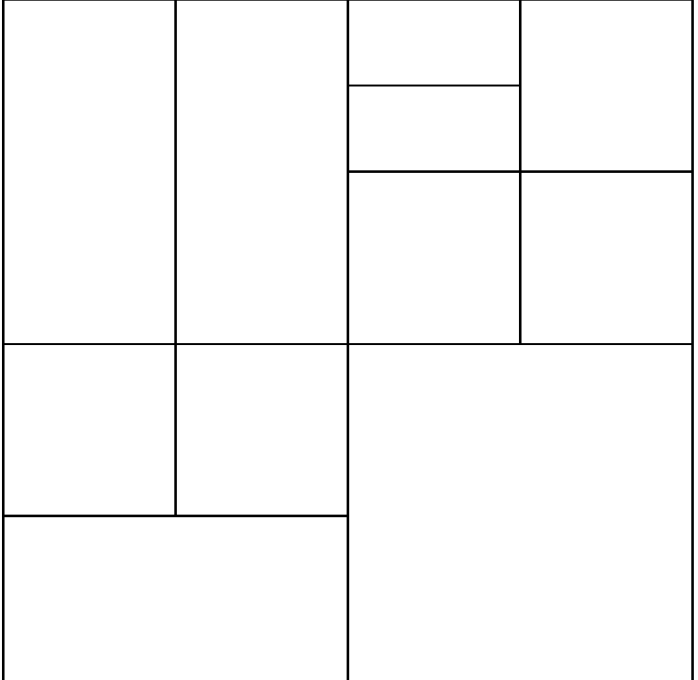
FIG. 6 illustrates splitting of a block according to an example.

FIG. 6 illustrates the splitting of a block according to an example.

In a video encoding and/or decoding process, a target block may be split, as illustrated in FIG. 6. For example, the target block may be a CU.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| 0 | | |
| | 0 | |
| 0 | | |
| | 0 | |
| 0 | | |
| | 1 | |
| | | 0 |
| | 1 | |
| | | 1 |
| | 0 | |
| | 0 | |
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |

TABLE 2-continued

| split_flag | QB_flag | Btype_flag |
| --- | --- | --- |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, a parameter, a tile group, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block is greater than the maximum size of a transform block, only partitioning in a quad-tree form may be possible. Here, a sub-block resulting from partitioning may be at least one of a CU and a TU.

In this case, split_flag may be a flag indicating whether a CU is partitioned in a quad-tree form.

When the size of a block falls within the specific range, only splitting in a binary tree form or a ternary tree form may be possible. For example, the specific range may be defined by at least one of a maximum block size and a minimum block size at which only splitting in a binary tree form or a ternary tree form is possible.

Information indicating the maximum block size and/or the minimum block size at which only splitting in a binary tree form or splitting in a ternary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form or a ternary tree form is performed.

The above description of partitioning in a quad-tree form may be equally applied to a binary-tree form and/or a ternary-tree form.

The partition of a block may be limited by a previous partition. For example, when a block is partitioned in a specific binary-tree form and then multiple sub-blocks are generated from the partitioning, each sub-block may be additionally partitioned only in a specific tree form. Here, the specific tree form may be at least one of a binary-tree form, a ternary-tree form, and a quad-tree form.

When the horizontal size or vertical size of a partition block is a size that cannot be split further, the above-described indicator may not be signaled.

Figure 7:
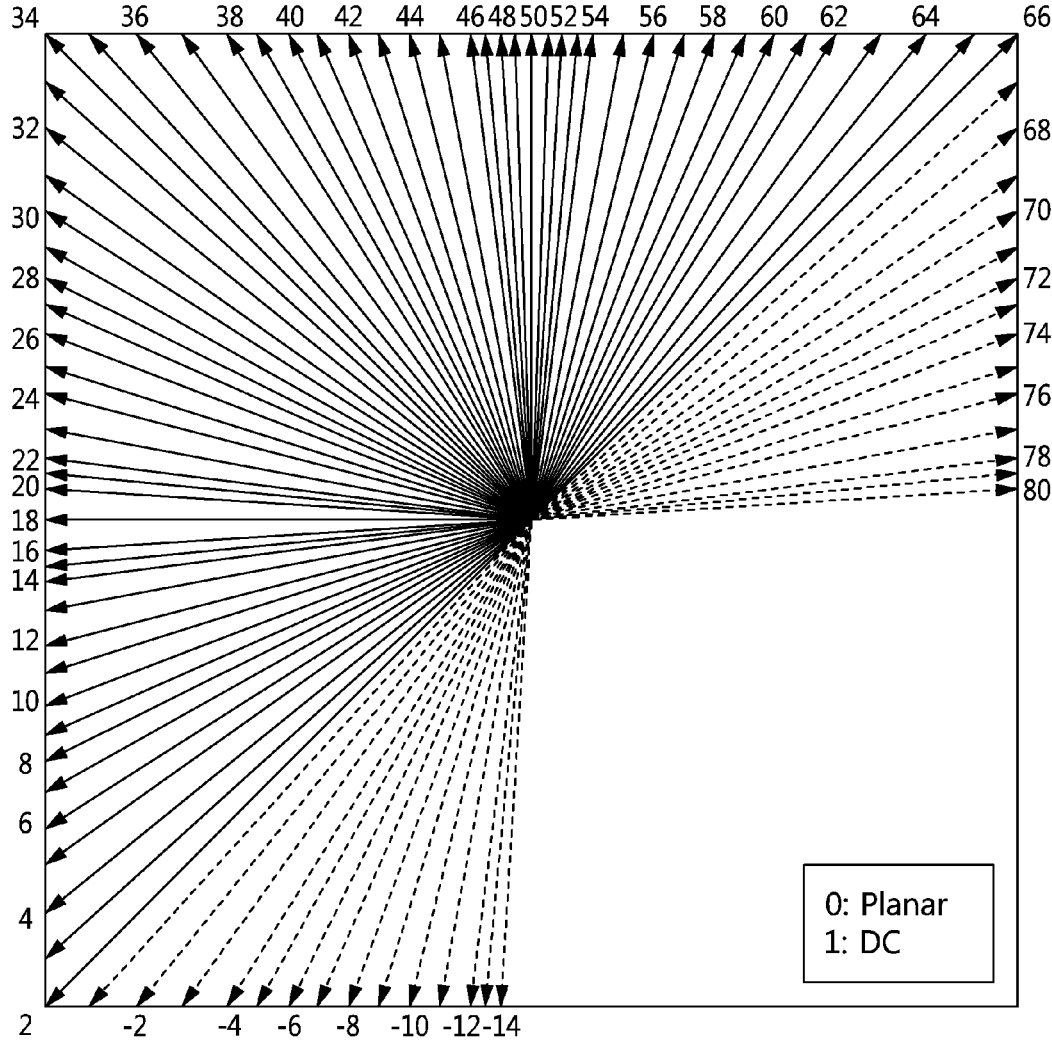
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

In FIG. 7, A number 0 may represent a Planar mode which is a non-directional intra prediction mode. A number 1 may represent a DC mode which is a non-directional intra prediction mode Intra encoding and/or decoding may be performed using a reference sample of neighbor block of a target block. The neighbor block may be a reconstructed neighbor block. The reference sample may mean a neighbor sample.

For example, intra encoding and/or decoding may be performed using the value of a reference sample which are included in are reconstructed neighbor block or the coding parameters of the reconstructed neighbor block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc. Further, the attribute of a prediction block may indicate a coding parameter for the prediction block.

For example, the number of intra-prediction modes may be fixed at N regardless of the size of a prediction block. Alternatively, the number of intra-prediction modes may be, for example, 3, 5, 9, 17, 34, 35, 36, 65, 67 or 95.

The intra-prediction modes may be non-directional modes or directional modes.

For example, the intra-prediction modes may include two non-directional modes and 65 directional modes corresponding to numbers 0 to 66 illustrated in FIG. 7.

For example, the intra-prediction modes may include two non-directional modes and 93 directional modes corresponding to numbers −14 to 80 illustrated in FIG. 7 in a case that a specific intra prediction method is used.

The two non-directional modes may include a DC mode and a planar mode.

A directional mode may be a prediction mode having a specific direction or a specific angle. The directional mode may also be referred to as an "angular mode".

An intra-prediction mode may be represented by at least one of a mode number, a mode value, a mode angle, and a mode direction. In other words, the terms "(mode) number of the intra-prediction mode", "(mode) value of the intra-prediction mode", "(mode) angle of the intra-prediction mode", and "(mode) direction of the intra-prediction mode" may be used to have the same meaning, and may be used interchangeably with each other.

The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size and/or the color component of a block. For example, the number of intra-prediction modes may be fixed at any one of 35 and 67 regardless of the size of a block.

Alternatively, the number of intra-prediction modes may differ depending on the shape, the size and/or the type of the color component of a block.

For example, in FIG. 7, directional prediction modes illustrated as dashed lines may be applied only for a prediction for a non-square block.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 50, prediction may be performed in a vertical direction based on the pixel value of a reference sample. For example, in a horizontal mode having a mode value of 18, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 51, 52, 53, 54, 55, 56, 57, 58, 59, 60, 61, 62, 63, 64, 65, and 66 may be vertical-right modes. Intra-prediction modes in which a mode value is one of 2, 3, 4, 5, 6, 7, 8, 9, 10, 11, 12, 13, 14, 15, 16, and 17 may be horizontal-below modes.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighbor block can be used as reference samples of a target block may be performed. When a sample that cannot be used as a reference sample of the target block is present among samples in the neighbor block, a value generated via copying and/or interpolation that uses at least one sample value, among the samples included in the reconstructed neighbor block, may replace the sample value of the sample that cannot be used as the reference sample. When the value generated via copying and/or interpolation replaces the sample value of the existing sample, the sample may be used as the reference sample of the target block.

When intra prediction is used, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the length of filter tap, the value of a filter coefficient, and filter strength. The length of filter tap may mean the number of filter taps. Also, the number of filter tap may mean the length of the filter.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighbor block adjacent to the target block, and the information used for prediction may be entropy-encoded/decoded.

For example, when the intra-prediction modes of the target block and the neighbor block are identical to each other, it may be signaled, using a predefined flag, that the intra-prediction modes of the target block and the neighbor block are identical.

For example, an indicator for indicating an intra-prediction mode identical to that of the target block, among intra-prediction modes of multiple neighbor blocks, may be signaled.

When the intra-prediction modes of the target block and a neighbor block are different from each other, information about the intra-prediction mode of the target block may be encoded and/or decoded using entropy encoding and/or decoding.

Figure 8:
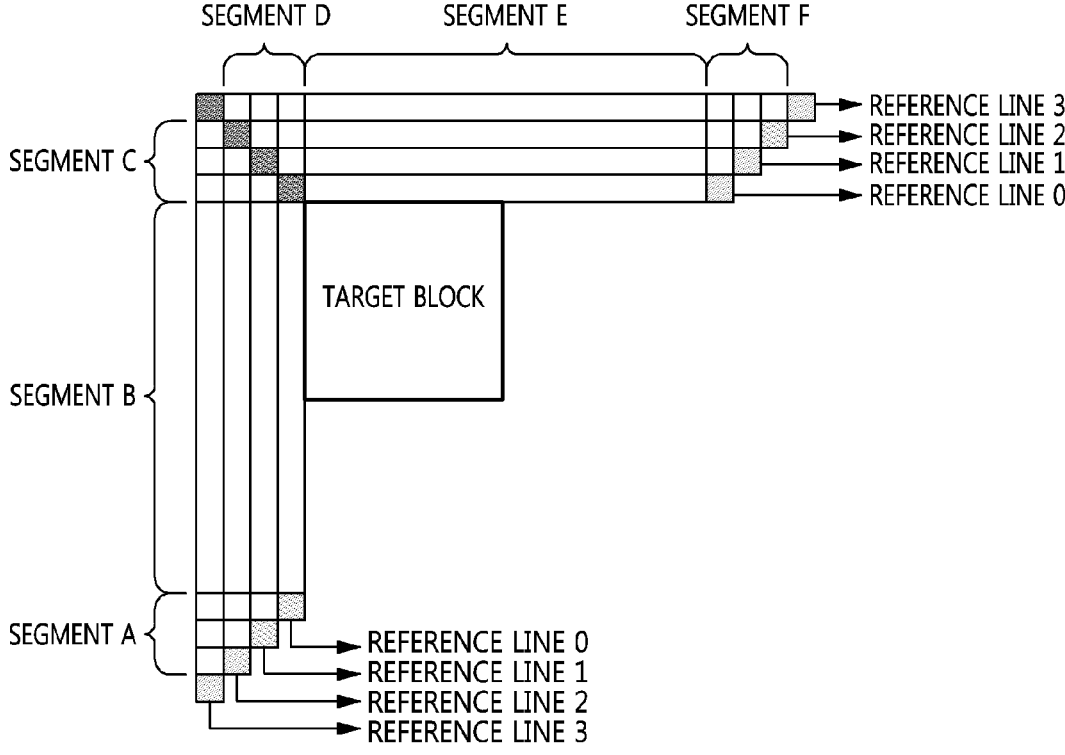
FIG. 8 is a diagram illustrating reference samples used in an intra-prediction procedure.

FIG. 8 is a diagram illustrating reference samples used in an intra-prediction procedure.

Reconstructed reference samples used for intra prediction of the target block may include below-left reference samples, left reference samples, an above-left corner reference sample, above reference samples, and above-right reference samples.

For example, the left reference samples may mean reconstructed reference pixels adjacent to the left side of the target block. The above reference samples may mean reconstructed reference pixels adjacent to the top of the target block. The above-left corner reference sample may mean a reconstructed reference pixel located at the above-left corner of the target block. The below-left reference samples may mean reference samples located below a left sample line composed of the left reference samples, among samples located on the same line as the left sample line. The above-right reference samples may mean reference samples located to the right of an above sample line composed of the above reference samples, among samples located on the same line as the above sample line.

When the size of a target block is N×N, the numbers of the below-left reference samples, the left reference samples, the above reference samples, and the above-right reference samples may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode, the above reference samples may be used for intra prediction. When the intra-prediction mode is the vertical mode, the value of a pixel in the prediction block may be the value of a reference sample vertically located above the location of the pixel. Therefore, the above reference samples adjacent to the top of the target block may be used for intra prediction. Furthermore, the values of pixels in one row of the prediction block may be identical to those of the above reference samples.

In an example, when the intra-prediction mode of a target block is a horizontal mode, the left reference samples may be used for intra prediction. When the intra-prediction mode is the horizontal mode, the value of a pixel in the prediction block may be the value of a reference sample horizontally located left to the location of the pixel. Therefore, the left reference samples adjacent to the left of the target block may be used for intra prediction. Furthermore, the values of pixels in one column of the prediction block may be identical to those of the left reference samples.

In an example, when the mode value of the intra-prediction mode of the current block is 34, at least some of the left reference samples, the above-left corner reference sample, and at least some of the above reference samples may be used for intra prediction. When the mode value of the intra-prediction mode is 34, the value of a pixel in the prediction block may be the value of a reference sample diagonally located at the above-left corner of the pixel.

Further, At least a part of the above-right reference samples may be used for intra prediction in a case that an intra prediction mode of which a mode value is a value ranging from 52 to 66.

Further, At least a part of the below-left reference samples may be used for intra prediction in a case that an intra prediction mode of which a mode value is a value ranging from 2 to 17.

Further, the above-left corner reference sample may be used for intra prediction in a case that an intra prediction mode of which a mode value is a value ranging from 19 to 49.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighbor blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

As illustrated in FIG. 8, for intra prediction of a target block, at least one of reference line 0 to reference line 3 may be used.

Each reference line in FIG. 8 may indicate a reference sample line comprising one or more reference samples. As the number of the reference line is lower, a line of reference samples closer to a target block may be indicated.

Samples in segment A and segment F may be acquired through padding that uses samples closest to the target block in segment B and segment E instead of being acquired from reconstructed neighbor blocks.

Index information indicating a reference sample line to be used for intra-prediction of the target block may be signaled. The index information may indicate a reference sample line to be used for intra-prediction of the target block, among multiple reference sample lines. For example, the index information may have a value corresponding to any one of 0 to 3.

When the top boundary of the target block is the boundary of a CTU, only reference sample line 0 may be available. Therefore, in this case, index information may not be signaled. When an additional reference sample line other than reference sample line 0 is used, filtering of a prediction block, which will be described later, may not be performed.

In the case of inter-color intra prediction, a prediction block for a target block of a second color component may be generated based on the corresponding reconstructed block of a first color component.

For example, the first color component may be a luma component, and the second color component may be a chroma component.

In order to perform inter-color intra prediction, parameters for a linear model between the first color component and the second color component may be derived based on a template.

The template may include reference samples above the target block (above reference samples) and/or reference samples to the left of the target block (left reference samples), and may include above reference samples and/or left reference samples of a reconstructed block of the first color component, which correspond to the reference samples.

For example, parameters for a linear model may be derived using 1) the value of the sample of a first color component having the maximum value, among the samples in the template, 2) the value of the sample of a second color component corresponding to the sample of the first color component, 3) the value of the sample of a first color component having the minimum value, among the samples in the template, and 4) the value of the sample of a second color component corresponding to the sample of the first color component.

When the parameters for the linear model are derived, a prediction block for the target block may be generated by applying the corresponding reconstructed block to the linear model.

Depending on the image format, sub-sampling may be performed on neighboring samples of the reconstructed block of the first color component and the corresponding reconstructed block of the first color component. For example, when one sample of the second color component corresponds to four samples of the first color component, one corresponding sample may be calculated by performing sub-sampling on the four samples of the first color component. When sub-sampling is performed, derivation of the parameters for the linear model and inter-color intra prediction may be performed based on the sub-sampled corresponding sample.

Information about whether inter-color intra prediction is performed and/or the range of the template may be signaled in an intra-prediction mode.

The target block may be partitioned into two or four sub-blocks in a horizontal direction and/or a vertical direction.

The sub-blocks resulting from the partitioning may be sequentially reconstructed. That is, as intra-prediction is performed on each sub-block, a sub-prediction block for the sub-block may be generated. Also, as dequantization (inverse quantization) and/or an inverse transform are performed on each sub-block, a sub-residual block for the corresponding sub-block may be generated. A reconstructed sub-block may be generated by adding the sub-prediction block to the sub-residual block. The reconstructed sub-block may be used as a reference sample for intra prediction of the sub-block having the next priority.

A sub-block may be a block including a specific number (e.g., 16) of samples or more. For example, when the target block is an 8×4 block or a 4×8 block, the target block may be partitioned into two sub-blocks. Also, when the target block is a 4×4 block, the target block cannot be partitioned into sub-blocks. When the target block has another size, the target block may be partitioned into four sub-blocks.

Information about whether intra prediction based on such sub-blocks is performed and/or information about a partition direction (horizontal direction or vertical direction) may be signaled.

Such sub-block-based intra prediction may be limited such that it is performed only when reference sample line 0 is used. When sub-block-based intra-prediction is performed, filtering of a prediction block, which will be described below, may not be performed.

A final prediction block may be generated by performing filtering on the prediction block generated via intra prediction.

Filtering may be performed by applying specific weights to a filtering target sample, which is the target to be filtered, a left reference sample, an above reference sample, and/or an above-left reference sample.

The weights and/or reference samples (e.g., the range of reference samples, the locations of the reference samples, etc.) used for filtering may be determined based on at least one of a block size, an intra-prediction mode, and the location of the filtering target sample in a prediction block.

For example, filtering may be performed only in a specific intra-prediction mode (e.g., DC mode, planar mode, vertical mode, horizontal mode, diagonal mode and/or adjacent diagonal mode).

The adjacent diagonal mode may be a mode having a number obtained by adding k to the number of the diagonal mode, and may be a mode having a number obtained by subtracting k from the number of the diagonal mode. In other words, the number of the adjacent diagonal mode may be the sum of the number of the diagonal mode and k, or may be the difference between the number of the diagonal mode and k. For example, k may be a positive integer of 8 or less.

The intra-prediction mode of the target block may be derived using the intra-prediction mode of a neighbor block adjacent to the target block, and such a derived intra-prediction mode may be entropy-encoded and/or entropy-decoded.

For example, when the intra-prediction mode of the target block is identical to the intra-prediction mode of the neighbor block, information indicating that the intra-prediction mode of the target block is identical to the intra-prediction mode of the neighbor block may be signaled using specific flag information.

Further, for example, indicator information for a neighbor block having an intra-prediction mode identical to the intra-prediction mode of the target block, among intra-prediction modes of multiple neighbor blocks, may be signaled.

For example, when the intra-prediction mode of the target block is different from the intra-prediction mode of the neighbor block, entropy encoding and/or entropy decoding may be performed on information about the intra-prediction mode of the target block by performing entropy encoding and/or entropy decoding based on the intra-prediction mode of the neighbor block.

Figure 9:
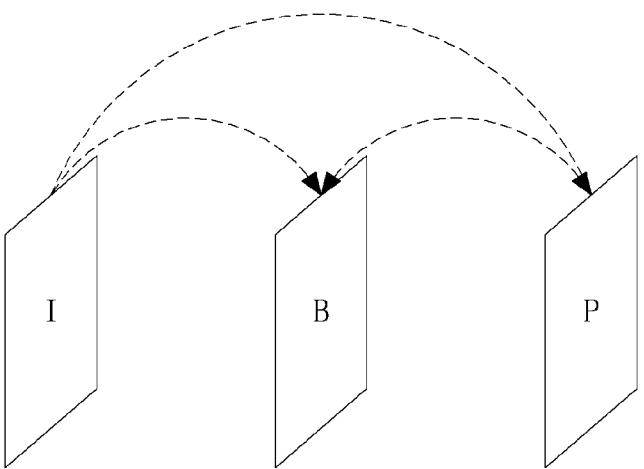
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. An arrow pointing from a first picture to a second picture means that the second picture refers to the first picture. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction or a motion compensation may be performed using a reference image and motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighbor block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighbor block that is horizontally adjacent to the target block, or a block horizontally adjacent to a neighbor block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a merge mode with a motion vector difference, a sub block merge mode, a triangle partition mode, an inter-intra combined prediction mode, an affine inter mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighbor region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighbor block. In other words, the motion vector of the reconstructed neighbor block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The encoding apparatus 100 may generate an entropy-encoded prediction motion vector index by applying entropy encoding to a prediction motion vector index, and may generate a bitstream including the entropy-encoded prediction motion vector index. The entropy-encoded prediction motion vector index may be signaled from the encoding apparatus 100 to the decoding apparatus 200 through a bitstream. The decoding apparatus 200 may extract the entropy-encoded prediction motion vector index from the bitstream, and may acquire the prediction motion vector index by applying entropy decoding to the entropy-encoded prediction motion vector index.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

A Motion Vector Difference (MVD) may be the difference between the motion vector of the target block and the prediction motion vector. The encoding apparatus 100 may calculate the MVD, and may generate an entropy-encoded MVD by applying entropy encoding to the MVD. The encoding apparatus 100 may generate a bitstream including the entropy-encoded MVD.

The MVD may be transmitted from the encoding apparatus 100 to the decoding apparatus 200 through the bitstream. The decoding apparatus 200 may extract the entropy-encoded MVD from the bitstream, and may acquire the MVD by applying entropy decoding to the entropy-encoded MVD.

The decoding apparatus 200 may derive the motion vector of the target block by summing the MVD and the prediction motion vector. In other words, the motion vector of the target block derived by the decoding apparatus 200 may be the sum of the MVD and the motion vector candidate.

Also, the encoding apparatus 100 may generate entropy-encoded MVD resolution information by applying entropy encoding to calculated MVD resolution information, and may generate a bitstream including the entropy-encoded MVD resolution information. The decoding apparatus 200 may extract the entropy-encoded MVD resolution information from the bitstream, and may acquire MVD resolution information by applying entropy decoding to the entropy-encoded MVD resolution information. The decoding apparatus 200 may adjust the resolution of the MVD using the MVD resolution information.

Meanwhile, the encoding apparatus 100 may calculate an MVD based on an affine model. The decoding apparatus 200 may derive the affine control motion vector of the target block through the sum of the MVD and an affine control motion vector candidate, and may derive the motion vector of a sub-block using the affine control motion vector.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture that is used for prediction of the target block, among reference pictures present in a reference picture list. The encoding apparatus 100 may generate an entropy-encoded reference picture index by applying entropy encoding to the reference picture index, and may generate a bitstream including the entropy-encoded reference picture index. The entropy-encoded reference picture index may be signaled from the encoding apparatus 100 to the decoding apparatus 200 through the bitstream. The decoding apparatus 200 may extract the entropy-encoded reference picture index from the bitstream, and may acquire the reference picture index by applying entropy decoding to the entropy-encoded reference picture index.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighbor blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighbor blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighbor units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighbor block.

When a merge mode is used, the encoding apparatus 100 may predict the motion information of a target block using the motion information of a spatial candidate and/or the motion information of a temporal candidate. The spatial candidate may include a reconstructed spatial neighbor block that is spatially adjacent to the target block. The spatial neighbor block may include a left neighbor block and an above neighbor block. The temporal candidate may include a col block.

The terms "candidate", "motion candidate" and "merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional. The reference direction may mean a inter prediction indicator.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. In other words, the merge candidates list may comprise motion information of a temporal candidates and/or spatial candidates, etc.

Further, the merge candidate list may include new merge candidates generated by a combination of merge candidates that are already present in the merge candidate list. In other words, the merge candidate list may include new motion information generated by a combination of pieces of motion information previously present in the merge candidate list.

Also, a merge candidate list may include history-based merge candidates. The history-based merge candidates may be the motion information of a block which is encoded and/or decoded prior to a target block.

Also, a merge candidate list may include a merge candidate based on an average of two merge candidates.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be uni-directional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100. The decoding apparatus 200 may extract entropy-encoded inter-prediction information from the bitstream, and may acquire inter-prediction information by applying entropy decoding to the entropy-encoded inter-prediction information.

The decoding apparatus 200 may perform inter prediction on the target block using the inter-prediction information of the bitstream.

The inter-prediction information may contain 1) mode information indicating whether a merge mode is used, 2) a merge index and 3) correction information.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighbor blocks spatially or temporally adjacent to the target block.

The encoding apparatus 100 may select a merge candidate having the highest encoding performance among the merge candidates included in the merge candidate list and set a value of the merge index to indicate the selected merge candidate.

Correction information may be information used to correct a motion vector. The encoding apparatus 100 may generate correction information. The decoding apparatus 200 may correct the motion vector of a merge candidate selected by a merge index based on the correction information.

The correction information may include at least one of information indicating whether correction is to be performed, correction direction information, and correction size information. A prediction mode in which the motion vector is corrected based on the signaled correction information may be referred to as a "merge mode having a motion vector difference".

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be the same as a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream. The decoding apparatus 200 may extract entropy-encoded information from the bitstream, and may acquire information by applying entropy decoding to the entropy-encoded information.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

5) Sub-Block Merge Mode

A sub-block merge mode may be a mode in which motion information is derived from the sub-block of a CU.

When the sub-block merge mode is applied, a sub-block merge candidate list may be generated using the motion information of a co-located sub-block (col-sub-block) of a target sub-block (i.e., a sub-block-based temporal merge candidate) in a reference image and/or an affine control point motion vector merge candidate.

6) Triangle Partition Mode

In a triangle partition mode, a target block may be partitioned in a diagonal direction, and sub-target blocks resulting from partitioning may be generated. For each sub-target block, motion information of the corresponding sub-target block may be derived, and a prediction sample for each sub-target block may be derived using the derived motion information. A prediction sample for the target block may be derived through a weighted sum of the prediction samples for the sub-target blocks resulting from the partitioning.

7) Combination Inter-Intra Prediction Mode

The combination inter-intra prediction mode may be a mode in which a prediction sample for a target block is derived using a weighted sum of a prediction sample generated via inter-prediction and a prediction sample generated via intra-prediction.

In the above-described modes, the decoding apparatus 200 may autonomously correct derived motion information. For example, the decoding apparatus 200 may search a specific area for motion information having the minimum sum of Absolute Differences (SAD) based on a reference block indicated by the derived motion information, and may derive the found motion information as corrected motion information.

In the above-described modes, the decoding apparatus 200 may compensate for the prediction sample derived via inter prediction using an optical flow.

In the above-described AMVP mode, merge mode, skip mode, etc., motion information to be used for prediction of the target block may be specified among pieces of motion information in a list using the index information of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
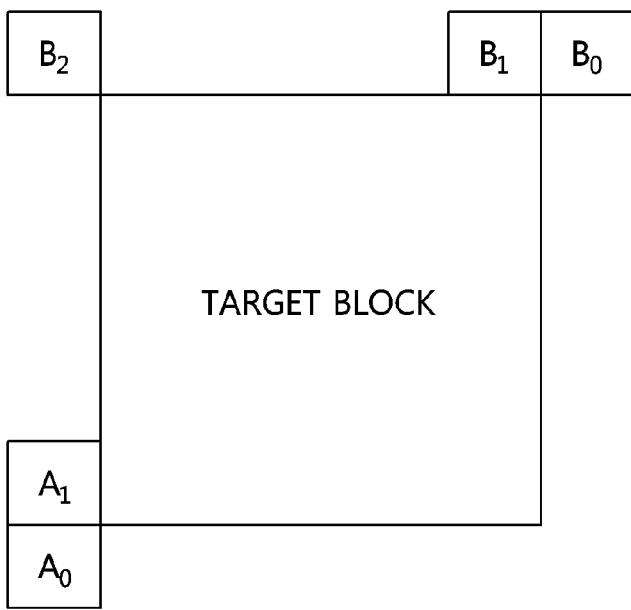
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH−1).

Spatial candidate $B_0$ may be a block adjacent to the above-right corner of the target block. $B_0$ may be a block that occupies pixels located at coordinates (xP+nPSW, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW−1, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
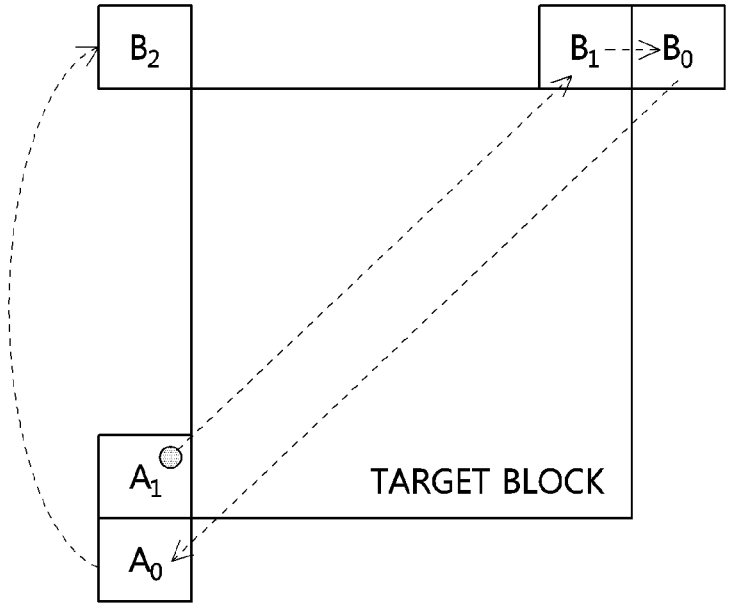
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to an L0 reference picture list. L1 motion information may be motion information that refers only to an L1 reference picture list.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
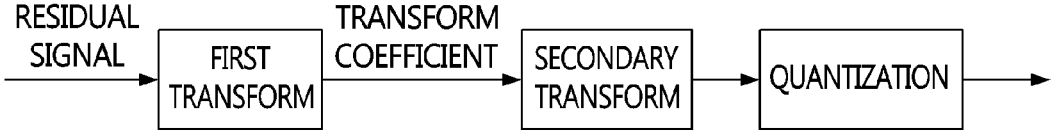
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in each of the following Table 3 and the following table 4.

TABLE 3

| Transform set | Transform candidates |
|---|---|
| 0 | DST-VII, DCT-VIII |
| 1 | DST-VII, DST-I |
| 2 | DST-VII, DCT-V |

TABLE 4

| Transform set | Transform candidates |
|---|---|
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra-prediction modes.

TABLE 5

| Intra-prediction mode | 0 | 1 | 2 | 3 | 4 | 5 | 6 | 7 | 8 | 9 |
|---|---|---|---|---|---|---|---|---|---|---|
| Vertical transform set | 2 | 1 | 0 | 1 | 0 | 1 | 0 | 1 | 0 | 1 |
| Horizontal transform set | 2 | 1 | 0 | 1 | 0 | 1 | 0 | 1 | 0 | 1 |
| Intra-prediction mode | 10 | 11 | 12 | 13 | 14 | 15 | 16 | 17 | 18 | 19 |
| Vertical transform set | 0 | 1 | 0 | 1 | 0 | 0 | 0 | 0 | 0 | 0 |
| Horizontal transform set | 0 | 1 | 0 | 1 | 2 | 2 | 2 | 2 | 2 | 2 |
| Intra-prediction mode | 20 | 21 | 22 | 23 | 24 | 25 | 26 | 27 | 28 | 29 |
| Vertical transform set | 0 | 0 | 0 | 1 | 0 | 1 | 0 | 1 | 0 | 1 |
| Horizontal transform set | 2 | 2 | 2 | 1 | 0 | 1 | 0 | 1 | 0 | 1 |
| Intra-prediction mode | 30 | 31 | 32 | 33 | 34 | 35 | 36 | 37 | 38 | 39 |
| Vertical transform set | 0 | 1 | 0 | 1 | 0 | 1 | 0 | 1 | 0 | 1 |
| Horizontal transform set | 0 | 1 | 0 | 1 | 0 | 1 | 0 | 1 | 0 | 1 |
| Intra-prediction mode | 40 | 41 | 42 | 43 | 44 | 45 | 46 | 47 | 48 | 49 |
| Vertical transform set | 0 | 1 | 0 | 1 | 0 | 1 | 2 | 2 | 2 | 2 |
| Horizontal transform set | 0 | 1 | 0 | 1 | 0 | 1 | 0 | 0 | 0 | 0 |
| Intra-prediction mode | 50 | 51 | 52 | 53 | 54 | 55 | 56 | 57 | 58 | 59 |
| Vertical transform set | 2 | 2 | 2 | 2 | 2 | 1 | 0 | 1 | 0 | 1 |
| Horizontal transform set | 0 | 0 | 0 | 0 | 0 | 1 | 0 | 1 | 0 | 1 |
| Intra-prediction mode | 60 | 61 | 62 | 63 | 64 | 65 | 66 | | | |
| Vertical transform set | 0 | 1 | 0 | 1 | 0 | 1 | 0 | | | |
| Horizontal transform set | 0 | 1 | 0 | 1 | 0 | 1 | 0 | | | |

In Table 5, numbers of vertical transform sets and horizontal transform sets that are to be applied to the horizontal direction of a residual signal depending on the intra-prediction modes of the target block are indicated.

As exemplified in FIGS. 4 and 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64 or less, transform sets, each having three transforms, may be configured depending on the intra-prediction modes. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

The transform may include at least one of a first transform and a secondary transform. A transform coefficient may be For example, the transform type may be determined based at least one of 1) a prediction mode of a target block (for example, one of an intra prediction and an inter prediction), 2) a size of a target block, 3) a shape of a target block, 4) an intra prediction mode of a target block, 5) a component of a target block (for example, one of a luma component an a chroma component), and 6) a partitioning type applied to a target block (for example, one of a Quad Tree, a Binary Tree and a Ternary Tree).

For example, the first transform may include transforms, such as DCT-2, DCT-5, DCT-7, DST-7, DST-1, DST-8, and DCT-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i$ (j) |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \sqrt{\dfrac{2}{N}}$ ($i = 0$) or 1 (otherwise) |
| DST-7 | $T_i(j) = \sqrt{\dfrac{4}{2N+1}} \cdot \sin\left(\dfrac{\pi \cdot (2j+1) \cdot (j+1)}{2N+1}\right)$ |
| DCT-5 | $T_i(j) = \omega_0 \cdot \omega_1 \cdot \sqrt{\dfrac{2}{2N-1}} \cdot \cos\left(\dfrac{2\pi \cdot i \cdot j}{2N+1}\right)$ where $\omega_{0/1} = \sqrt{\dfrac{2}{N}}$ ($i$ or $j = 0$) or 1 (otherwise) |
| DCT-8 | $T_i(j) = \sqrt{\dfrac{4}{2N+1}} \cdot \cos\left(\dfrac{\pi \cdot (2j+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ | generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various transform types depending on a kernel function that defines a Discrete Cosine Transform (DCT) or a Discrete Sine Transform (DST).

In Table 6, i and j may be integer values that are equal to or greater than 0 and are less than or equal to N−1.

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighbor block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighbor the target block.

Alternatively, transform information indicating a transform method for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200. Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
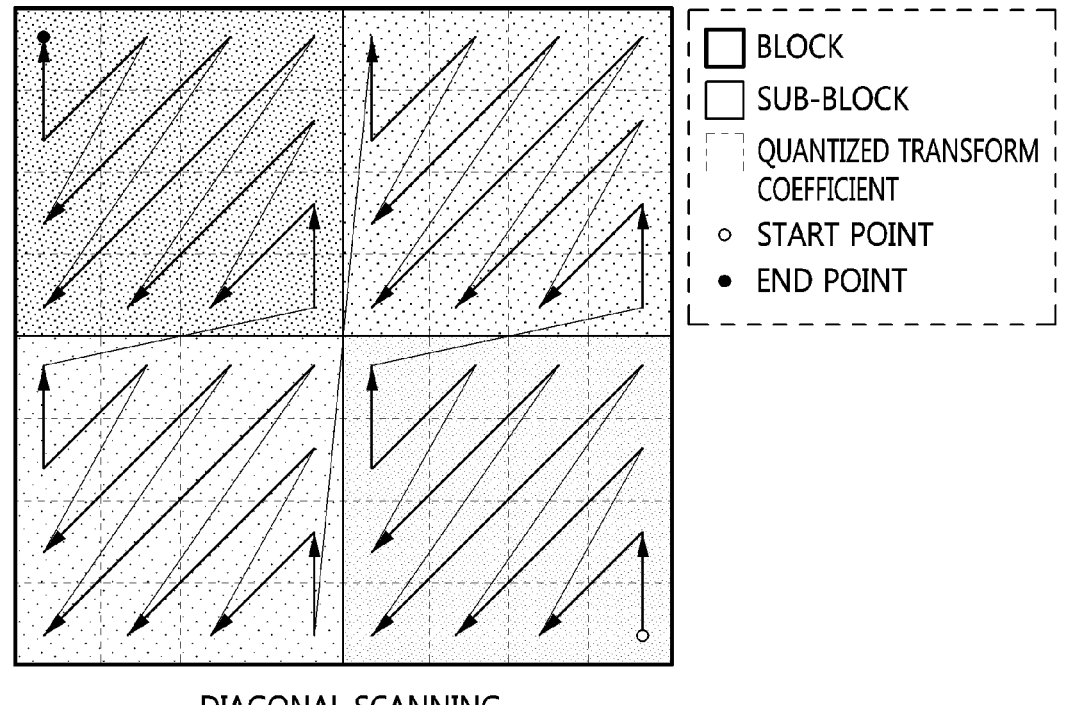
FIG. 13 illustrates diagonal scanning according to an example.

FIG. 13 illustrates diagonal scanning according to an example.

Figure 14:
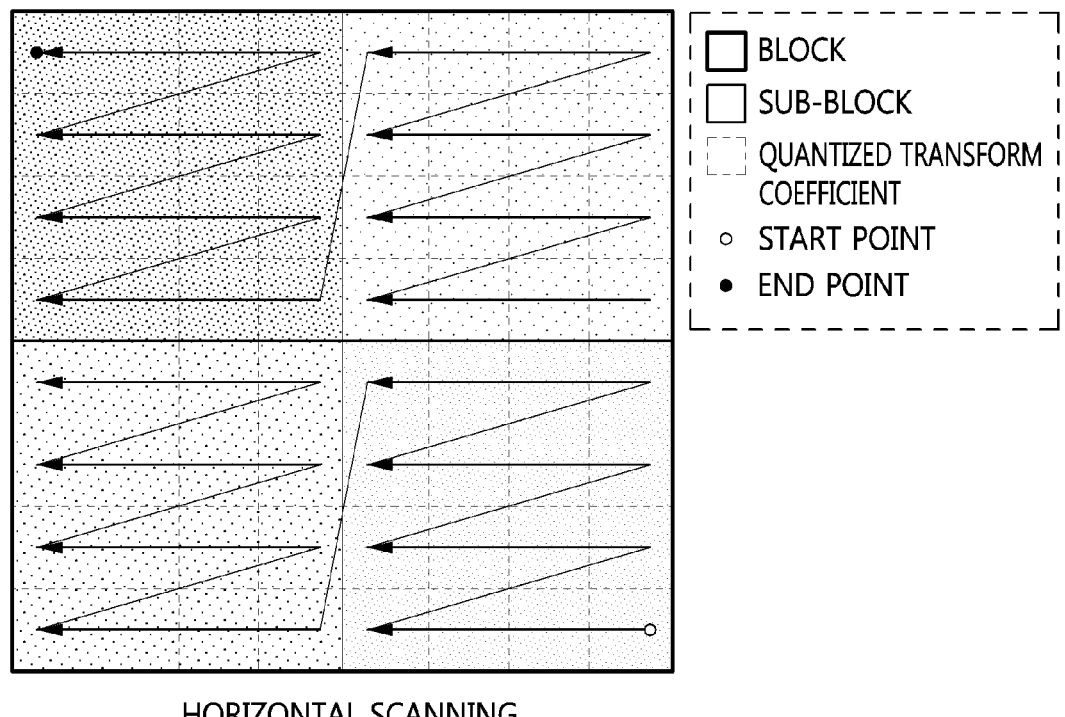
FIG. 14 illustrates horizontal scanning according to an example.

FIG. 14 illustrates horizontal scanning according to an example.

Figure 15:
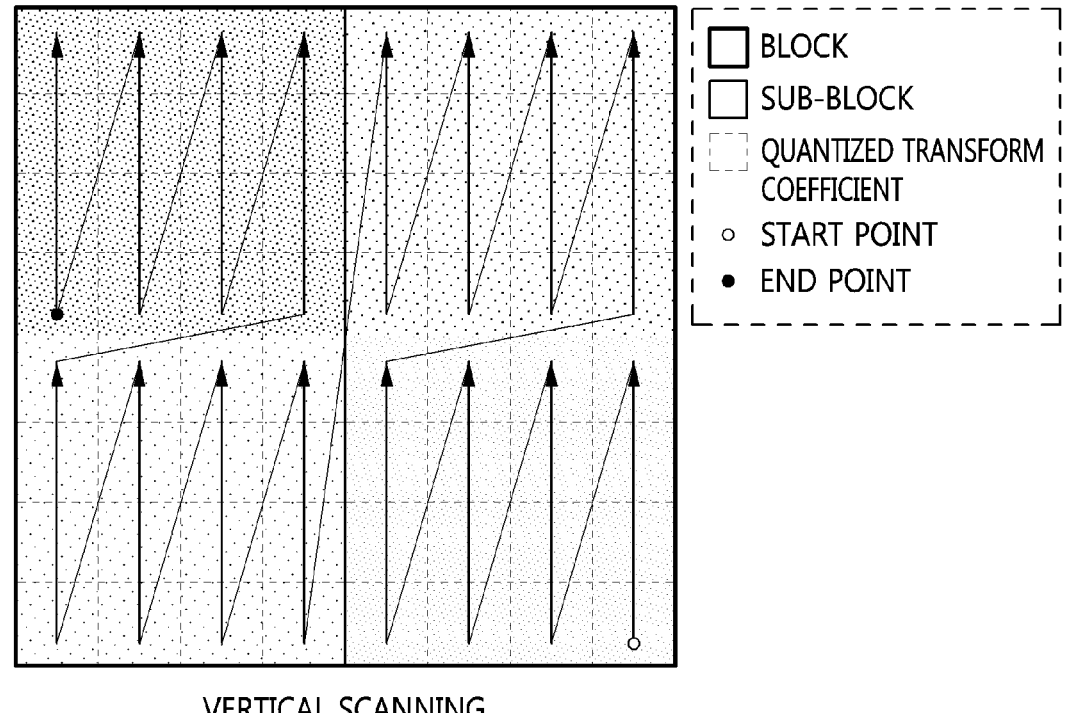
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The encoding apparatus 100 may generate entropy-encoded quantized transform coefficients by performing entropy encoding on scanned quantized transform coefficients, and may generate a bitstream including the entropy-encoded quantized transform coefficients.

The decoding apparatus 200 may extract the entropy-encoded quantized transform coefficients from the bitstream, and may generate quantized transform coefficients by performing entropy decoding on the entropy-encoded quantized transform coefficients. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

For a luma component which is reconstructed via intra prediction or inter prediction, inverse mapping having a dynamic range may be performed before in-loop filtering.

The dynamic range may be divided into 16 equal pieces, and mapping functions for respective pieces may be signaled. Such a mapping function may be signaled at a slice level or a tile group level.

An inverse mapping function for performing inverse mapping may be derived based on the mapping function.

In-loop filtering, the storage of a reference picture, and motion compensation may be performed in an inverse mapping area.

A prediction block generated via inter prediction may be changed to a mapped area through mapping using a mapping function, and the changed prediction block may be used to generate a reconstructed block. However, since intra prediction is performed in the mapped area, a prediction block generated via intra prediction may be used to generate a reconstructed block without requiring mapping and/or inverse mapping.

For example, when the target block is a residual block of a chroma component, the residual block may be changed to an inversely mapped area by scaling the chroma component of the mapped area.

Whether scaling is available may be signaled at a slice level or a tile group level.

For example, scaling may be applied only to the case where mapping is available for a luma component and where the partitioning of the luma component and the partitioning of the chroma component follow the same tree structure.

Scaling may be performed based on the average of the values of samples in a luma prediction block, which corresponds to a chroma prediction block. Here, when the target block uses inter prediction, the luma prediction block may mean a mapped luma prediction block.

A value required for scaling may be derived by referring to a look-up table using the index of a piece to which the average of sample values of the luma prediction block belongs.

The residual block may be changed to an inversely mapped area by scaling the residual block using a finally derived value. Thereafter, for the block of a chroma component, reconstruction, intra prediction, inter prediction, in-loop filtering, and the storage of a reference picture may be performed in the inversely mapped area.

For example, information indicating whether the mapping and/or inverse mapping of a luma component and a chroma component are available may be signaled through a sequence parameter set.

A prediction block for the target block may be generated based on a block vector. The block vector may indicate displacement between the target block and a reference block. The reference block may be a block in a target image.

In this way, a prediction mode in which the prediction block is generated by referring to the target image may be referred to as an "Intra-Block Copy (IBC) mode".

An IBC mode may be applied to a CU having a specific size. For example, the IBC mode may be applied to an M×N CU. Here, M and N may be less than or equal to 64.

The IBC mode may include a skip mode, a merge mode, an AMVP mode, etc. In the case of the skip mode or the merge mode, a merge candidate list may be configured, and a merge index is signaled, and thus a single merge candidate may be specified among merge candidates present in the merge candidate list. The block vector of the specified merge candidate may be used as the block vector of the target block.

In the case of the AMVP mode, a differential block vector may be signaled. Also, a prediction block vector may be derived from the left neighbor block and the above neighbor block of the target block. Further, an index indicating which neighbor block is to be used may be signaled.

A prediction block in the IBC mode may be included in a target CTU or a left CTU, and may be limited to a block within a previously reconstructed area. For example, the value of a block vector may be limited so that a prediction block for a target block is located in a specific area. The specific area may be an area defined by three 64×64 blocks that are encoded and/or decoded prior to a 64×64 block including the target block. The value of the block vector is limited in this way, and thus memory consumption and device complexity caused by the implementation of the IBC mode may be decreased.

Figure 16:
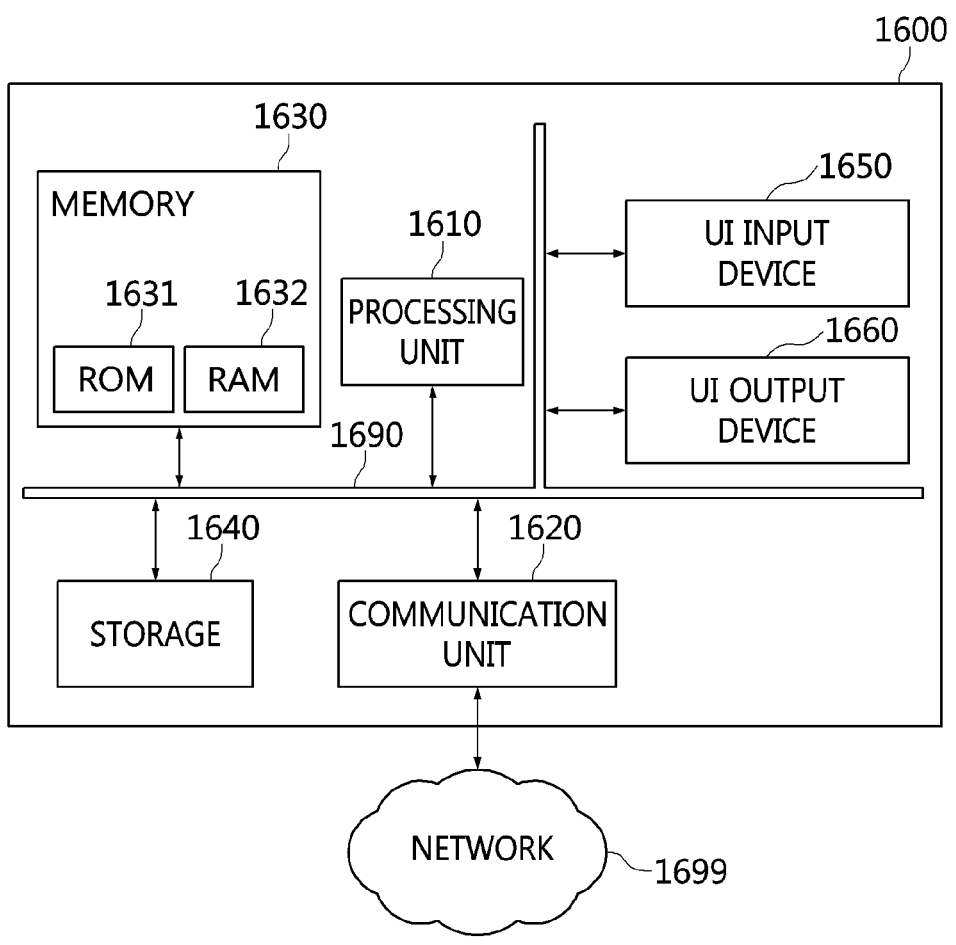
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1620.

For example, the communication unit 1620 may transmit a bitstream to a decoding apparatus 1600, which will be described later.

Figure 17:
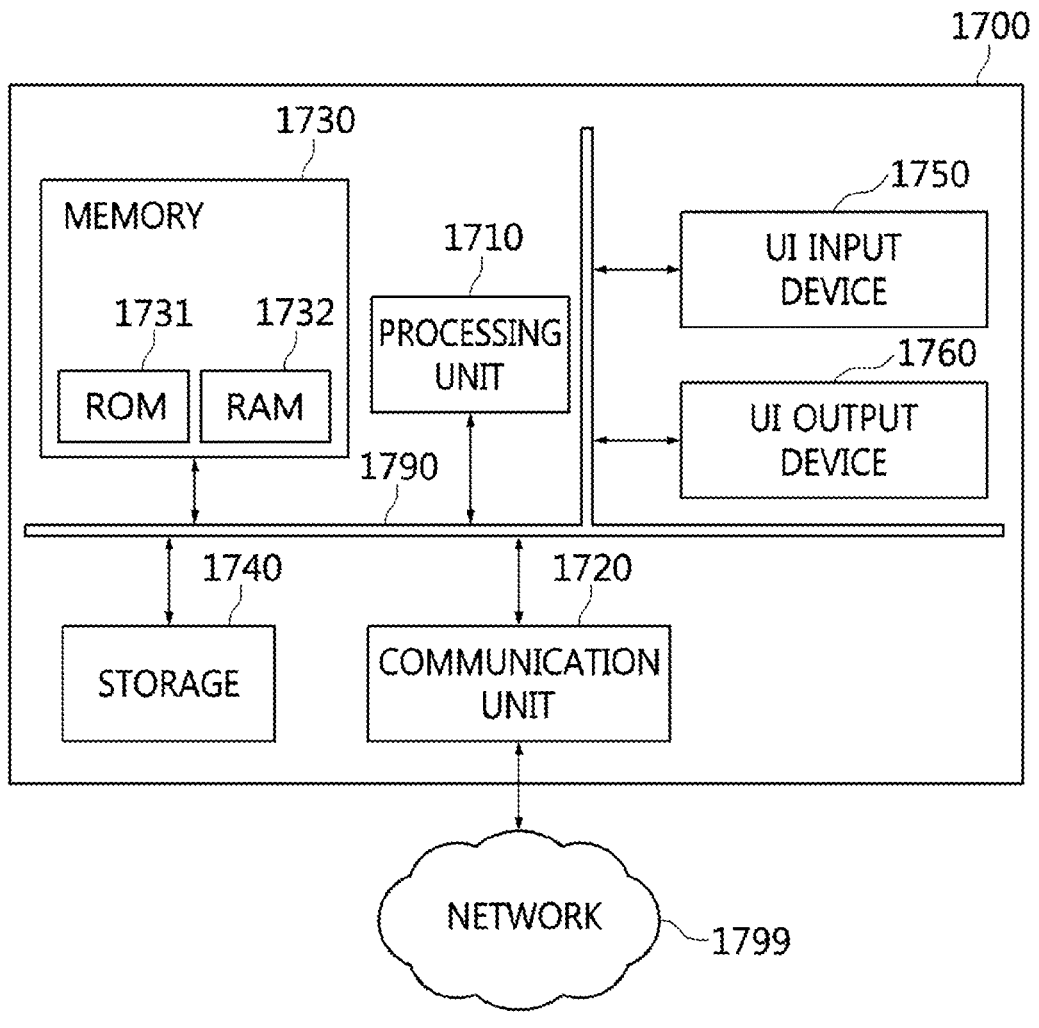
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1799.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740. Each of the memory 1730 and the storage

1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

Hereinafter, a processing unit may represent the processing unit 1610 of the encoding apparatus 1600 and/or the processing unit 1710 of the decoding apparatus 1700. For example, as to functions relating to prediction, the processing unit may represent the switch 115 and/or the switch 245. As to functions relating to inter prediction, the processing unit may represent the inter-prediction unit 110, the subtractor 125 and the adder 175, and may represent the inter prediction unit 250 and the adder 255. As to functions relating to intra prediction, the processing unit may represent the intra prediction unit 120, the subtractor 125, and the adder 175, and may represent the intra prediction unit 240 and the adder 255. As to functions related to transform, the processing unit may represent the transform unit 130 and the inverse transform unit 170, and may represent the inverse transform unit 230. As to functions relating quantization, the processing unit may represent the quantization unit 140 and the inverse quantization unit 160, and may indicate the inverse quantization unit 220. As to functions relating to entropy encoding and/or entropy decoding, the processing unit may represent the entropy encoding unit 150 and/or the entropy decoding unit 210. As to functions relating filtering, the processing unit may represent the filter unit 180 and/or the filter unit 260. As to functions relating a reference picture, the processing unit may indicate the reference picture buffer 190 and/or the reference picture buffer 270.

Figure 18:
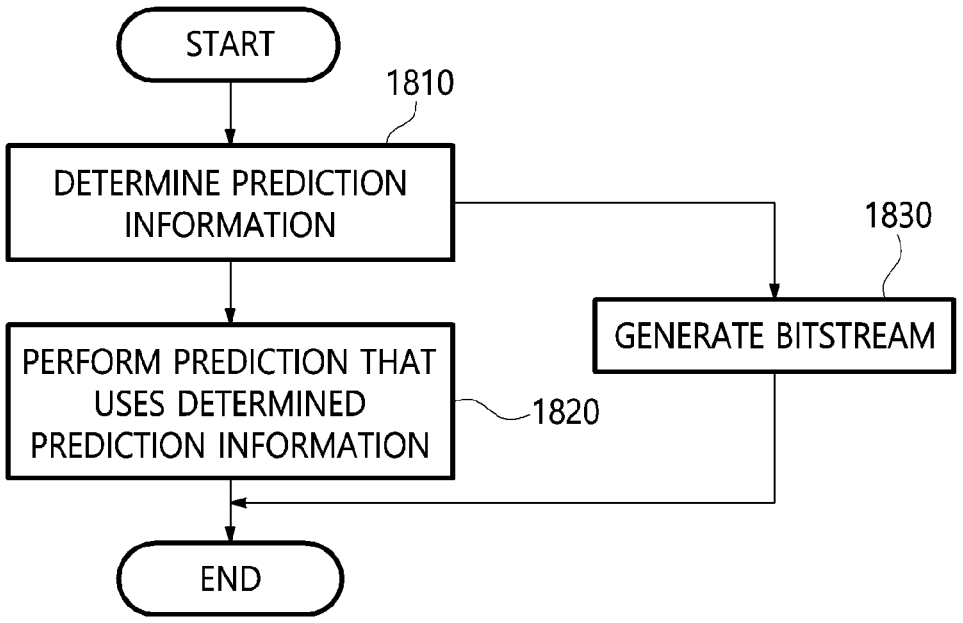
FIG. 18 is a flowchart illustrating a target block prediction method and a bitstream generation method according to an embodiment.

FIG. 18 is a flowchart illustrating a target block prediction method and a bitstream generation method according to an embodiment.

The target block prediction method and the bitstream generation method according to the embodiment may be performed by the encoding apparatus 1600. The embodiment may be a part of a target block encoding method or a video encoding method.

At step 1810, the processing unit 1610 may determine prediction information to be applied to the encoding of the target block.

The prediction information may include information used for the above-described prediction. For example, the prediction information may include inter-prediction information.

The prediction information may include a list and multiple candidates in the list.

The processing unit 1610 may generate a list for the target block. The list may include multiple candidates.

At step 1820, the processing unit 1610 may perform prediction for the target block that uses information about the target block and the determined prediction information.

The processing unit 1610 may perform prediction for the target block using the candidates in the list. The processing unit 1610 may perform prediction for the target block using a candidate selected from among the candidates in the list.

A prediction block may be generated via prediction for the target block, and a residual block that is the difference between the target block and the prediction block may be generated.

The information about the target block may be generated by applying transform and quantization to the residual block.

The information about the target block may include transformed and quantized coefficients for the target block. The information about the target block may include prediction information.

At step 1830, the processing unit 1610 may generate a bitstream.

The bitstream may include the information about the target block. Also, the bitstream may include the information described above in the embodiments. For example, the bitstream may include coding parameters related to the target block and/or the attributes of the target block.

The information included in the bitstream may be generated at step 1830, or may be at least partially generated at steps 1810 and 1820.

The processing unit 1610 may store the generated bitstream in storage 1640. Alternatively, the communication unit 1620 may transmit the bitstream to the decoding apparatus 1700.

The bitstream may include information about an encoded target block. The processing unit 1610 may generate the information about the encoded target block by performing entropy encoding on the information about the target block.

Figure 19:
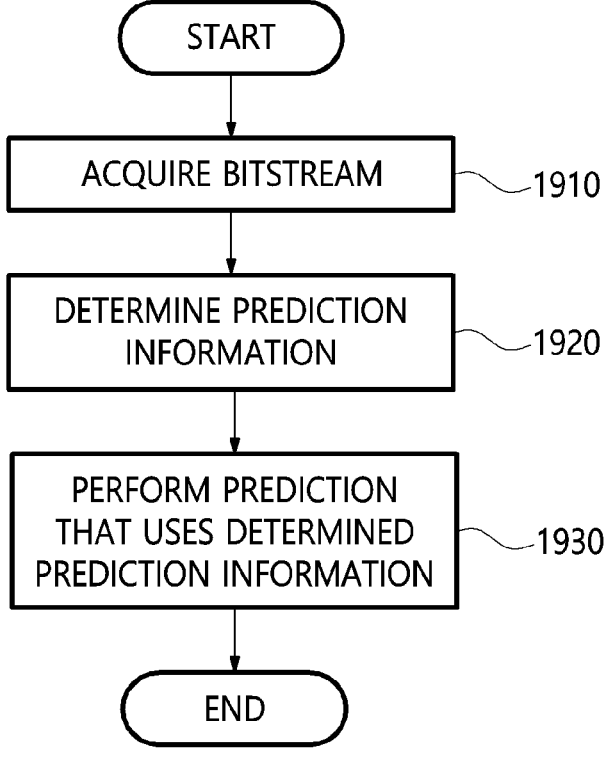
FIG. 19 is a flowchart illustrating a target block prediction method using a bitstream according to an embodiment.

FIG. 19 is a flowchart illustrating a target block prediction method using a bitstream according to an embodiment.

The target block prediction method using a bitstream according to the present embodiment may be performed by the decoding apparatus 1700. The embodiment may be a part of a target block decoding method or a video decoding method.

At step 1910, the communication unit 1720 may acquire a bitstream. The communication unit 1720 may receive the bitstream from the encoding apparatus 1600.

The bitstream may include information about the target block.

The information about the target block may include transformed and quantized coefficients for the target block. The information about the target block may include prediction information.

Also, the bitstream may include the information described above in the embodiments. For example, the bitstream may include coding parameters related to the target block and/or the attributes of the target block.

A computer-readable storage medium may include the bitstream, and prediction and decoding on the target block may be performed using the information about the target block included in the bitstream.

The bitstream may include information about an encoded target block. The processing unit 1710 may generate the information about the target block by performing entropy decoding on the information about the encoded target block.

The processing unit 1710 may store the acquired bitstream in storage 1740.

At step 1920, the processing unit 1710 may determine prediction information to be applied to the decoding of the target block.

The processing unit 1710 may determine the prediction information using the method used in the above-described embodiment.

The processing unit 1710 may determine the prediction information of the target block based on prediction method-related information acquired from the bitstream.

The prediction information may include a list and multiple candidates in the list.

The processing unit 1710 may generate a list for the target block. The list may include multiple candidates.

At step 1930, the processing unit 1710 may perform prediction for the target block that uses information about the target block and the determined prediction information.

The processing unit 1710 may perform prediction for the target block using the candidates in the list. The processing unit 1710 may perform prediction for the target block using a candidate selected from among the candidates in the list.

At step 1930, a prediction block may be generated by performing prediction for the target block that uses the prediction information, and a reconstructed block that is the sum of the prediction block and a reconstructed residual block may be generated.

Figure 20:
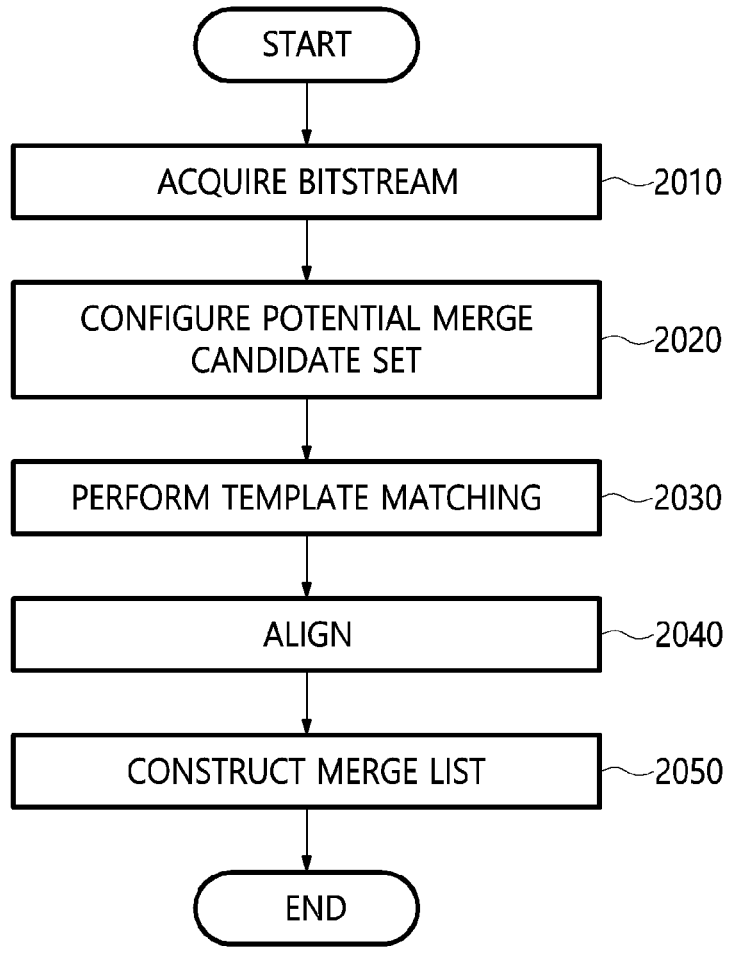
FIG. 20 is a flowchart illustrating a merge list generation method according to an example.

FIG. 20 is a flowchart illustrating a merge list generation method according to an example.

The merge list generation method according to the embodiment may be a part of a target block encoding method and/or a target block decoding method.

The processing unit may use information indicating whether a template matching merge is to be used. The information indicating whether the template matching merge is to be used may be a flag.

The template matching merge may be at least one of steps 2010, 2020, 2030, 2040, and 2050, and may refer to the construction of a merge list using reordered potential merge candidates.

The prediction information may include template matching merge information (or flag). Hereinafter, tm_merge may refer to the template matching merge information.

The prediction information may include information used to perform prediction using the merge list.

Step 1810 or step 1820, described above with reference to FIG. 18, may include steps 2010, 2020, 2030, 2040, and 2050, which will be described later.

Step 1920 or step 1930, described above with reference to FIG. 19, may include steps 2010, 2020, 2030, 2040, and 2050, which will be described later.

When the merge list for the target block is constructed, at least one of steps 2010, 2020, 2030, 2040, and 2050, which will be described later, may be performed depending on the value of tm_merge.

tm_merge may be information or a flag indicating whether the template matching merge is to be used. For example, when the value of tm_merge is 0, the template matching merge may not be used, and steps 2010, 2020, 2030, 2040, and 2050 may not be performed. When the value of tm_merge is 1, the template matching merge may be used, and at least one of steps 2010, 2020, 2030, 2040, and 2050 may be performed.

At step 2010, the processing unit may generate a template for the target block.

The processing unit may generate a template having a specific size and a specific shape using the values of reconstructed pixels neighboring the target block.

The pixels neighboring the target block may refer to pixels adjacent to the target block. The pixels neighboring the target block may refer to pixels to which distances from the target block are less than or equal to a specific value.

At step 2020, the processing unit may configure a potential merge candidate set. Hereinafter, $\Psi$ may refer to a potential merge candidate set for the target block.

The processing unit may configure the potential merge candidate set $\Psi$ using at least one of 1) a block neighboring the target block, 2) a block within a co-located block of an additional picture, or 3) a block neighboring the co-located block.

The block neighboring the target block may refer to a neighboring block or an adjacent block.

The block neighboring the target block may be a reconstructed block.

The additional picture may be a reconstructed picture.

In an embodiment, a block adjacent to the top-left, top-right, bottom-left or bottom-right of the target block may be a block diagonally adjacent to the target block. That is, the case where a specific block is adjacent to the top-left, top-right, bottom-left, or bottom-right of the target block may mean that the vertex of the target block and the vertex of the specific block are diagonally adjacent to each other.

The co-located block may be abbreviated as a col-block.

A block neighboring the col-block may refer to a block adjacent to the col-block.

The additional reconstructed picture may refer to a reference picture or a col-picture.

The location of the col-block in the reference picture may be identical to that of the target block in a target picture. The size of the col-block may be equal to that of the target block.

The potential merge candidate may refer to a block belonging to $\Psi$.

The potential merge candidate may be 1) a block neighboring the target block, 2) a block within a col-block of an additional picture, or 3) a block neighboring the col-block.

A potential spatial merge candidate may be 1) the block neighboring the target block.

A potential temporal merge candidate may be 2) the block within the col-block of the additional picture or 3) the block neighboring the col-block.

The processing unit may generate $\Psi$ including one or more potential merge candidate blocks using one or more potential merge candidate blocks. Alternatively, $\Psi$ may refer to one or more potential merge candidate blocks.

The processing unit may derive information indicating the number of one or more potential merge candidates included in $\Psi$. Hereinafter, tm_merge_cand_num may be information indicating the number of one or more potential merge candidates included in $\Psi$.

$\Psi$ having tm_merge_cand_num potential merge candidates may be configured using 1) a block neighboring the target block, 2) a block within a col-block of an additional picture, or 3) a block neighboring the col-block.

The prediction information may include tm_merge_cand_num.

The processing unit may perform signaling of tm_merge_cand_num.

For example, signaling of tm_merge_cand_num may be performed at a specific level. For example, the information may be signaled at levels corresponding to one or more of a pixel level, a slice level, a tile level, and a block level. When tm_merge_cand_num is signaled at the level of a specific target, tm_merge_cand_num may be applied to the specific target. The block may refer to one or more of a target block, a Coding Tree Block (CTB), a coding block, a prediction block, a residual block, a transform block, and a block having a specific size, as described above in embodiments.

For example, signaling of tm_merge_cand_num may be performed through a specific parameter set. For example, the specific parameter set may be one or more of a Video Parameter Set (VPS), a Sequence Parameter Set (SPS), a Picture Parameter Set (PPS), an Adaptation Parameter Set (APS), and a Decoding Parameter Set (DPS). When the specific parameter set includes tm_merge_cand_num, tm_merge_cand_num may be applied to a target to which the specific parameter set is applied.

When encoding of an image is performed, the processing unit may generate tm_merge_cand_num, and may add tm_merge_cand_num to a bitstream.

When decoding of an image is performed, the processing unit may acquire tm_merge_cand_num from the bitstream.

At step 2030, the processing unit may perform template matching. Template matching may include calculation of template matching distortion between a block referenced by each potential merge candidate included in $\Psi$ and the target block.

In embodiments, template matching distortion may denote a template matching distortion value.

In embodiments, template matching distortion may refer to template matching cost. Alternatively, template matching cost may include template matching distortion. In embodiments, description of template matching distortion may also be applied to template matching cost. Furthermore, template matching distortion may be replaced with template matching cost.

The processing unit may use the template to calculate template matching distortion between the block referenced by the corresponding potential merge candidate included in $\Psi$ and the target block.

The processing unit may calculate template matching distortions in one or more potential merge candidates included in $\Psi$ by calculating, for each of the one or more potential merge candidates included in $\Psi$, template matching distortion between the block referenced by the corresponding potential merge candidate and the target block based on the template.

At step 2040, the processing unit may perform reordering on a specific number of potential merge candidates. Here, a specific number of potential merge candidates may be at least some of the one or more potential merge candidates included in $\Psi$.

Reordering may refer to changing the order of one or more potential merge candidates, included in $\Psi$, in $\gamma$.

From the standpoint of the fact that reordering according to an embodiment can be performed based on specific values of the one or more potential merge candidates, reordering may have the same meaning as sorting, and the term "reordering" and the term "sorting" may be used interchangeably with each other.

The processing unit may derive information indicating the specific number of potential merge candidates to be reordered. Hereinafter, tm_merge_num may be information indicating the specific number of potential merge candidates to be reordered. The prediction information may include tm_merge_num.

tm_merge_num potential merge candidates having the lowest template matching distortion among merge candidates belonging to $\Psi$ may be realigned.

tm_merge_num may indicate the number of potential merge candidates to be included in a merge list among potential merge candidates belonging to Ψ. Alternatively, tm_merge_num may indicate the number of merge candidates included in the merge list.

The processing unit may perform signaling of tm_merge_num.

For example, signaling of tm_merge_num may be performed at a specific level. For example, the information may be signaled at levels corresponding to one or more of a pixel level, a slice level, a tile level, and a block level. When tm_merge_num is signaled at the level of a specific target, tm_merge_num may be applied to the specific target. The block may refer to one or more of a target block, a CTB, a coding block, a prediction block, a residual block, a transform block, and a block having a specific size, as described above in embodiments.

For example, signaling of tm_merge_num may be performed through a specific parameter set. For example, the specific parameter set may indicate one or more of VPS, SPS, PPS, APS, and DPS. When the specific parameter set includes tm_merge_num, tm_merge_num may be applied to a target to which the specific parameter set is applied.

When encoding of an image is performed, the processing unit may generate tm_merge_num, and may add tm_merge_num to a bitstream.

When decoding of an image is performed, the processing unit may acquire tm_merge_num from the bitstream.

At step 2050, the processing unit may configure a merge list using a specific number of reordered potential merge candidates.

The merge list may include a specific number of potential merge candidates. In other words, a specific number of potential merge candidates may be merge candidates of the merge list.

Whether each of steps 2010, 2020, 2030, 2040 and 2050 is to be performed may be determined based on one or more of 1) a coding parameter, 2) picture information, 3) slice information, 4) tile information, 5) a Quantization Parameter (QP), 6) a Code Block Flag (CBF), 7) a block size, 8) a block depth, 9) a block shape, 10) an entropy encoding method, 11) block partition information, and 12) a temporal layer level. Each block may be a target block and/or a neighboring block.

The order of the above-described steps 2010, 2020, 2030, 2040, and 2050 may be changed. Also, at least one of the above-described steps 2010, 2020, 2030, 2040, and 2050 may be selectively performed, and at least some of steps 2010, 2020, 2030, 2040 and 2050 may not be performed.

For example, at least one of the above-described steps 2010, 2020, 2030, 2040, and 2050 may be used in an inter-prediction mode or an Intra-Block Copy (IBC) mode.

When the IBC mode is used, the above-described template-based reordering may be applied to a merge list in the IBC mode. After merge candidates in the IBC merge list are derived, the merge candidates may be reordered. After reordering is performed, a specific number of reordered merge candidates having the lowest template distortion may be selected as (final) candidates for the IBC merge list. The specific number may be an integer of 1 or more. For example, the specific number may be 1, 2, 3, 4, 5, 6, 7, 8, or the like.

Application to Various Prediction Modes in Embodiments

In embodiments, the case where steps 2010, 2020, 2030, 2040, and 2050 are applied to a merge list and merge candidates is exemplified. Steps 2010, 2020, 2030, 2040, and 2050 may also be applied to an additional list having multiple candidates for prediction and candidates in the additional list, in addition to the merge list and the merge candidates. In other words, the calculation of template matching distortion using a template according to embodiments and reordering using template matching distortion may be used to generate the additional list and candidates in the additional list.

From this aspect, "merge list" according to embodiments may be regarded as "list" and "merge candidate" may be regarded as "candidate". Furthermore, the additional list may replace the merge list according to embodiments, and the candidates in the additional list may replace the merge candidates according to embodiments.

For example, such a list and such candidates may be an Advanced Motion Vector Predictor (AMVP) list and AMVP candidates.

For example, the embodiments may also be applied to the AMVP list and AMVP candidates. Therefore, the term "merge" in embodiments may be replaced with the term "AMVP". For example, the term "merge list" may be replaced with the term "AMVP list". The term "merge candidate" may be replaced with the term "AMVP candidate". For example, steps 2010, 2020, 2030, 2040, and 2050 may be understood to be changed as follows.

A list generation method according to an embodiment may be a part of a target block encoding method and/or a target block decoding method.

The processing unit may use information indicating whether template matching is to be used. The information indicating whether template matching is to be used may be a flag.

Template matching may refer to at least one of steps 2010, 2020, 2030, 2040, and 2050, and may refer to the construction of a list using reordered potential candidates.

The prediction information may include template matching information (or a flag). Hereinafter, tm may denote template matching information. Description of a tm_merge flag may also be applied to a tm flag.

The prediction information may include information used to perform prediction using the list.

Step 1810 or step 1820, described above with reference to FIG. 18, may include steps 2010, 2020, 2030, 2040, and 2050, which will be described later.

Step 1920 or step 1930, described above with reference to FIG. 19, may include steps 2010, 2020, 2030, 2040, and 2050, which will be described later.

When a list for the target block is constructed, at least one of steps 2010, 2020, 2030, 2040, and 2050, which will be described later, may be performed depending on the value of the tm flag.

tm may be information or a flag indicating whether template matching is to be used. For example, when the value of tm is 0, template matching may not be used, and steps 2010, 2020, 2030, 2040, and 2050 may not be performed. When the value of tm is 1, template matching may be used, and at least one of steps 2010, 2020, 2030, 2040, and 2050 may be performed.

At step 2010, the processing unit may generate a template for the target block.

The processing unit may generate a template having a specific size and a specific shape using the value of a reconstructed pixel neighboring the target block.

The pixel neighboring the target block may refer to a pixel adjacent to the target block. The pixel neighboring the target block may refer to a pixel to which the distance from the target block is less than or equal to a specific value.

At step 2020, the processing unit may configure a potential candidate set. Y may refer to a potential candidate set for the target block.

The processing unit may configure Ψ using at least one of 1) a block neighboring the target block, 2) a block within a co-located block of an additional picture, or 3) a block neighboring the co-located block.

The block neighboring the target block may refer to a neighboring block or an adjacent block.

The block neighboring the target block may be a reconstructed block.

The additional picture may be a reconstructed picture.

In an embodiment, a block adjacent to the top-left, top-right, bottom-left or bottom-right of the target block may be a block diagonally adjacent to the target block. That is, the case where a specific block is adjacent to the top-left, top-right, bottom-left, or bottom-right of the target block may mean that the vertex of the target block and the vertex of the specific block are diagonally adjacent to each other.

The co-located block may be abbreviated as a col-block.

A block neighboring the col-block may refer to a block adjacent to the col-block.

The additional reconstructed picture may refer to a reference picture or a col-picture.

The location of the col-block in the reference picture may be identical to that of the target block in a target picture. The size of the col-block may be equal to that of the target block.

The potential candidate may refer to a block belonging to Ψ.

The potential candidate may be 1) a block neighboring the target block, 2) a block within a col-block of an additional picture, or 3) a block neighboring the col-block.

A potential spatial candidate may be 1) the block neighboring the target block.

A potential temporal candidate may be 2) the block within the col-block of the additional picture or 3) the block neighboring the col-block.

The processing unit may generate Ψ including one or more potential candidate blocks using the one or more potential candidate blocks. Alternatively, Ψ may refer to one or more potential candidate blocks.

The processing unit may derive information indicating the number of one or more potential candidates included in Ψ. Hereinafter, tm_cand_num may be information indicating the number of one or more potential candidates included in Ψ. Description of tm_merge_cand_num may also be applied to tm_cand_num.

Ψ having tm_cand_num potential candidates may be configured using 1) a block neighboring the target block, 2) a block in a col-block of an additional picture, or 3) a block neighboring the col-block.

The prediction information may include tm_cand_num.

The processing unit may perform signaling of tm_cand_num.

For example, signaling of tm_cand_num may be performed at a specific level. For example, the information may be signaled at levels corresponding to one or more of a pixel level, a slice level, a tile level, and a block level. When tm_cand_num is signaled at the level of a specific target, tm_cand_num may be applied to the specific target. The block may refer to one or more of a target block, a CTB, a coding block, a prediction block, a residual block, a transform block, and a block having a specific size, as described above in embodiments.

For example, signaling of tm_cand_num may be performed through a specific parameter set. For example, the specific parameter set may indicate one or more of VPS, SPS, PPS, APS, and DPS. When the specific parameter set includes tm_cand_num, tm_cand_num may be applied to a target to which the specific parameter set is applied.

When encoding of an image is performed, the processing unit may generate tm_cand_num, and may add tm_cand_num to a bitstream.

When decoding of an image is performed, the processing unit may acquire tm_cand_num from the bitstream.

At step 2030, the processing unit may perform template matching. Template matching may include the calculation of template matching distortion between a block referenced by each potential candidate included in Ψ and the target block.

In embodiments, template matching distortion may denote a template matching distortion value.

The processing unit may use the template to calculate template matching distortion between the block referenced by the corresponding potential candidate included in Ψ and the target block.

The processing unit may calculate template matching distortions in one or more potential candidates included in Ψ by calculating, for each of the one or more potential candidates included in Ψ, template matching distortion between the block referenced by the corresponding potential candidate and the target block based on the template.

At step 2040, the processing unit may perform reordering on a specific number of potential candidates. Here, a specific number of potential candidates may be at least some of one or more potential candidates included in Ψ.

Reordering may refer to changing the order of one or more potential candidates, included in Ψ, in Ψ.

From the standpoint of the fact that reordering according to an embodiment can be performed based on specific values of the one or more potential candidates, reordering may have the same meaning as sorting, and the term "reordering" and the term "sorting" may be used interchangeably with each other.

The processing unit may derive information indicating the specific number of potential candidates to be reordered. Hereinafter, tm_num may be information indicating the specific number of potential candidates to be reordered. The prediction information may include tm_num. Description of tm_merge_num may also be applied to tm_num.

tm_num potential candidates having the lowest template matching distortion among candidates belonging to Ψ may be realigned.

tm_num may refer to the number of potential candidates to be included in the list among potential candidates belonging to Ψ. Alternatively, tm_num may refer to the number of candidates included in the list.

The processing unit may perform signaling of tm_num.

When encoding of an image is performed, the processing unit may generate tm_num, and may add tm_num to the bitstream.

When decoding of an image is performed, the processing unit may acquire tm_num from the bitstream.

At step 2050, the processing unit may construct a list using a specific number of reordered potential candidates.

The list may include a specific number of potential candidates. In other words, a specific number of potential candidates may be the candidates of the list.

Whether each of steps 2010, 2020, 2030, 2040 and 2050 is to be performed may be determined based on one or more of 1) a coding parameter, 2) picture information, 3) slice information, 4) tile information, 5) a Quantization Parameter (QP), 6) a Code Block Flag (CBF), 7) a block size, 8) a block depth, 9) a block shape, 10) an entropy encoding method, 11) block partition information, and 12) a temporal layer level. Each block may be a target block and/or a neighboring block.

The order of the above-described steps 2010, 2020, 2030, 2040, and 2050 may be changed. Also, at least one of the above-described steps 2010, 2020, 2030, 2040, and 2050 may be selectively performed, and at least some of steps 2010, 2020, 2030, 2040 and 2050 may not be performed.

For example, at least one of the above-described steps 2010, 2020, 2030, 2040, and 2050 may be used in an inter-prediction mode or an IBC mode.

Descriptions of the specific list and specific candidates in the specific list according to embodiments may also be applied to the list and candidates at steps 2010, 2020, 2030, 2040, and 2050.

Selective Performance of Template Matching Merge

In an embodiment, template matching may include a template matching merge. A potential candidate may include a potential merge candidate. tm may refer to tm_merge.

The processing unit may use information indicating whether template matching is to be used. The information indicating whether template matching is to be used may be a flag.

Template matching maybe at least one of the above-described steps 2010, 2020, 2030, 2040, and 2050, and may refer to the construction of a list using reordered potential candidates.

Hereinafter, tm may be information or a flag indicating whether template matching is to be used. For example, when the value of tm is 0, template matching may not be used, and steps 2010, 2020, 2030, 2040, and 2050 may not be performed. When the value of tm is 1, template matching may be used, and at least one of steps 2010, 2020, 2030, 2040, and 2050 may be performed.

After a prediction mode for the target block is determined, whether template matching is to be used for the target block may be determined through signaling of tm.

Prediction information may include tm.

In an embodiment, tm may be derived, used, and signaled when the prediction mode for the target block is an inter-prediction mode.

In an embodiment, tm may be derived, used, and signaled when the prediction mode for the target block is an IBC mode.

The processing unit may perform signaling of tm

When encoding of an image is performed, the processing unit may generate tm and may add tm to a bitstream.

When decoding of an image is performed, the processing unit may acquire tm from the bitstream.

Application of Reordering to Constructed List

In accordance with the description of embodiments, a potential candidate set $\Psi$ may include potential candidates. As reordering of potential candidates is performed using template matching distortions in the potential candidates, (a specific number of) reordered potential candidates may be generated, and a list may be generated using the reordered potential candidates.

In other words, the candidates in the list may be reordered using template matching. Such reordering may be used in a regular merge mode, a template matching merge mode, an affine merge mode, etc.

In a template merge mode, the merge candidates may be reordered prior to a refinement process.

The above-described potential candidate set may indicate candidates in the list. Each of the above-described potential candidates may be a candidate in the list. The above-described reordered potential candidates may be reordered candidates in the list.

In other words, before step 2010 is performed, a list including multiple candidates may be generated.

Step 2020 may be skipped. A method for configuring the potential candidate set, described at the corresponding step, may be regarded as a method for configuring candidates in the list.

At step 2030, template matching distortions in multiple candidates in the list may be calculated.

At step 2040, reordering may be performed on multiple candidates in the list depending on the template matching distortions in the multiple candidates in the list. As reordering is performed, a list having (a specific number of) reordered candidates may be generated. Alternatively, the list having reordered candidates may be updated.

As the list is generated at step 2040, step 2050 may be skipped.

After the list is constructed, the candidates may be partitioned into multiple sub-groups. The size of the sub-groups for a specific prediction mode may be predefined. The size of the sub-groups may be an integer of 1 or more.

For example, after the merge list is constructed, the merge candidates may be partitioned into multiple sub-groups. For the regular merge mode and the template matching merge mode, the size of the sub-groups may be set to 5. For the affine merge mode, the size of the sub-groups may be set to 3.

The candidates in each sub-group may be realigned in ascending order of template matching cost based on template matching.

For simplification, candidates in a last sub-group, other than a first sub-group, among the multiple sub-groups, may not be realigned. For example, when merge candidates in the merge list are divided into multiple sub-groups, merge candidates in a last sub-group, other than a first sub-group, may not be realigned.

Zero candidates may be excluded from reordering during construction of a list.

For example, zero merge candidates may be excluded from reordering during construction of a merge list.

The template of the target block may include reconstructed pixels adjacent to the target block. The locations of pixels in the template of a reference block may be determined by motion information of merge candidates.

When the corresponding candidate uses bidirectional prediction, pixels in the template of the candidate may also be generated via bidirectional prediction. In other words, L0 reference block and L0 template of the L0 reference block may be determined using L0 motion information of the candidate. L1 reference block and L1 template of the L1 reference block may be determined using L1 motion information of the candidate.

Template in Subblock-Based Merge Mode

In a subblock-based merge mode, a target block may be partitioned into multiple subblocks. The size of the multiple subblocks of the target block may be Wsub×Hsub. When prediction is performed for each subblock, the template of the corresponding subblock may be configured.

The template of the subblock of the target block may be determined depending on the location of the corresponding subblock in the target block.

The template of a first subblock in an uppermost-leftmost portion, among the multiple subblocks of the target block, may include an above template and a left template. The above template may indicate reconstructed pixels adjacent to the top of the first subblock. The size of the above template may be Wsub×1. The left template may indicate reconstructed pixels adjacent to the left of a second subblock. The size of the left template may be 1×Hsub.

The template of the second subblock among the multiple subblocks of the target block may indicate reconstructed pixels adjacent to the top of the second subblock. The size of the template may be Wsub×1. The second subblock may indicate the remaining subblock(s), other than the first subblock, among the uppermost subblocks of the target block.

The template of a third subblock among the multiple subblocks of the target block may indicate reconstructed pixels adjacent to the left of the third subblock. The size of the template may be 1×Hsub. The third subblock may indicate the remaining subblock(s), other than the first subblock, among the uppermost subblocks of the target block.

The shape of the template of the reference block for the potential candidate for each subblock may be identical to that of the template of the corresponding subblock.

Construction of Merge List in Merge Mode

Upon constructing a merge list, pieces of motion information of specific candidates may be sequentially added, as merge candidates, to the merge list. Here, the specific candidates may sequentially include 1) spatial candidates, 2) temporal candidates, 3) history-based candidates, 4) pairwise candidates, and 5) zero candidates.

In the above-described FIG. 11, the order in which spatial candidates $B_1$, $A_1$, $B_0$, $A_0$, and $B_2$ and pieces of motion information of the spatial candidates are added to the merge list according to an example is illustrated.

In an embodiment, the pieces of motion information of the spatial candidates may be added to the merge list in the order of $B_1$, $A_1$, $B_0$, $A_0$, and $B_2$.

Figure 21:
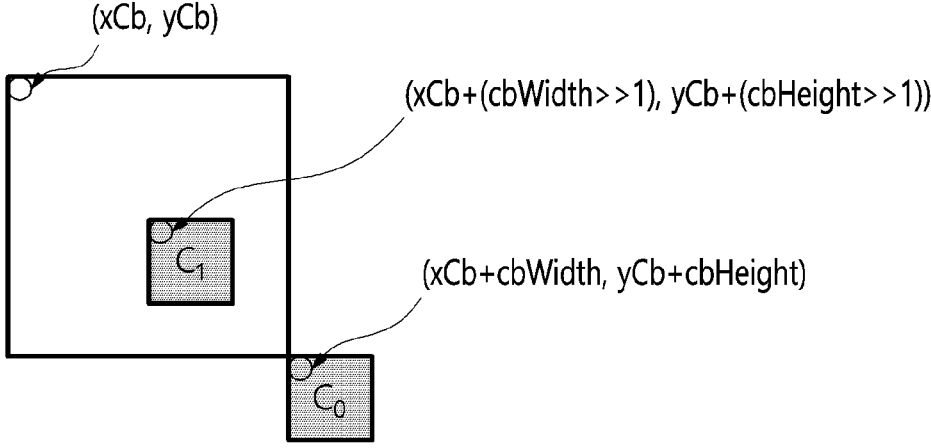
FIG. 21 illustrates the locations of temporal candidates according to an example.

FIG. 21 illustrates the locations of temporal candidates according to an example.

$C_0$ may refer to a first col-block (i.e., a first temporal candidate).

$C_1$ may refer to a second col-block (i.e., a second temporal candidate).

The top-left coordinates of the target block may be (xCb, yCb). The horizontal size of the target block may be cbWidth. The vertical size of the target block may be cbHeight.

In embodiments, a "block, the top-left coordinates of which are (x, y)" may refer to a "block including a pixel having coordinates of (x, y)".

In embodiments, the location of the block may indicate the top-left coordinates of the block. Alternatively, the location of the block may indicate the coordinates of an uppermost-leftmost pixel in the block.

In embodiments, the location of the block may denote the coordinates of one of pixels in the block. In other words, a "block, the location of which is (x, y)" may refer to a "block including a pixel having coordinates of (x, y)".

The top-left coordinates of a first col-block may be (xCb+cbWidth, yCb+cbHeight). Alternatively, the first col-block may be a block occupying coordinates of (xCb+cbWidth, yCb+cbHeight). Alternatively, the motion information of the first col-block may be motion information at the coordinates of (xCb+cbWidth, yCb+cbHeight).

The top-left coordinates of the second col-block may be (xCb+(cbWidth>>1), yCb+(cbHeight>>1)). Alternatively, the second col-block may be a block occupying coordinates of (xCb+(cbWidth>>1), yCb+(cbHeight>>1)). Alternatively, the motion information of the second col-block may be motion information at the coordinates of (xCb+(cbWidth>>1), yCb+(cbHeight>>1)).

Figure 22:
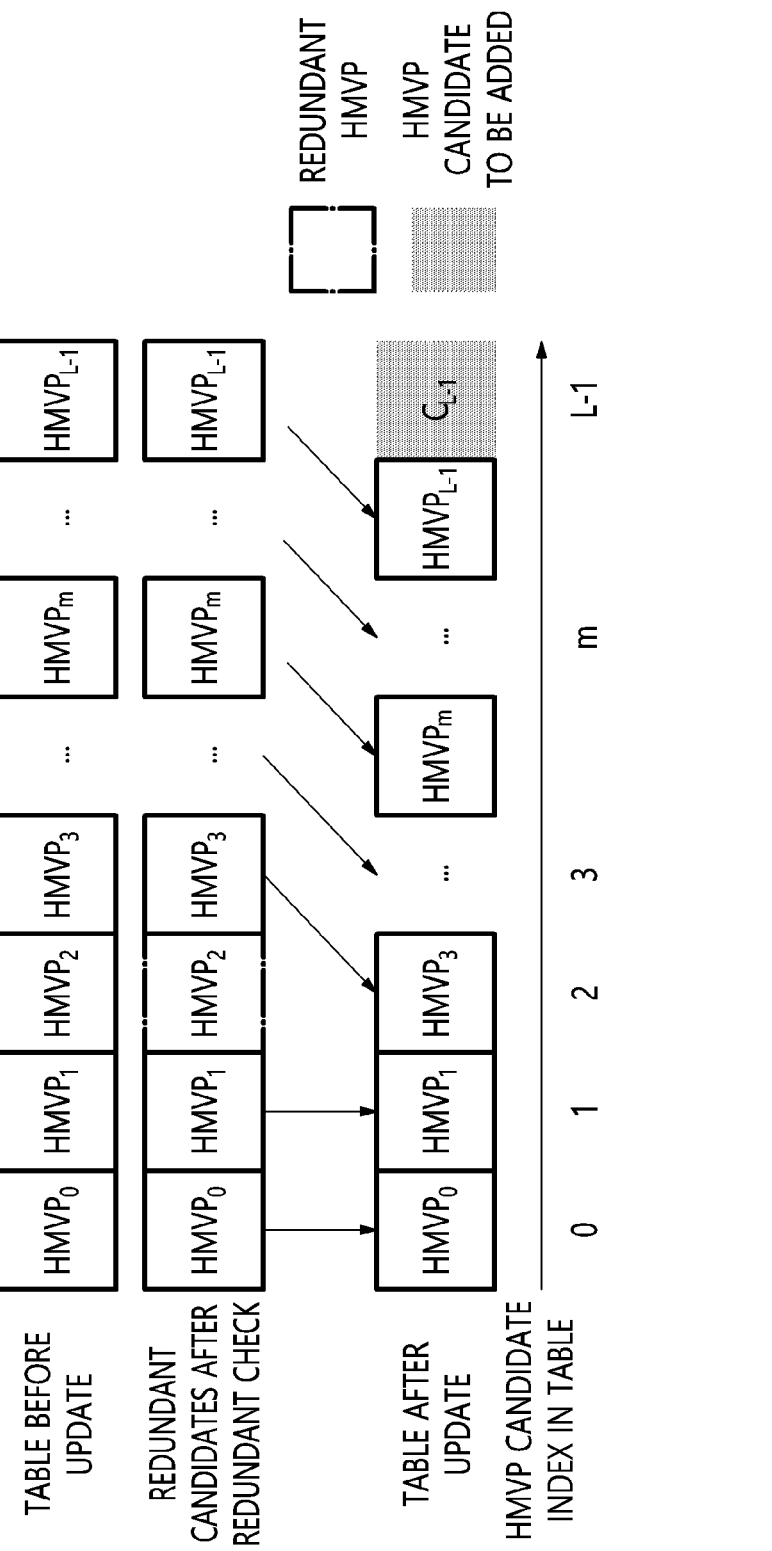
FIG. 22 illustrates the configuration of history-based candidates according to an example.

FIG. 22 illustrates the configuration of history-based candidates according to an example.

Each history-based candidate may denote a History-Based Motion Vector Predictor (HMVP).

A table present before being updated may include L HMVPs.

After a redundancy check, redundant candidates in the table may be determined. In FIG. 22, a $HMVP_2$ is illustrated as being a redundant candidate.

Through update, redundant candidates may be removed from the table, and a table present after being updated may be derived. As the redundant candidates are removed, an HMVP having an index greater than that of the redundant candidates may be moved to the left in the table. From the standpoint of HMVP, the fact that the HMVP is moved to the left in the table may mean that the index of the HMVP is decreased by 1.

After being updated, when the number of HMVPs in the table is less than L, another HMVP candidate $C_{L-1}$ may be added to the rightmost portion of the table. In other words, when the number of HMVPs in the table is less than L, another HMVP candidate $C_{L-1}$ having an index of L−1 may be added to the table.

The HMVPs in the table may be added, as merge candidates, to the merge list.

FIG. 23 illustrates the addition of a pairwise candidate according to an example.

Motion information of the pairwise candidate may be the average of a first merge candidate and a second merge candidate that are two merge candidates already included in a merge list.

In FIG. 23, "MV" may refer to a motion vector. "refIdx" may refer to a reference picture index.

In FIG. 23, a scheme in which a pairwise candidate generated using a merge candidate having a merge index of 0 and a merge candidate having a merge index of 1 is added to the merge list is illustrated. In FIG. 23, the merge index of the pairwise candidate is exemplified as 5.

As illustrated in FIG. 23, the L0 motion vector of the pairwise candidate may be the average of the L0 motion vector of the first merge candidate and the L0 motion vector of the second merge candidate. The L0 reference picture index of the pairwise candidate may be the L0 reference picture index of the first merge candidate.

As illustrated in FIG. 23, the L1 motion vector of the pairwise candidate may be the average of the L1 motion vector of the first merge candidate and the L1 motion vector of the second merge candidate. The L1 reference picture index of the pairwise candidate may be the L1 reference picture index of the first merge candidate.

In other words, the L0 motion vector and the L1 motion vector of the pairwise candidate may be determined based on the motion vectors of the first merge candidate and the motion vectors of the second merge candidate. On the other hand, in order to determine the L0 reference picture index and the L1 reference picture index of the pairwise candidate, only the L0 reference picture index and the L1 reference picture index of the first merge candidate are used, and the L0 reference picture index and the L1 reference picture index of the second merge candidate may not be used.

The processing unit 1610 of the encoding apparatus 1600 may construct the merge list and thereafter select an optimal merge candidate for prediction from among the merge candidates in the merge list. A merge index for indicating the optimal merge candidate may be signaled through a bit-stream.

The processing unit 1710 of the decoding apparatus 1700 may acquire the merge index through the bitstream.

In the same manner as the processing unit 1610 of the encoding apparatus 1600, the processing unit 1710 may construct a merge list, and may determine a merge candidate to be used for prediction for the target block among the merge candidates in the merge list using the merge index.

Figure 24:
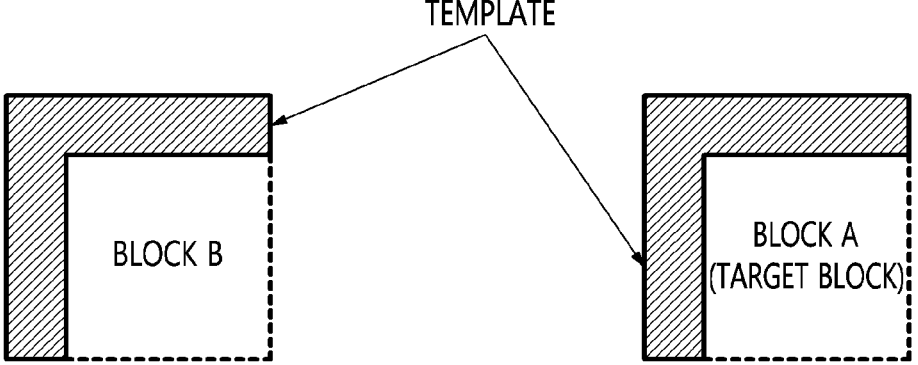
FIG. 24 illustrates processing of evaluating similarity between blocks by comparing the values of pixels belonging to a template according to an example.

FIG. 24 illustrates processing of evaluating similarity between blocks by comparing the values of pixels belonging to a template according to an example.

The processing unit may calculate similarity between a first block and a second block by utilizing a first template neighboring the first block and a second template neighboring the second block to compare the features of the first template and the second template with each other.

The first block may be a target block. The second block may be a reference block. The second blocks may be blocks within a reference region.

The first template and the second template may have a specific size and/or a specific shape.

The features of each template may include values in the corresponding template.

For example, in order to calculate similarity between the blocks, the values of corresponding locations in the tem-plates of the blocks may be used.

For example, in order to calculate similarity between the blocks, values at corresponding locations in the templates of the blocks may be compared with each other.

For example, in order to calculate similarity between the blocks, whether the values at the corresponding locations in the templates of the blocks are equal to each other may be determined.

The value of each template may be the pixel value of a pixel used to generate the corresponding template. Alterna-tively, the value of each template may refer to the pixel value of a pixel included in the corresponding template.

For example, the template of the block may include pixels neighboring the block.

For example, the pixels in the template may include previously reconstructed pixels.

For example, the template of the block may include pixels in a region neighboring the block.

For example, the template of the block may include pixels located above-and-to-the-left of the block, pixels located above the block, or pixels located to the left of the block. In each of the pixels, the difference between the x coordinate of the pixel and the x coordinate of the top-left of the block may be less than or equal to WL, and the difference between the y coordinate of the pixel and the y coordinate of the top-left of the block may be less than or equal to HL. WL may be an integer of 1 or more. HL may be an integer of 1 or more.

For example, when the top-left coordinates of the block are (X, Y), the horizontal length of the block is W, and the vertical length of the block is H, the template of the block may include pixels which are not included in the block, among pixels in a square, the top-left coordinates of which are (X−WL, Y−HL) and the bottom-right coordinates of which are (X+W−1, Y+H−1). WL may be an integer of 1 or more. HL may be an integer of 1 or more.

The fact that the template includes pixels may mean that the pixel values of the pixels are used to generate the template. The template may store the pixel values of the pixels as the values of the template.

Depending on the locations of the pixels, the pixel value of each pixel may be used as the value at a specific location in the template. For example, the specific location in the template may correspond to the location of the correspond-ing pixel.

For example, the template of the block may be an object 1) including the pixel values of the above-described pixels, and 2) having the same shape as that formed by the above-described pixels.

Generation of Template

Figure 25:
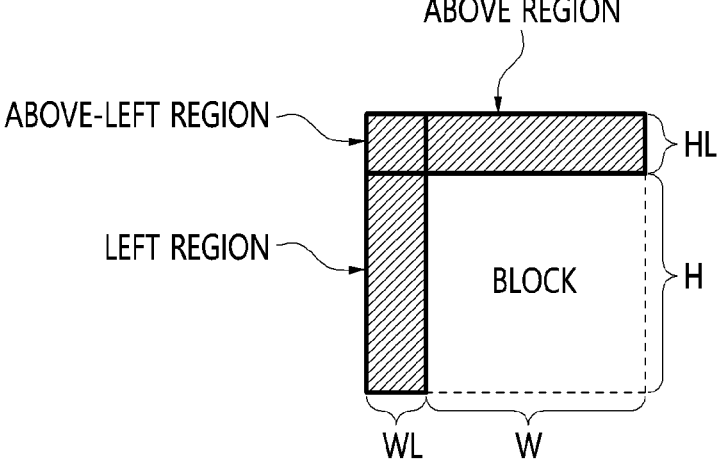
FIG. 25 illustrates a current block and regions adjacent to the current block according to an example.

FIG. 25 illustrates a current block and regions adjacent to the current block according to an example.

Below, the generation of the template at step 2010 will be described in detail.

The processing unit may generate a template having a specific size and/or a specific shape using the pixel values of pixels neighboring a block.

The pixels may be reconstructed pixels.

The processing unit may generate the template of a block using pixels in one or more of a region above-and-to-the-left of the block (above-left region), a region above the block (above region), and a region to the left of the block (left region).

The above-left region may be a rectangular region diago-nally adjacent to the top-left of the block. The horizontal length of the above-left region may be WL. The vertical length of the above-left region may be HL. WL may be an integer of 1 or more. HL may be an integer of 1 or more.

The above region may be a rectangular region adjacent to the top of the block. The horizontal length of the above region may be W. W may be the horizontal length of the block. The vertical length of the above region may be HL. HL may be an integer of 1 or more.

The left region may be a rectangular region adjacent to the left of the block. The horizontal length of the left region may be WL. WL may be an integer of 1 or more. The vertical length of the left region may be H. H may be the vertical length of the block.

In embodiments, the template of the block may be gen-erated using pixels in the above-left region, pixels in the above region, and pixels in the left region. The pixels may be reconstructed pixels.

Figure 26:
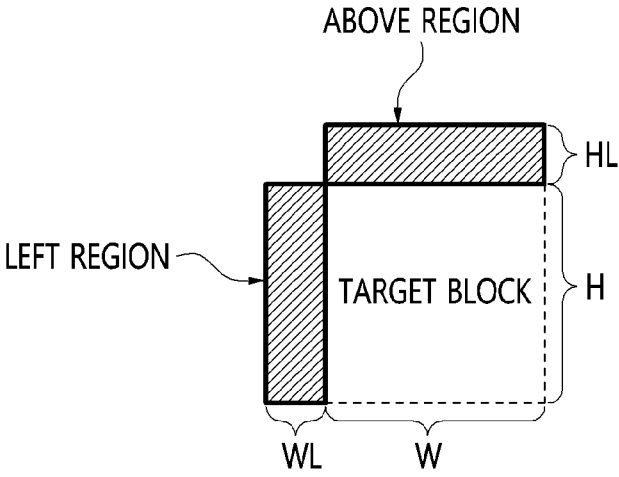
FIG. 26 illustrates an above region, a left region, and a target block according to an example.

FIG. 26 illustrates an above region, a left region, and a target block according to an example.

In an embodiment, the template of the block may be generated using pixels in the above region and pixels in the left region. The pixels may be reconstructed pixels.

The above region may be a rectangular region adjacent to the top of the block. The horizontal length of the above region may be W. W may be the horizontal length of the block. The vertical length of the above region may be HL. HL may be an integer of 1 or more.

The left region may be a rectangular region adjacent to the left of the block. The horizontal length of the left region may be WL. WL may be an integer of 1 or more. The vertical length of the left region may be H. H may be the vertical length of the block.

Figure 27:
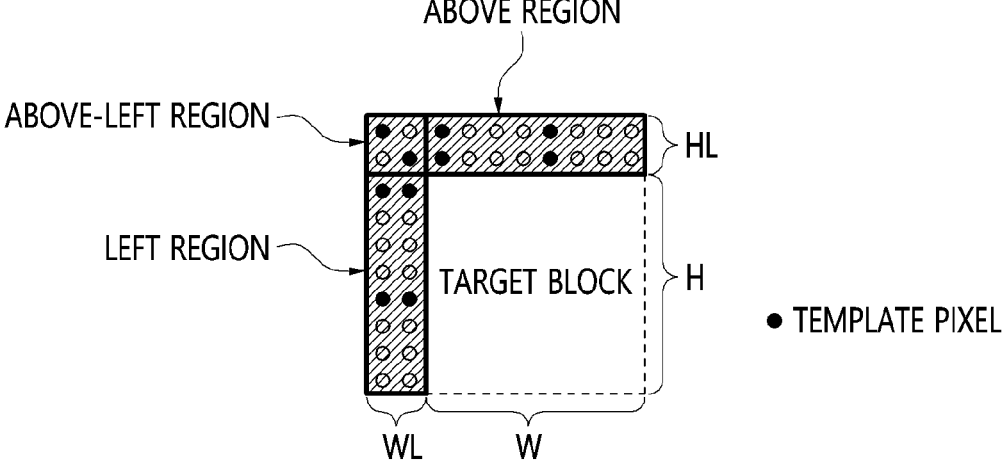
FIG. 27 illustrates the selection of template pixels using sub-sampling according to an example.

FIG. 27 illustrates the selection of template pixels using sub-sampling according to an example.

The processing unit may generate the template of a block using some of pixels in one or more of a region above-and-to-the-left of the block, a region above the block, and a region to the left of the block.

The template pixels may refer to pixels used to generate the template.

Non-template pixels may refer to pixels that are not used to generate the template.

For example, a specific region may include one or more template pixels. Further, the specific region may include one or more non-template pixels.

In FIG. 27, the case where only some pixels among the pixels in each region are selected as template pixels is illustrated.

In an embodiment, template pixels in a region may be a-th pixels in a horizontal direction in the region. In other words, the template pixels in the region may be selected depending on a specific horizontal interval.

In an embodiment, the template pixels in the region may be pixels, the x coordinate of which in the region is any one of specific values, among the pixels in the region. The specific values may be (wN−1)*wStep+1. wStep may be an integer of 2 or more. wStep may refer to the horizontal interval between template pixels in one row. wN may be integers of 1 or more. Pixels, the x coordinate of which in the region is not any one of specific values, among the pixels in the region, may be non-template pixels.

For example, when wStep is 4, the specific values may be 0, 4, 8, 12, . . . .

For example, when the horizontal size of the block is W and W is an odd number, the specific values may be 0 and W/2−½.

For example, when the horizontal size of the block is W and W is an even number, the specific values may be 0 and W/2.

For example, template pixels in the above region may be pixels, the x coordinate of which in the region is any one of specific values, among the pixels in the above region.

In an embodiment, the template pixels in the region may be b-th pixels in a vertical direction in the region. In other words, the template pixels in the region may be selected depending on a specific vertical interval.

In an embodiment, the template pixels in the region may be pixels, the y coordinate of which in the region is any one of specific values, among the pixels in the region. The specific values may be (hN−1)*hStep+1. hStep may be an integer of 2 or more. hStep may refer to the vertical interval between template pixels in one column. hN may be integers of 1 or more. Pixels, the y coordinate of which in the region is not any one of specific values, among the pixels in the region, may be non-template pixels.

For example, when hStep is 4, the specific values may be 0, 4, 8, 12, . . . .

For example, when the vertical size of the block is H and H is an odd number, the specific values may be 0 and H/2−½.

For example, when the vertical size of the block is H and H is an even number, the specific values may be 0 and H/2.

For example, template pixels in the left region may be pixels, the y coordinate of which in the region is any one of specific values, among the pixels in the left region.

In an embodiment, the template pixels in the region may be pixels, the x coordinate and y coordinate of which satisfy a specific condition, among the pixels in the corresponding region. In other words, the template pixels in the region may be selected depending on the x coordinates and the y coordinates of the pixels.

For example, the template pixels in the region may include an uppermost-leftmost pixel and a lowermost-rightmost pixel within the region.

For example, the template pixels in the region may form a diagonal within the region.

In an embodiment, the template pixels in the region may be pixels, the x coordinate and the y coordinate of which in the region are identical to each other, among the pixels in the corresponding region. In other words, the coordinates of the template pixel may be (n, n). n may be an integer of 1 or more. Pixels, the x coordinate and the y coordinate of which in the region are not identical to each other, among the pixels in the corresponding region, may be non-template pixels.

For example, the template pixels in the above-left region may be pixels, the x coordinate and the y coordinate of which in the region are identical to each other, among pixels in the above-left region.

In an embodiment, as illustrated in FIG. 27, the template may be generated using one or more of the following first template pixels, second template pixels, and third template pixels.

The first template pixels: The first template pixels may be first pixels in a horizontal direction (i.e., leftmost pixels) in the above region and pixels at the location of W/2 in the horizontal direction. The pixels at the location of W/2 in the horizontal direction may be pixels having an x coordinate of W/2. W may be the horizontal length of the block.

The second template pixels: The second template pixels may be first pixels in a vertical direction (i.e., uppermost pixels) in the left region and pixels at the location of H/2 in the vertical direction. The pixels at the location of H/2 in the vertical direction may be pixels having a y coordinate of H/2. H may be the vertical length of the block.

The third template pixels: The third template pixels may be an uppermost-leftmost pixel and a lowermost-rightmost pixel in the above-left region. Alternatively, the third template pixels may be diagonal pixels in the above-left region. The diagonal may be a lower-right diagonal. Alternatively, the diagonal may be a lower-left diagonal.

Figure 28:
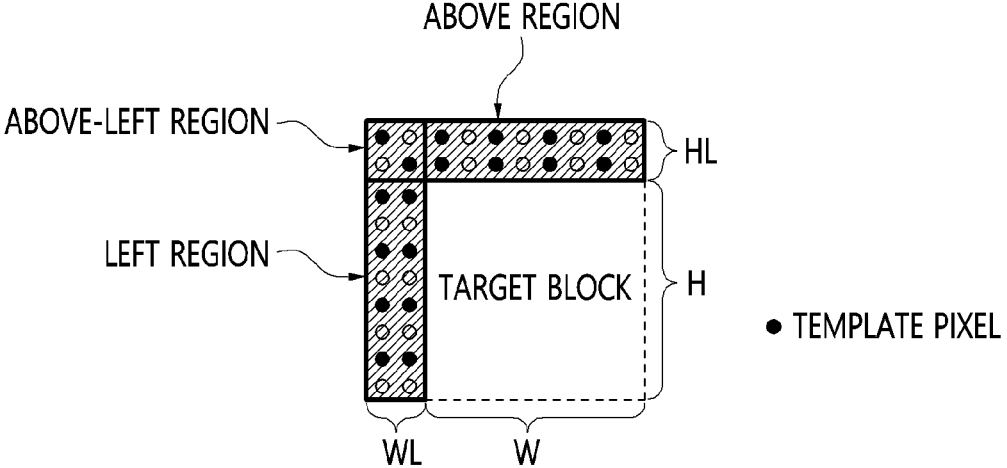
FIG. 28 illustrates the selection of template pixels using sub-sampling at specific intervals according to an example.

FIG. 28 illustrates the selection of template pixels using sub-sampling at specific intervals according to an example.

In FIG. 28, another scheme for selecting template pixels is illustrated.

In an embodiment, as illustrated in FIG. 28, the template may be generated using one or more of the following first template pixels, second template pixels, and third template pixels.

The first template pixels: The first template pixels may be odd-numbered pixels in a horizontal direction in an above region (i.e., pixels, the x coordinate of which is 0 or an even number). Alternatively, the first template pixels may be even-numbered pixels in a horizontal direction in the above region (i.e., pixels, the x coordinate of which is an odd number).

The second template pixels: The second template pixels may be odd-numbered pixels in a vertical direction in a left region (i.e., pixels, the y coordinate of which is 0 or an even number). Alternatively, the second template pixels may be even-numbered pixels in the vertical direction in the left region (i.e., pixels, the y coordinate of which is an odd number).

The third template pixels: The third template pixels may be an uppermost-leftmost pixel and a lowermost-rightmost pixel in the above-left region. Alternatively, the third template pixels may be diagonal pixels in the above-left region. The diagonal may be a lower-right diagonal. Alternatively, the diagonal may be a lower-left diagonal.

Configuration of Potential Candidate Set

Figure 29:
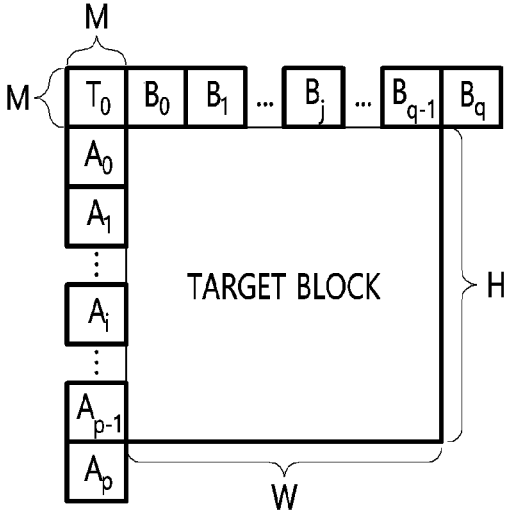
FIG. 29 illustrates potential candidates adjacent to a current block according to an example.

FIG. 29 illustrates potential candidates adjacent to a current block according to an example.

In an embodiment, a potential candidate may include a potential merge candidate. A potential candidate set may include a potential merge candidate set. A potential spatial candidate may include a potential spatial merge candidate.

At step 2020, the processing unit may configure $\Psi$ using at least one of 1) one or more blocks neighboring a target block, 2) a block in a col-block of a reference picture, or 3) a block neighboring the col-block.

The potential candidate may refer to a block included in $\Psi'$. Alternatively, the potential candidate may refer to a block for providing motion information included in $\Psi$.

The potential candidate may have motion information. The motion information may include one or more of a motion vector and a reference picture index. Alternatively, the motion information may include a block vector. In embodiments, the term "motion vector" may be replaced with the term "block vector".

As illustrated in FIG. 29, the horizontal size of the target block may be W, and the vertical size thereof may be H. In other words, the size of the target block may be (W, H).

The block neighboring the target block may be a reconstructed block. The reference picture may be a reconstructed picture.

The block neighboring target block may include 1) a block adjacent to the top-left of the target block, 2) one or more blocks adjacent to the top or top-right of the target block, and 3) one or more blocks adjacent to the left or the bottom-left of the target block.

The sizes of one or more blocks neighboring the target block may be equal to each other. The sizes of one or more blocks neighboring the target block may be m×m.

As illustrated in FIG. 29, $\Psi$ may be configured to include one or more of 1) block $A_0$ to block $A_p$, 2) block B0 to block Bq, and 3) block $T_0$.

For example, 1) block A0 to block $A_p$, 2) block $B_0$ to block Bq, and 3) block $T_0$ may be potential spatial candidates for the target block.

1) $A_0$ to $A_p$ may be blocks, which are adjacent to the left or bottom-left of the target block and have an m×m size.

2) $B_0$ to $B_q$ may be blocks, which are adjacent to the top or top-right of the target block and have an m×m size.

3) $T_0$ may be a block, which is adjacent to the top-left of the target block and has an m×m size.

The potential candidates may include one or more of 1) $A_0$ to $A_p$, 2) $B_0$ to Bq, and 3) $T_0$.

Locations of Potential Spatial Candidates

The potential spatial candidates may be defined as follows.

The size of the potential spatial candidates may be m×m.

The top-left coordinates of the target block may be ($x_0$, $y_0$). The top-left coordinates of the block may refer to the coordinates of the uppermost-leftmost pixel in the block.

W may be the horizontal size of the target block. —H may be the vertical size of the target block.

q may be W/m. q+1 may be the number of blocks adjacent to the top or top-right of the target block.

p may be H/m. p+1 may be the number of blocks adjacent to the left or bottom-left of the target block.

i may be an integer that is greater than 1 and less than p–1.

j may be an integer that is greater than 1 and less than q–1.

The top-left coordinates of block $A_0$ may be ($x_0$–m, $y_0$).

The top-left coordinates of block $A_i$ may be ($x_0$–m, $y_0$+m*i). For example, block $A_0$ to block $A_i$ may be adjacent to each other.

The top-left coordinates of block $A_p$–1 may be ($x_0$–m, $y_0$+m*(p–1)) or ($x_0$–m, $y_0$+H–m).

For example, block $A_p$–1 may be adjacent to block $A_p$–2, and may also be adjacent to block $A_p$.

The top-left coordinates of block $A_p$ may be ($x_0$–m, $y_0$+H).

The top-left coordinates of block $B_0$ may be ($x_0$, $y_0$–m).

The top-left coordinates of block $B_j$ may be ($x_0$+m*j, $y_0$–m). For example, block $B_0$ or block $B_j$ may be adjacent to each other.

The top-left coordinates of block $B_q$–1 may be ($x_0$+m* (q–1), $y_0$–m) or ($x_0$+W–m, $y_0$–m).

For example, block $B_q$–1 may be adjacent to block $B_q$–2 or may also be adjacent to block $B_q$.

The top-left coordinates of block $B_q$ may be ($x_0$+W, $y_0$–m).

The top-left coordinates of block $T_0$ may be ($x_0$–m, $y_0$–m).

For the above-described potential spatial candidates, $\Psi$ may be defined as follows.

$\Psi$ may be a set $\{A_0, A_1, \ldots, A_{p-1}, A_p, B_0, B_1, \ldots, B_{q-1}, B_q, T_0\}$.

$\Psi$ may be the subset of the set $\{A_0, A_1, \ldots, A_{p-1}, A_p, B_0, B_1, \ldots, B_{q-1}, B_q, T_0\}$. Alternatively, $\Psi$ may include the subset of the set $\{A_0, A_1, \ldots, A_{p-1}, A_p, B_0, B_1, \ldots, B_{q-1}, B_q, T_0\}$.

$\Psi$ may be at least one of $A_0, A_1, \ldots, A_{p-1}, A_p, B_0, B_1, \ldots, B_{q-1}, B_q$, and $T_0$.

$\Psi$ may include at least one of $A_0, A_1, \ldots, A_{p-1}, A_p, B_0, B_1, \ldots, B_{q-1}, B_q$, and $T_0$.

Among the potential spatial candidates, a potential spatial candidate satisfying a specific condition may be included in $\Psi$. The specific condition may use a coding parameter for the potential spatial candidate. In other words, whether the potential spatial candidate is included in $\Psi$ may be determined based on the coding parameter of the potential spatial candidate.

In embodiments, although $\Psi$ is described as being a set, the potential candidates in $\Psi$ may be arranged in order. From this aspect, in description related to $\Psi$, the set may be regarded as a tuple. In embodiments, the elements in the set may be regarded as elements in the tuple. The order of specific elements indicated in the set may be regarded as the order of the specific elements in the tuple.

Figure 30:
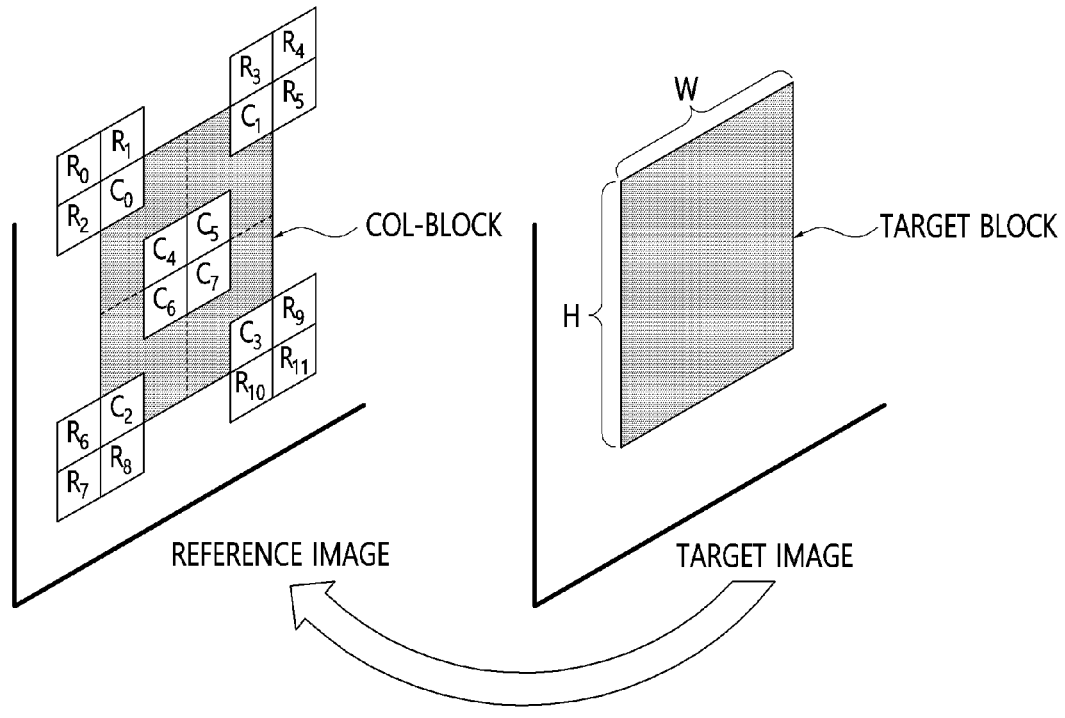
FIG. 30 illustrates a current block, a col-block, and potential candidates in the col-block according to an example.

FIG. 30 illustrates a current block, a col-block, and potential candidates in the col-block according to an example.

A potential temporal candidate may include a potential temporal merge candidate. A reference image may refer to another reconstructed image.

In FIG. 30, a target block in a target image and a col-block in the reference image are illustrated.

As illustrated in FIG. 30, $\Psi$ may be configured to include one or more of 1) block $C_0$ to block $C_7$, and 2) block $R_0$ to block $R_{11}$.

For example, 1) block $C_0$ to block $C_7$ and 2) block $R_0$ to block $R_{11}$ may be potential temporal candidates for the target block.

For example, 1) $C_0$ to $C_7$ and 2) $R_0$ to $R_{11}$ may be temporal reference blocks for the target block.

1) $C_0$ to $C_7$ may be blocks, having an m×m size, at specific locations in the col-block.

2) $R_0$ to $R_{11}$ may be blocks, which are adjacent to the col-block and have an m×m size.

The potential candidates may include one or more of 1) $C_0$ to $C_7$ and 2) $R_0$ to $R_{11}$ 1.

Locations of Potential Temporal Candidates

The potential temporal candidates may be defined as follows.

The size of the potential temporal candidates may be m×m.

The top-left coordinates of the target block may be $(x_0, y_0)$. The top-left coordinates of the block may refer to the coordinates of the uppermost-leftmost pixel in the block.

W may be the horizontal size of the target block. H may be the vertical size of the target block.

The top-left coordinates of the col-block may be $(x_0, y_0)$. The horizontal size of the col-block may be W. The vertical size of the col-block may be H.

W may be configured to include at least one of block $C_0$ to block $C_7$ and block $R_0$ to block $R_{11}$.

$C_0$ may be a block at location $(x_0, y_0)$ in a col-picture. For example, $C_0$ may be a block adjacent to the top-left of the col-block in the col-block.

$C_1$ may be a block at location $(x_0+W-m, y_0)$ in the col-picture. For example, $C_1$ may be a block adjacent to the top-right of the col-block in the col-block.

$C_2$ may be a block at location $(x_0, y_0+H-m)$ in the col-picture. For example, $C_2$ may be a block adjacent to the bottom-left of the col-block in the col-block.

$C_3$ may be a block at location $(x_0+W-m, y_0+H-m)$ in the col-picture. For example, $C_3$ may be a block adjacent to the bottom-right of the col-block in the col-block.

$C_4$ may be a block at location $(x_0+W/2-m, y_0+H/2-m)$ in the col-picture. For example, $C_4$ may be a block, the bottom-right of which is adjacent to the center of the col-block in the col-block.

$C_5$ may be a block at location $(x_0+W/2, y_0+H/2-m)$ in the col-picture. For example, $C_5$ may be a block, the bottom-left of which is adjacent to the center of the col-block in the col-block.

$C_6$ may be a block at location $(x_0+W/2-m, y_0+H/2)$ in the col-picture. For example, $C_6$ may be a block, the top-right of which is adjacent to the center of the col-block in the col-block.

$C_7$ may be a block at location $(x_0+W/2, y_0+H/2)$ in the col-picture. For example, $C_7$ may be a block, the top-left of which is adjacent to the center of the col-block in the col-block.

$R_0$ may be a block at location $(x_0-m, y_0-m)$ in the col-picture. For example, $R_0$ may be a block diagonally adjacent to the top-left of the col-block.

$R_1$ may be a block at location $(x_0, y_0-m)$ in the col-picture. For example, $R_1$ may be the leftmost block among blocks adjacent to the top of the col-block. Alternatively, $R_1$ may be a block adjacent to the right of $R_0$.

$R_2$ may be a block at location $(x_0-m, y_0)$ in the col-picture. For example, $R_2$ may be the uppermost block among the blocks adjacent to the left of the col-block. Alternatively, $R_2$ may be a block adjacent to the bottom of $R_0$.

$R_3$ may be a block at location $(x_0+W-m, y_0-m)$ in the col-picture. For example, $R_3$ may be the rightmost block among the blocks adjacent to the top of the col-block. Alternatively, $R_3$ may be a block adjacent to the left of $R_4$.

$R_4$ may be a block at location $(x_0+W, y_0-m)$ in the col-picture. For example, $R_4$ may be a block diagonally adjacent to the top-left of the col-block.

$R_5$ may be a block at location $(x_0+W, y_0)$ in the col-picture. For example, $R_5$ may be the uppermost block among blocks adjacent to the right of the col-block. Alternatively, $R_5$ may be a block adjacent to the bottom of $R_4$.

$R_6$ may be a block at location $(x_0-m, y_0+H-m)$ in the col-picture. For example, $R_6$ may be the lowermost block among blocks adjacent to the left of the col-block. Alternatively, $R_6$ may be a block adjacent to the top of $R_7$.

$R_7$ may be a block at location $(x_0-m, y_0+H)$ in the col-picture. For example, $R_7$ may be a block diagonally adjacent to the bottom-left of the col-block.

$R_8$ may be a block at location $(x_0, y_0+H)$ in the col-picture. For example, $R_8$ may be the leftmost block among blocks adjacent to the bottom of the col-block. Alternatively, $R_8$ may be a block adjacent to the right of R7.

$R_9$ may be a block at location $(x_0+W, y_0+H-m)$ in the col-picture. For example, $R_9$ may be the lowermost block among blocks adjacent to the right of the col-block. Alternatively, $R_9$ may be a block adjacent to the top of $R_{11}$.

$R_{10}$ may be a block at location $(x_0+W-m, y_0+H)$ in the col-picture. For example, $R_{10}$ may be the rightmost block among the blocks adjacent to the bottom of the col-block. Alternatively, $R_{10}$ may be a block adjacent to the left of $R_{11}$.

$R_{11}$ may be a block at location $(x_0+W, y_0+H)$ in the col-picture. For example, $R_{11}$ may be a block diagonally adjacent to the bottom-right of the col-block.

For the above-described potential temporal candidates, $\Psi$ may be defined as follows.

$\Psi$ may be a set $\{C_0, \ldots, C_7 \text{ and } R_0, \ldots, R_{11}\}$.

$\Psi$ may be the subset of the set $\{C_0, \ldots, C_7 \text{ and } R_0, \ldots, R_{11}\}$. Alternatively, $\Psi$ may include the subset of the set $\{C_0, \ldots, C_7 \text{ and } R_0, \ldots, R_{11}\}$.

$\Psi$ may be at least one of $C_0, \ldots, C_7$ and $R_0, \ldots, R_{11}$.

$\Psi$ may include at least one of $C_0, \ldots, C_7$ and $R_0, \ldots, R_{11}$.

Among the potential temporal candidates, a potential temporal candidate satisfying a specific condition may be included in $\Psi$. The specific condition may use a coding parameter for the potential temporal candidate. In other words, whether the potential temporal candidate is included in $\Psi$ may be determined based on the coding parameter for the potential temporal candidate.

Locations of Other Potential Spatial Candidates

Figure 31:
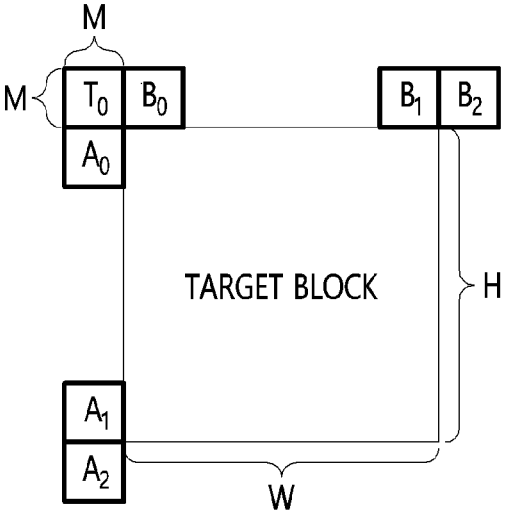
FIG. 31 illustrates additional potential candidates adjacent to the current block according to an example.

FIG. 31 illustrates other potential candidates adjacent to the current block according to an example.

As illustrated in FIG. 31, $\Psi$ may be configured to include one or more of block $A_0$, block $A_1$, block $A_2$, block $B_0$, block $B_1$, block $B_2$, and block $T_0$.

For example, block $A_0$, block $A_1$, block $A_2$, block $B_0$, block $B_1$, block $B_2$, and block $T_0$ may be potential spatial candidates for the target block.

1) $A_0$ and $A_1$ may be blocks, which are adjacent to the left of the target block and have an m×m size.

2) $A_2$ may be blocks, which are diagonally adjacent to the bottom-left of the target block and have an m×m size.

3) $B_0$ and $B_1$ may be blocks, which are adjacent to the top of the target block and have an m×m size.

4) $B_1$ may be a block, which is adjacent to the top-right of the target block and has an m×m size.

5) $T_0$ may be a block, which is adjacent to the top-left of the target block and has an m×m size.

The potential candidates may include one or more of $A_0$, $A_1$, $A_2$, $B_0$, $B_1$, $B_2$, and $T_0$.

The potential spatial candidates may be defined as follows.

The size of the potential spatial candidates may be m×m.

The top-left coordinates of the target block may be $(x_0, y_0)$. The top-left coordinates of the block may refer to the coordinates of the uppermost-leftmost pixel in the block.

W may be the horizontal size of the target block. —H may be the vertical size of the target block.

The top-left coordinates of block $A_0$ may be $(x_0-m, y_0)$. For example, block $A_0$ may be the uppermost block among blocks adjacent to the left of the target block.

The top-left coordinates of block $A_1$ may be $(x_0-m, y_0+H-m)$. For example, block $A_1$ may be the lowermost block among blocks adjacent to the left of the target block.

The top-left coordinates of block $A_2$ may be $(x_0-m, y_0+H)$.

The top-left coordinates of block $B_0$ may be $(x_0, y_0-m)$.

The top-left coordinates of block $B_1$ may be $(x_0+W-m, y_0-m)$.

The top-left coordinates of block $B_2$ may be $(x_0+W, y_0-m)$.

The top-left coordinates of block $T_0$ may be $(x_0-m, y_0-m)$.

For the above-described potential spatial candidates, $\Psi$ may be defined as follows.

$\Psi$ may be a set $\{A_0, A_1, A_2, B_0, B_1, B_2, T_0\}$.

$\Psi$ may be the subset of the set $\{A_0, A_1, A_2, B_0, B_1, B_2, T_0\}$. Alternatively, $\Psi$ may include the subset of the set $\{A_0, A_1, A_2, B_0, B_1, B_2, T_0\}$.

$\Psi$ may be at least one of $A_0, A_1, A_2, B_0, B_1, B_2$, and $T_0$.

$\Psi$ may include at least one of $A_0, A_1, A_2, B_0, B_1, B_2$, and $T_0$.

A potential spatial candidate satisfying a specific condition among potential spatial candidates may be included in $\Psi$. The specific condition may use a coding parameter for the potential spatial candidate. In other words, based on the coding parameter for the potential spatial candidate, whether the potential spatial candidate is included in $\Psi$ may be determined.

Example of Potential Candidate Set Including Potential Spatial Candidates and Potential Temporal Candidates When the potential spatial candidates, described above with reference to FIG. 29, are used, the potential candidate set $\Psi$ may be configured as follows.

$\Psi$ may be a set $\{A_0, A_1, \ldots, A_{p-1}, A_p, B_0, B_1, \ldots, B_{q-1}, B_q, T_0, C_0, \ldots, C_7, R_0, \ldots, R_{11}\}$.

$\Psi$ may be the subset of the set $\{A_0, A_1, \ldots, A_{p-1}, A_p, B_0, B_1, \ldots, B_{q-1}, B_q, T_0, C_0, \ldots, C_7, R_0, \ldots, R_{11}\}$. Alternatively, $\Psi$ may include the subset of the set $\{A_0, A_1, \ldots, A_{p-1}, A_p, B_0, B_1, \ldots, B_{q-1}, B_q, T_0, C_0, \ldots, C_7, R_0, \ldots, R_{11}\}$.

$\Psi$ may be at least one of $A_0, A_1, \ldots, A_{p-1}, A_p, B_0, B_1, \ldots, B_{q-1}, B_q, T_0, C_0, \ldots, C_7, R_0, \ldots, R_{10}$, and $R_{11}$.

$\Psi$ may include at least one of $A_0, A_1, \ldots, A_{p-1}, A_p, B_0, B_1, \ldots, B_{q-1}, B_q, T_0, C_0, \ldots, C_7, R_0, \ldots, R_{10}$, and $R_{11}$.

Template Matching

Below, template matching at step 2030 will be described in detail.

In an embodiment, a potential candidate may include a potential merge candidate. A potential candidate set may include a potential merge candidate set.

The processing unit may use the template generated at step 2010 to calculate template matching distortion between 1) the reference block of the potential candidate and 2) the target block.

The potential candidate may be a block belonging to the potential candidate set $\Psi$ generated at step 2020.

The reference block for the potential candidate may be a block referenced by the potential candidate.

For example, the reference block for the potential candidate may be a block referenced in prediction for the potential candidate. Prediction may be inter-prediction in an inter-mode or a prediction in an Intra-Block Copy (IBC) mode.

When the potential candidate included in $\Psi$ has a motion vector and a reference picture index, the reference block for the potential candidate may be a block at a location moved from the location in a reference image corresponding to the location of the target block by the motion vector. Here, the reference image may be an image indicated by the reference picture index. For example, when the location of the target block is $(x_0, y_0)$, and the motion vector of the potential candidate is $(x_m, y_m)$, the reference block may be a block occupying the location $(x_0+x_m, y_0+y_m)$ in the reference picture.

In an embodiment, template matching distortion in the potential candidate may refer to template matching distortion between one or more pixels included in the template of the reference block for the potential candidate and one or more pixels included in the template of the target block.

Furthermore, template matching distortion between a (reference) block block referenced by the potential candidate and the target block may refer to template matching distortion between one or more pixels included in the template of the reference block for the potential candidate and one or more pixels included in the template of the target block.

The template of the potential candidate may refer to the template of the block referenced by the potential candidate.

For example, template matching distortion in the potential candidate may be calculated using one or more pixels included in the template of the reference block for the potential candidate and one or more pixels included in the template of the target block.

For example, template matching distortion in the potential candidate may be calculated using pixels corresponding to each other, among one or more pixels included in the template of the reference block for the potential candidate and one or more pixels included in the template of the target block. Here, the corresponding pixels may refer to a pixel in the template of the reference block and a pixel in the template of the target block, which are co-located.

Calculation of Template Matching Distortion

In an embodiment, a potential candidate may include a potential merge candidate. A potential candidate set may include a potential merge candidate set.

Template matching distortion between one or more pixels belonging to the template of a reference block and one or more pixels belonging to the template of a target block may be calculated below.

D may denote template matching distortion.

In an embodiment, as shown in the following Equation 1, D may be the sum of the squared difference values between pixels belonging to the template of the reference block for the potential candidate and pixels belonging to the template of the target block.

$$D = \sum_{i}^{N} (C_i - R_i)^2 \qquad \text{[Equation 1]}$$

N may be the number of one or more pixels in the template. The number of one or more pixels belonging to the template of the reference block for the potential candidate may be N. The number of one or more pixels belonging to the template of the target block may be N.

$C_i$ may be an i-th pixel or the pixel value of the i-th pixel among the one or more pixels belonging to the template of the target block.

$R_i$ may be an i-th pixel or the pixel value of the i-th pixel among the one or more pixels belonging to the template of the reference block for the potential candidate.

$C_i$ and $R_i$ may be the pixels corresponding to each other or the pixel values of the corresponding pixels. Here, the fact that a first pixel belonging to the first template of the target block and a second pixel belonging to the second template of the reference block for the potential candidate correspond to each other may mean that the location of the first pixel in the first template is identical to the location of the second pixel in the second template.

In other words, D may be the sum of squared differences. Each of the difference values may be the difference between the pixel values of the pixels corresponding to each other in the template of the target block and in the template of the reference block.

In an embodiment, as shown in the following Equation 2, D may be the average of the sums of squared difference values between pixels belonging to the template of the reference block for the potential candidate and the pixels belonging to the template of the target block.

$$D = \frac{1}{N}\sum_{i}^{N}(C_i - R_i)^2 \qquad \text{[Equation 2]}$$

In other words, D may be the average of squares of the difference values. Each of the squares may be the square of the differences between the pixel values of the pixels corresponding to each other in the template of the target block and in the template of the reference block for the potential candidate.

As described above, for each of the one or more potential candidates belonging to $\Psi$, template matching distortion D in the corresponding potential candidate may be calculated.

Figure 32:
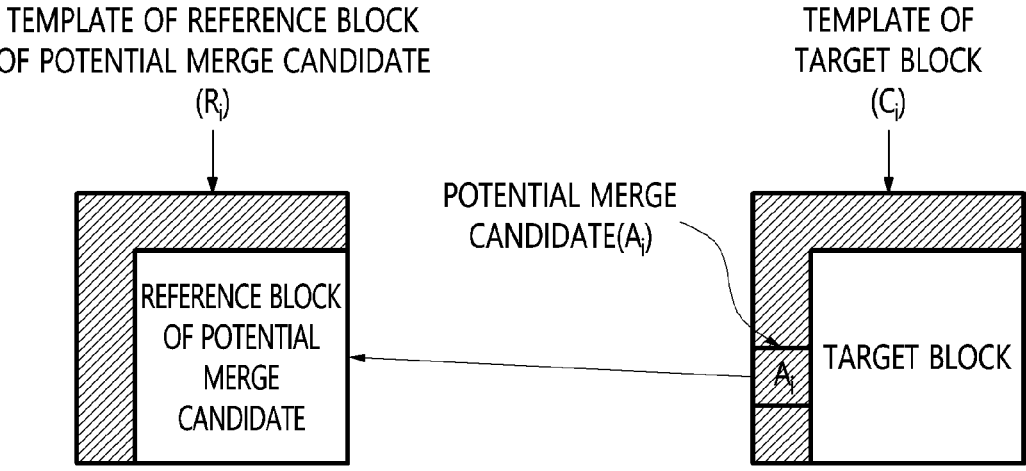
FIG. 32 illustrates a target block, the template of the target block, a reference block for a potential merge candidate, and the template of the reference block according to an example.

FIG. 32 illustrates a target block, the template of the target block, a reference block for a potential merge candidate, and the template of the reference block according to an example.

In an embodiment, a potential candidate may include a potential merge candidate. A potential candidate set may include a merge potential candidate set.

When block $A_i$ is a potential candidate and has motion information, template matching distortion between $R_i$ belonging to the template of a reference block referenced by $A_i$ and pixel $C_i$ belonging to the template of the target block may be calculated.

The calculation of the template matching distortion may be performed using the above-described Equation 1 or Equation 2.

The shape and size of the template, described in the foregoing embodiments, may be used.

By means of the foregoing method for calculating template matching distortion in the potential candidate, template matching distortion in one or more potential candidates belonging to $\Psi$ may be calculated.

Other Methods for Calculating Template Matching Cost

In the foregoing embodiments, the method for calculating template matching distortion, as an example of template matching cost, has been described. Template matching cost or template matching distortion may be calculated using other methods, described below. In the following embodiments, template matching cost may be regarded as template matching distortion.

Template matching cost in each candidate may be derived through a calculation formula that uses pixels in the template of the target block and pixels in the template of the reference block for the candidate.

Template matching cost in each candidate may be calculated using the differences between the corresponding pixels in the template of the target block and in the template of the reference block for the candidate.

For example, the template matching cost in each candidate may be measured using the Sum of Absolute Differences (SAD) between the pixels in the template of the target block and the pixels in the template of the reference block for the corresponding candidate.

For example, the template matching cost in each candidate may be calculated using one or more of 1) the Sum of Absolute Difference (SAD), 2) the Sum of Absolute Error (SAE), 3) the Mean Absolute Difference (MAD), 4) the Mean Absolute Error (MAE), 5) the Sum of Squared Differences (SSD), 6) the Sum of Squared Error (SSE), the Mean Squared Difference (MSD), the Mean Squared Error (MSE), the Mean Removed Sum of Absolute Difference (MR-SAD), and the Sum of Absolute Transformed Difference (SATD), which use the pixels in the template of the target block and the pixels in the template of the reference block for the corresponding candidate.

Reordering of Potential Candidates

In an embodiment, a potential candidate may include a potential merge candidate. A potential candidate set may include a potential candidate set. A reordered potential spatial candidate may include a reordered potential merge candidate.

Hereinafter, reordering of potential candidates at step 2040 is described.

One or more potential candidates belonging to $\Psi$ may be reordered based on a specific criterion. As the target of reordering, the above-described one or more potential candidates may be regarded as multiple potential candidates.

The specific criterion may be template matching distortions in one or more potential candidates.

As described above, template matching distortion in each potential candidate may refer to template matching distortions between one or more pixels included in the template of the reference block for the potential candidate and one or more pixels included in the template of the target block.

In other words, for one or more potential candidates, reordering of the reference blocks for the one or more potential candidates depending on template matching distortions may be performed.

For example, based on template matching distortion between a block referenced by each potential candidate belonging to $\Psi$ and the target block, the potential candidates may be realigned or sorted.

For example, when $\Psi$ is $\{S_0, S_1, \ldots, S_i, \ldots, S_{N-1}\}$, reordering of potential candidates may be performed in the order of low template matching distortion (i.e., in ascending order of template matching distortion) for the potential candidates $S_0$ to $S_{N-1}$ belonging to $\Psi$.

$S_i$ may be an i+1-th potential candidate. i may be equal to or greater than 0 and less than or equal to N−1.

N may be the total number of one or more potential candidates belonging to $\Psi$.

In other words, when $\Psi$ is $\{S_0, S_1, \ldots, S_i, \ldots, S_{N-1}\}$, potential candidates $S_0$ to SN–1 belonging to $\Psi$ may be sorted in ascending order of template matching distortions.

For example, when $\Psi$ is $\{S_0, S_1, S_2, S_3\}$ and template matching distortions in the potential candidates $S_0$, $S_1$, $S_2$, and $S_3$ belonging to $\Psi$ are sequentially 5, 7, 2, and 10, $S_0$, $S_1$, $S_2$, and $S_3$ may be reordered in the order of ($S_2$, $S_0$, $S_1$, and $S_3$) so that a potential candidate located at a front position in $\Psi$ has lower template matching distortion than that of a potential candidate located at a back position.

In an embodiment, a specific number of potential candidates may be reordered based on template matching distortions in the potential candidates belonging to $\Psi$.

The specific number may be one of integers of 1 or more. The specific number may be determined based on the coding parameter for the target block and/or the attribute of the target block.

The specific number may be less than or equal to the total number of potential candidates belonging to $\Psi$. The specific number may be less than the total number of potential candidates belonging to $\Psi$.

For example, based on template matching distortion between the block referenced by each potential candidate belonging to $\Psi$ and the target block, a specific number of potential candidates may be realigned or sorted.

For example, when $\Psi$ is $\{S_0, S_1, \ldots, S_i, \ldots, S_{N-1}\}$, reordering of a specific number of potential candidates may be performed on the potential candidates $S_0$ to $S_{N-1}$ belonging to $\Psi$ based on template matching distortions in the potential candidates.

For example, when $\Psi$ is $\{S_0, S_1, \ldots, S_i, \ldots, S_{N-1}\}$, reordering of a specific number of potential candidates may be performed on the potential candidates $S_0$ to $S_{N-1}$ belonging to $\Psi$ in the order of low template matching distortions in the potential candidates.

For example, when $\Psi$ is $\{S_0, S_1, \ldots, S_i, \ldots, S_{N-1}\}$, reordering of a specific number of potential candidates may be performed on the potential candidates $S_0$ to $S_{N-1}$ belonging to $\Psi$ in ascending order of template matching distortions in the potential candidates.

When $\Psi$ is $\{S_0, S_1, S_2, S_3, S_4, S_5\}$ and template matching distortions in the potential candidates $S_0$, $S_1$, $S_2$, $S_3$, $S_4$, and $S_5$ belonging to $\Psi$ are sequentially 50, 70, 20, 100, 150, and 30, four potential candidates may be reordered in the order of ($S_2$, $S_5$, $S_0$, $S_1$), that is, in the order of low template matching distortions.

Through the above-described reordering of potential candidates, a set $\Psi'$ of reordered (or sorted) potential candidates may be configured. In other words, the reordered potential candidate set $\Psi'$ may be a tuple including one or more reordered potential candidates.

In an embodiment, when $\Psi$ is $\{S_0, S_1, \ldots, S_i, \ldots, S_{N-1}\}$, the reordered potential candidate set $\Psi'$ may be generated by performing reordering of a specific number of potential candidates on the potential candidates $S_0$ to $S_{N-1}$ belonging to $\Psi$ in the order of low template matching distortions.

When $\Psi$ is $\{S_0, S_1, S_2, S_3, S_4, S_5\}$ and template matching distortions in the potential candidates $S_0$, $S_1$, $S_2$, $S_3$, $S_4$, and $S_5$ belonging to $\Psi$ are sequentially 50, 70, 20, 100, 150, and 30, $\Psi'$ having four potential candidates in the order of low template matching distortions may be configured. The configured $\Psi'$ may be ($S_2$, $S_5$, $S_0$, $S_1$).

Construction of List Using Specific Number of Reordered Potential Candidates

In an embodiment, a potential candidate may include a potential merge candidate. A potential candidate set may include a potential candidate set. A reordered potential candidate may include a reordered potential merge candidate. An index may include a merge index. merge_idx may denote a merge index.

At step 2050, a list may be constructed using a specific number of reordered potential candidates. The specific number may be less than or equal to the total number of potential candidates belonging to $\Psi$. The specific number may be less than the total number of potential candidates belonging to $\Psi$.

The reordered potential candidates may denote potential candidates in the $\Psi'$ generated through reordering.

N' may denote the number of reordered potential candidates. N' may be less than or equal to N. N' may be less than N.

$\Psi'$ may include N' reordered potential candidates.

For example, as shown in the following Table 7, a merge list may be constructed using N' potential candidates $\{S'_0, S'_1, \ldots, S'_i, \ldots, S'_{N'-1}\}$ aligned in the order of low template matching distortions.

TABLE 7

| merge_idx | Merge candidate in merge list |
|---|---|
| 0 | $S'_0$ |
| 1 | $S'_1$ |
| . . . | . . . |
| I | $S'_i$ |
| . . . | . . . |
| N – 1' | $S'_{N'-1}$ | merge_idx may denote each merge index in the merge list. For example, when the value of merge_idx of a merge candidate is n, the corresponding merge candidate may be an n+1-th merge candidate within the merge list.

For example, merge_idx may denote a block corresponding to the sequential position of the merge candidate within the merge list.

For example, merge_idx may denote a block corresponding to the sequential position of a reordered potential merge candidate within the merge list.

The list may use motion information of the block as a candidate. The list may be regarded as including the block. In other words, in embodiments, "block" within the list may refer to a "candidate generated using the motion information of the block" within the list.

For example, the index in the list may indicate the sequential position of the candidate (or motion information), derived using the reordered potential candidate, in the list.

When the index is 0, a first block, a first candidate or first motion information in the list may be used for prediction for the target block. When the index is m, an m+1-th block, an m+1-th candidate or m+1-th motion information in the list may be used for prediction for the target block.

For example, when $\Psi$ is $\{S_0, S_1, \ldots, S_i, \ldots, S_{N-1}\}$, $\Psi'$ may be configured from $\Psi$ by reordering the potential candidates in $\Psi$ in the order of low template matching distortions. $\Psi'$ may be $\{S'_0, S'_1, \ldots, S'_i, \ldots, S'_{N-1}\}$. The list may be constructed using $\Psi'$.

For example, when $\Psi$ is $\{S_0, S_1, \ldots, S_i, \ldots, S_{N-1}\}$, $\Psi'$ may be configured from $\Psi$ by performing reordering such that n' potential candidates having relatively low template matching distortions among the potential candidates in $\Psi$ are included in $\Psi'$. $\Psi'$ may be $\{S'_0, S'_1, \ldots, S'_i, \ldots, S'_{N'-1}\}$. The list may be constructed using $\Psi'$. N' may be less than or equal to N.

When $\Psi$ is $\{S_0, S_1, S_2, S_3, S_4, S_5\}$ and template matching distortions in the potential candidates $S_0$, $S_1$, $S_2$, $S_3$, $S_4$, and $S_5$ belonging to $\Psi$ are sequentially 50, 70, 20, 100, 150, and 30, all of the potential candidates may be reordered in the order of ($S_2$, $S_5$, $S_0$, $S_1$, $S_3$, and $S_4$), that is, in the order of low template matching distortions. The merge list may be constructed using the reordered {$S_2$, $S_5$, $S_0$, $S_1$, $S_3$, $S_4$}, as shown in the following Table 8.

TABLE 8

| merge_idx | Merge candidate in merge list |
|---|---|
| 0 | $S_2$ |
| 1 | $S_5$ |
| 2 | $S_0$ |
| 3 | $S_1$ |
| 4 | $S_3$ |
| 5 | $S_4$ |

When $\Psi$ is {$S_0$, $S_1$, $S_2$, $S_3$, $S_4$, $S_5$} and template matching distortions in the potential candidates $S_0$, $S_1$, $S_2$, $S_3$, $S_4$, and $S_5$ belonging to $\Psi$ are sequentially 50, 70, 20, 100, 150, and 30, four potential candidates may be reordered in the order of ($S_2$, $S_5$, $S_0$, $S_1$), that is, in the order of low template matching distortions. The merge list may be constructed using the reordered ($S_2$, $S_5$, $S_0$, $S_1$), as shown in the following Table 9.

TABLE 9

| merge_idx | Merge candidate in merge list |
|---|---|
| 0 | $S_2$ |
| 1 | $S_5$ |
| 2 | $S_0$ |
| 3 | $S_1$ |

When merge_idx in the merge list is given through signaling or the like, each merge candidate indicated by merge_idx may be derived and/or selected from among the merge candidates in the merge list. The selected candidate may be used for prediction of the target block.

When the index in the list is given through signaling or the like, each candidate indicated by the index may be selected from among the candidates in the list. The selected candidate may be used for prediction of the target block.

The motion information of the target block may be derived using the selected candidate. The selected candidate may be used as the motion information of the target block. Alternatively, the motion information of the selected candidate may be used as the motion information of the target block.

Here, the motion information may include a motion vector and a reference picture index. In other words, the motion vector of the target block may be set to be identical to the motion vector of the selected candidate. The reference picture index of the target block may be set to be identical to the reference picture index of the selected candidate.

The embodiments may be performed using the same method by the encoding apparatus 1600 and by the decoding apparatus 1700. Also, the image may be encoded/decoded using at least one of the embodiments or at least one combination thereof.

The order of application of the embodiments may be different from each other by the encoding apparatus 1600 and the decoding apparatus 1700, and the order of application of the embodiments may be (at least partially) identical to each other by the encoding apparatus 1600 and the decoding apparatus 1700.

The embodiments may be performed for each of a luma signal and a chroma signal, and may be equally performed for the luma signal and the chroma signal.

The form of a block to which the embodiments are applied may have a square or non-square shape.

Whether at least one of the above-described embodiments is to be applied and/or performed may be determined based on a condition related to the size of a block. In other words, at least one of the above-described embodiments may be applied and/or performed when the condition related to the size of a block is satisfied. The condition includes a minimum block size and a maximum block size. The block may be one of blocks described above in connection with the embodiments and the units described above in connection with the embodiments. The block to which the minimum block size is applied and the block to which the maximum block size is applied may be different from each other.

For example, when the block size is equal to or greater than the minimum block size and/or less than or equal to the maximum block size, the above-described embodiments may be applied and/or performed. When the block size is greater than the minimum block size and/or less than or equal to the maximum block size, the above-described embodiments may be applied and/or performed.

For example, the above-described embodiments may be applied only to the case where the block size is a predefined block size. The predefined block size may be 2×2, 4×4, 8×8, 16×16, 32×32, 64×64, or 128×128. The predefined block size may be $(2*SIZE_X) \times (2*SIZE_Y)$. $SIZE_X$ may be one of integers of 1 or more. $SIZE_Y$ may be one of integers of 1 or more.

For example, the above-described embodiments may be applied only to the case where the block size is equal to or greater than the minimum block size. The above-described embodiments may be applied only to the case where the block size is greater than the minimum block size. The minimum block size may be 2×2, 4×4, 8×8, 16×16, 32×32, 64×64, or 128×128. Alternatively, the minimum block size may be $(2*SIZE_{MIN\_X}) \times (2*SIZE_{MIN\_Y})$. $SIZE_{MIN\_X}$ may be one of integers of 1 or more. $SIZE_{MIN\_Y}$ may be one of integers of 1 or more.

For example, the above-described embodiments may be applied only to the case where the block size is less than or equal to the maximum block size. The above-described embodiments may be applied only to the case where the block size is less than the maximum block size. The maximum block size may be 2×2, 4×4, 8×8, 16×16, 32×32, 64×64, or 128×128. Alternatively, the maximum block size may be $(2*SIZE_{MAX\_X}) \times (2*SIZE_{MAX\_Y})$. $SIZE_{MAX\_X}$ may be one of integers of 1 or more. $SIZE_{MAX\_Y}$ may be one of integers of 1 or more.

For example, the above-described embodiments may be applied only to the case where the block size is equal to or greater than the minimum block size and is less than or equal to the maximum block size. The above-described embodiments may be applied only to the case where the block size is greater than the minimum block size and is less than or equal to the maximum block size. The above-described embodiments may be applied only to the case where the block size is equal to or greater than the minimum block size and is less than the maximum block size. The above-described embodiments may be applied only to the case where the block size is greater than the minimum block size and is less than the maximum block size.

In the above-described embodiments, the block size may be a horizontal size (width) or a vertical size (height) of a block. The block size may indicate both the horizontal size and the vertical size of the block. The block size may indicate the area of the block. Each of the area, minimum block size, and maximum block size may be one of integers equal to or greater than 1. In addition, the block size may be the result (or value) of a well-known equation using the horizontal size and the vertical size of the block, or the result (or value) of an equation in embodiments.

Further, in the embodiments, a first embodiment may be applied to a first size, and a second embodiment may be applied to a second size. That is, the embodiments may be compositely applied according to the size.

The embodiments may be applied depending on a temporal layer. In order to identify a temporal layer to which the embodiments are applicable, a separate identifier may be signaled, and the embodiments may be applied to the temporal layer specified by the corresponding identifier. Here, the identifier may be defined as the lowest (bottom) layer and/or the highest (top) layer to which the embodiments are applicable, and may be defined as being indicating a specific layer to which the embodiments are applied. Further, a fixed temporal layer to which the embodiments are applied may also be defined.

For example, the embodiments may be applied only to the case where the temporal layer of a target image is the lowermost layer. For example, the embodiments may be applied only to the case where the temporal layer identifier of a target image is equal to or greater than 1. For example, the embodiments may be applied only to the case where the temporal layer of a target image is the highest layer.

A slice type or a tile group type to which the embodiments to which the embodiments are applied may be defined, and the embodiments may be applied depending on the corresponding slice type or tile group type.

In the above-described embodiments, it may be construed that, during the application of specific processing to a specific target, assuming that specified conditions may be required and the specific processing is performed under a specific determination, a specific coding parameter may be replaced with an additional coding parameter when a description has been made such that whether the specified conditions are satisfied is determined based on the specific coding parameter, or such that the specific determination is made based on the specific coding parameter. In other words, it may be considered that a coding parameter that influences the specific condition or the specific determination is merely exemplary, and it may be understood that, in addition to the specific coding parameter, a combination of one or more additional coding parameters functions as the specific coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include examples in various aspects. Although all possible combinations for indicating various aspects cannot be described, those skilled in the art will appreciate that other combinations are possible in addition to explicitly described combinations. Therefore, it should be understood that the present disclosure includes other replacements, changes, and modifications belonging to the scope of the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

A bitstream may include computer-executable code and/or program. The computer-executable code and/or program may include pieces of information described in the embodiments, and may include syntax elements described in the embodiments. In other words, the pieces of information and syntax elements described in the embodiments may be regarded as a computer-executable code in the bitstream, and may be regarded as at least a part of the computer-executable code and/or program represented by the bitstream. The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A video decoding method, comprising:
determining prediction information for a target block based on information related to a prediction method; and
performing prediction on the target block using the prediction information, wherein the prediction information comprises a list, the list comprising reordered candidates is generated by performing reordering for candidates according to an ascending order for template matching costs of the candidates,
a specific number of the candidates are selected according to the ascending order for the template matching costs of the candidates to determine the reordered candidates, the candidates are determined by a plurality of blocks at a plurality of specific positions determined by a position of the target block, each of the plurality of blocks is spatially adjacent to the target block, and the plurality of blocks comprise at least one block which is horizontally or vertically adjacent to a side of the target block and not adjacent to any corner of the target block.

2. The video decoding method of claim 1, wherein:

the prediction comprises prediction using Intra Block Copy (IBC) mode.

3. The video decoding method of claim 1, wherein:

the prediction uses a block vector.

4. A video encoding method, comprising:

determining prediction information for a target block based on information relation on related to a prediction method; and performing prediction on the target block using the prediction information, wherein the prediction information comprises a list, the list comprising reordered candidates is generated by performing reordering for candidates according to an ascending order for template matching costs of the candidates, a specific number of the candidates are selected according to the ascending order for the template matching costs of the candidates to determine the reordered candidates, the candidates are determined by a plurality of blocks at a plurality of specific positions determined by a position of the target block, each of the plurality of blocks is spatially adjacent to the target block, and the plurality of blocks comprise at least one block which is horizontally or vertically adjacent to a side of the target block and not adjacent to any corner of the target block.

5. A non-transitory computer-readable recording medium storing a bitstream generated by the video encoding method of claim 4.

6. A non-transitory computer-readable recording medium storing a bitstream, the bitstream comprising:

information related to a prediction method, wherein prediction information for a target block is determined based on the information related to the prediction method; and prediction on the target block is performed using the prediction information, wherein the prediction information comprises a list, the list comprising reordered candidates is generated by performing reordering for candidates according to an ascending order for template matching costs of the candidates, a specific number of the candidates are selected according to the ascending order for the template matching costs of the candidates to determine the reordered candidates, the candidates are determined by a plurality of blocks at a plurality of specific positions determined by a position of the target block, each of the plurality of blocks is spatially adjacent to the target block, and the plurality of blocks comprise at least one block which is horizontally or vertically adjacent to a side of the target block and not adjacent to any corner of the target block.

7. A non-transitory computer-readable recording medium storing a bitstream, the bitstream comprising:

bitstream data representing information related to a prediction method, wherein the bitstream data is configured to cause a decoder to:

determine prediction information for a target block based on the information related to the prediction method, and perform prediction on the target block using the prediction information, wherein the prediction information comprises a list generated by reordering candidates according to an ascending order for template matching costs of the candidates, wherein a specific number of the candidates are selected according to the ascending order to determine the reordered candidates, the candidates are determined by a plurality of blocks at a plurality of specific positions determined by a position of the target block, each of the plurality of blocks is spatially adjacent to the target block, and the plurality of blocks comprise at least one block which is horizontally or vertically adjacent to a side of the target block and not adjacent to any corner of the target block.

* * * * *